DATA WORD

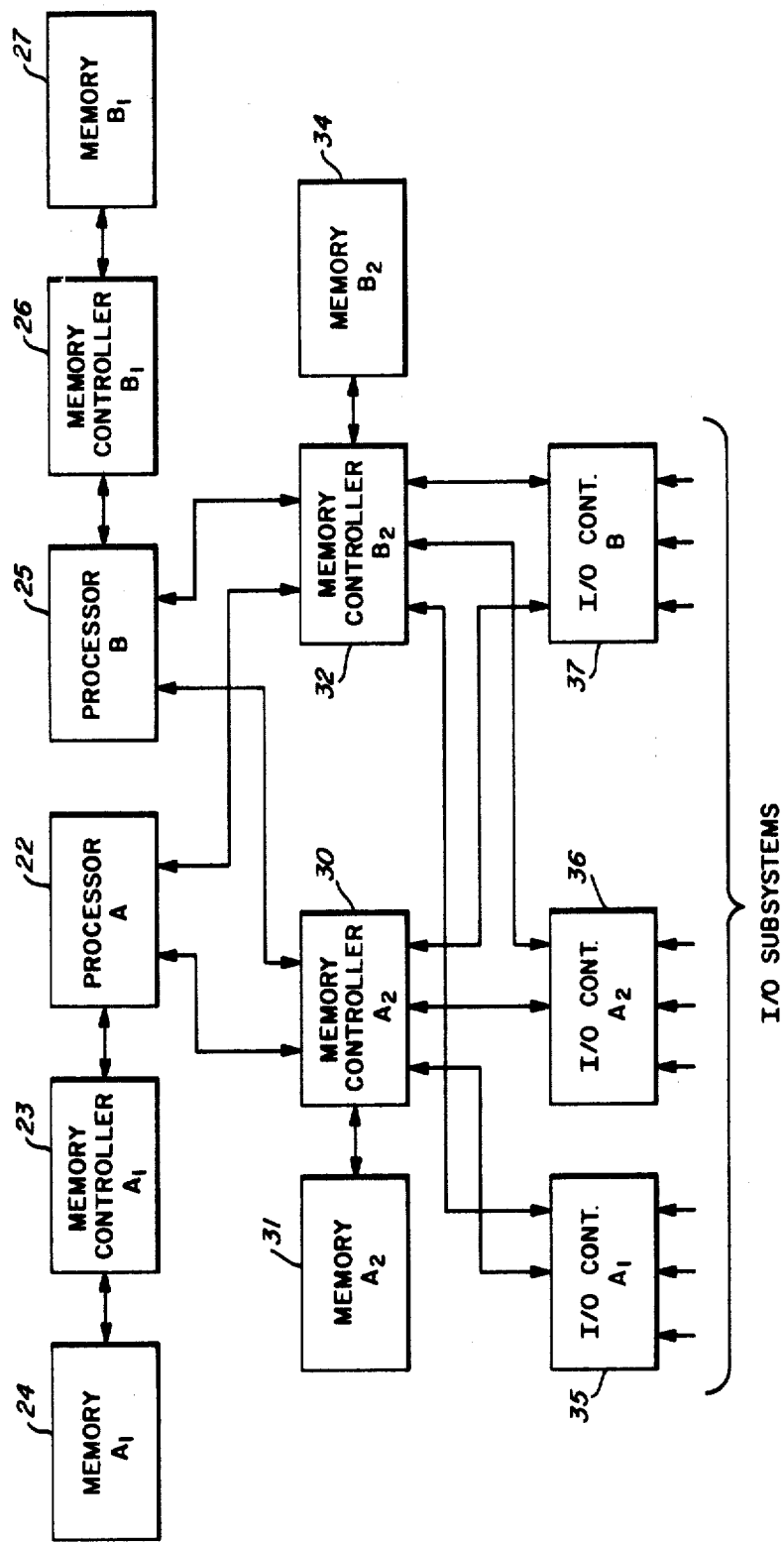

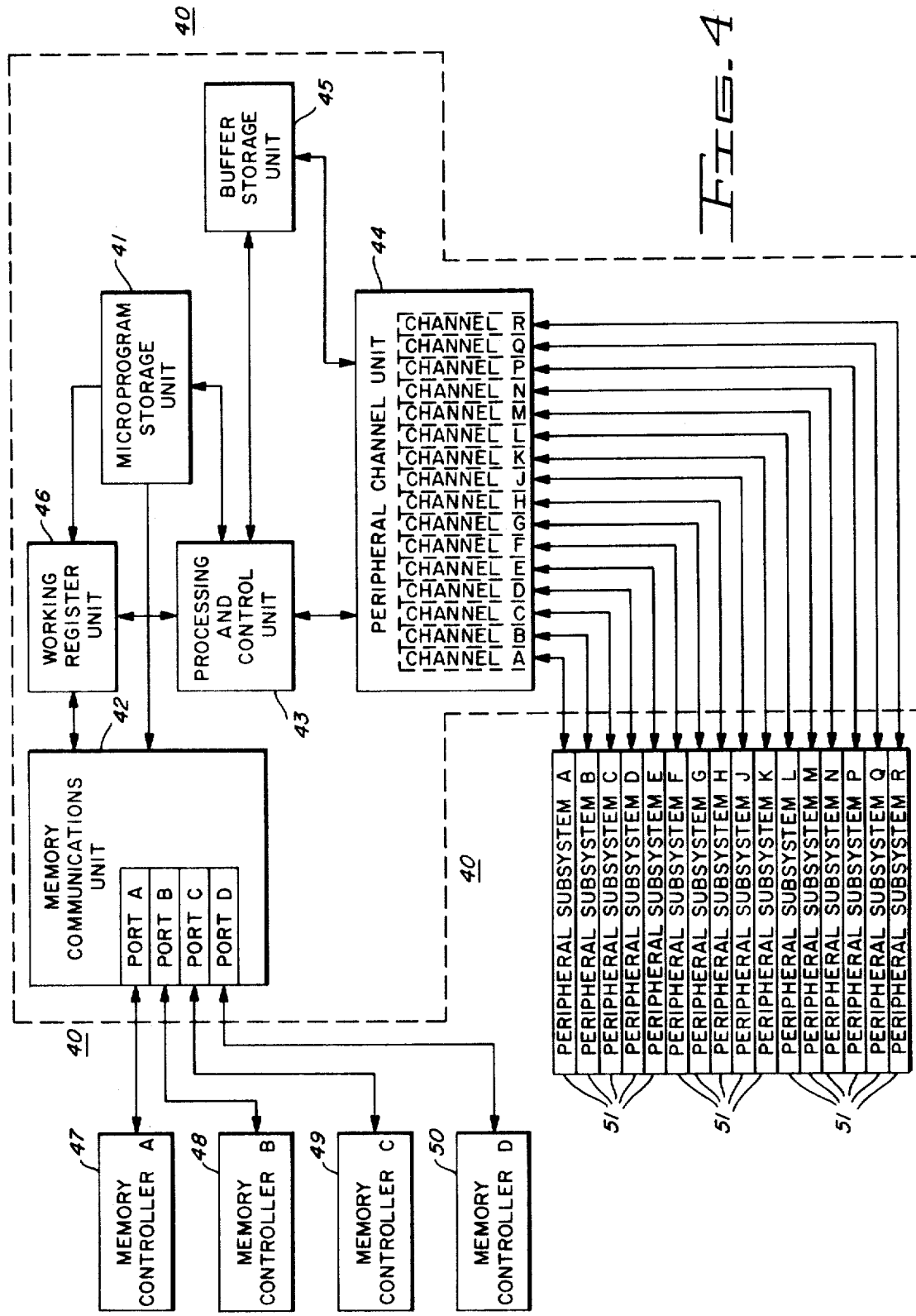

Fig. 5a

| 35 — 30,29 | — 24,23 | — 18,17 | — 12,11 | — 6,5 — 0 |
|---|---|---|---|---|
| CHARACTER 0 | CHARACTER 1 | CHARACTER 2 | CHARACTER 3 | CHARACTER 4 | CHARACTER 5 |

PRIMARY MAILBOX WORD

Fig. 5b

| 35 — 30,29 | — 24,23 | — 20,19,18,17 | — 12,11 | — 6,5 — 0 |
|---|---|---|---|---|
| PERIPHERAL DEVICE COMMAND | PERIPHERAL DEVICE ADDRESS | PERIPHERAL CHANNEL ADDRESS | L / 0 | IOC COMMAND | RECORD COUNT |

↑ LOCKOUT BIT x x x x x x — ONE OF PLURALITY OF CODES

```
000000
000001
ETC.
```

000 - DEVICE #0
001 - DEVICE #1

0000 - PERIPHERAL CHANNEL A
0001 - PERIPHERAL CHANNEL B
0010 - PERIPHERAL CHANNEL C
0011 - PERIPHERAL CHANNEL D
0100 - PERIPHERAL CHANNEL E
0101 - PERIPHERAL CHANNEL G
0110 - PERIPHERAL CHANNEL H
0111 - PERIPHERAL CHANNEL J
1000 - PERIPHERAL CHANNEL K
1001 - PERIPHERAL CHANNEL L
1010 - PERIPHERAL CHANNEL M
1011 - PERIPHERAL CHANNEL N
1100 - PERIPHERAL CHANNEL P
1101 - PERIPHERAL CHANNEL Q
1110 - PERIPHERAL CHANNEL R

0 - LOCKOUT
1 - MAILBOX MAY BE LOADED

00000000 - UNIT RECORD TRANSFER
00000010 - CONTINUOUS MODE NON-DATA TRANSFER
00000100 - CARD PUNCH
00001000 - MULTIRECORD
00001100 - MULTICOMMAND
00010000 - WRITE SINGLE CHARACTER RECORD
01000000 - PROGRAM LOAD

000000 - 64 RECORDS
000001 - 1 RECORD
000010 - 2 RECORDS
000011 - 3 RECORDS
ETC.

SECONDARY MAILBOX WORD #1

SECONDARY MAILBOX WORD #2

(IMAGE OF PRIMARY MAILBOX WORD)

FOR MULTICOMMAND, DEFINES SECOND OPERATION
FOR ALL OTHER IOC COMMANDS, IMAGE OF PRIMARY MAILBOX WORD

SECONDARY MAILBOX WORD #3

SECONDARY MAILBOX WORD #4

FIG. 5f

Bits: 35 — 18,17 — 15,14 — 12,11 — 6,5 — 0

Fields:
- FIRST DATA CONTROL WORD (DCW) POINTER
- IOC ERROR CODE
- MEMORY ERROR CODE
- IOC STATUS
- (reserved/hatched)
- RECORD COUNT RESIDUE IOC ERROR CODE:
- 0 0 0 — NO ERROR
- 0 0 1 — PRIMARY MAILBOX ERROR
- 0 1 0 — SECONDARY MAILBOX ERROR
- 1 1 0 — MEMORY ERROR IN DATA SERVICE ROUTINE
- 1 1 1 — OVERFLOW ADDRESS (EXCEEDS $2^{18}-1$)
- 1 1 1 — ILLEGAL ADDRESS MEMORY ERROR CODE:
- 0 0 — NO ERROR
- 0 1 — NON-EXISTENT ADDRESS
- 1 1 — PARITY ERROR

INTERRUPT QUEUE COUNTER WORD

FIG. 5g

Bits: 35 — 22,21 — 18,17 — 0

Fields:
- (hatched)
- COUNT FIELD
- (hatched)

COUNT FIELD:
- 0000 — WORD 0 OF INTERRUPT QUEUE TABLE
- 0001 — WORD 1 OF INTERRUPT QUEUE TABLE
- 0010 — WORD 2 OF INTERRUPT QUEUE TABLE
- 1111 — WORD 15 OF INTERRUPT QUEUE TABLE

INTERRUPT QUEUE TABLE WORD

| 35,34,33 | 30,29 | 24,23 | 18,17 | 15,14 | 12,11 | 6,5 | 2,1,0 |
|---|---|---|---|---|---|---|---|
| S P | POWER CODE | DEVICE MAJOR STATUS | DEVICE SUBSTATUS | IOC ERROR CODE | MEMORY ERROR CODE STATUS | | PERIPHERAL CHANNEL ADDRESS |

SYNC. BIT → (bit 35)
POWER CODE → (bits 34,33)

- 0 : QUEUE TABLE WORD AVAILABLE
- 1 : QUEUE TABLE WORD NOT AVAILABLE

- 0 — POWER ON
- 1 — POWER OFF

DEVICE MAJOR STATUS:
- 0 0 0 0 — CHANNEL / PERIPHERAL SUBSYSTEM READY
- 0 0 0 1 — DEVICE BUSY
- 0 0 1 0 — DEVICE ATTENTION
- 0 0 1 1 — DEVICE DATA ALERT
- 0 1 0 0 — END OF FILE
- 0 1 0 1 — COMMAND REJECT
- 0 1 1 0 — INTERMEDIATE CONDITION
- 0 1 1 1 — PROGRAM LOAD TERMINATION
- 1 0 0 0 — CHANNEL / PERIPHERAL SUBSYSTEM BUSY x x x  x x x — ONE OF PLURALITY OF CODES

IOC ERROR CODE:
- 0 0 0 — NO ERROR
- 0 0 1 — PRIMARY MAILBOX ERROR
- 0 1 0 — SECONDARY MAILBOX ERROR
- 0 1 1 — MEMORY ERROR IN DATA SERVICE ROUTINE
- 1 0 0 — OVERFLOW ADDRESS (EXCEEDS $2^{18}-1$)
- 1 1 1 — ILLEGAL ADDRESS

MEMORY ERROR CODE STATUS:
- 0 0 0 — NO ERROR
- 0 0 1 — NON-EXISTENT ADDRESS
- 0 1 1 — PARITY ERROR

PERIPHERAL CHANNEL ADDRESS:
- 0 0 0 0 — PERIPHERAL CHANNEL A
- 0 0 0 1 — PERIPHERAL CHANNEL B
- 1 1 1 1 — PERIPHERAL CHANNEL R

FIG. 5h

QUEUE COUNTER ERROR INTERRUPT WORD

MEMORY CONTROLLER – INPUT/OUTPUT CONTROLLER CONNECTION

READ/RESTORE COMMAND

CLEAR/WRITE COMMAND

MEMORY INTERRUPT REGISTER

SET EXECUTE INTERRUPT CELLS COMMAND

*PERIPHERAL SUBSYSTEM - INPUT/OUTPUT CONTROLLER CONNECTION*

Jan. 26, 1971  J. W. FIGUEROA ET AL  3,559,187
INPUT/OUTPUT CONTROLLER WITH LINKED DATA CONTROL WORDS
Filed Nov. 13, 1968  52 Sheets-Sheet 19

*WRITE SEQUENCE*

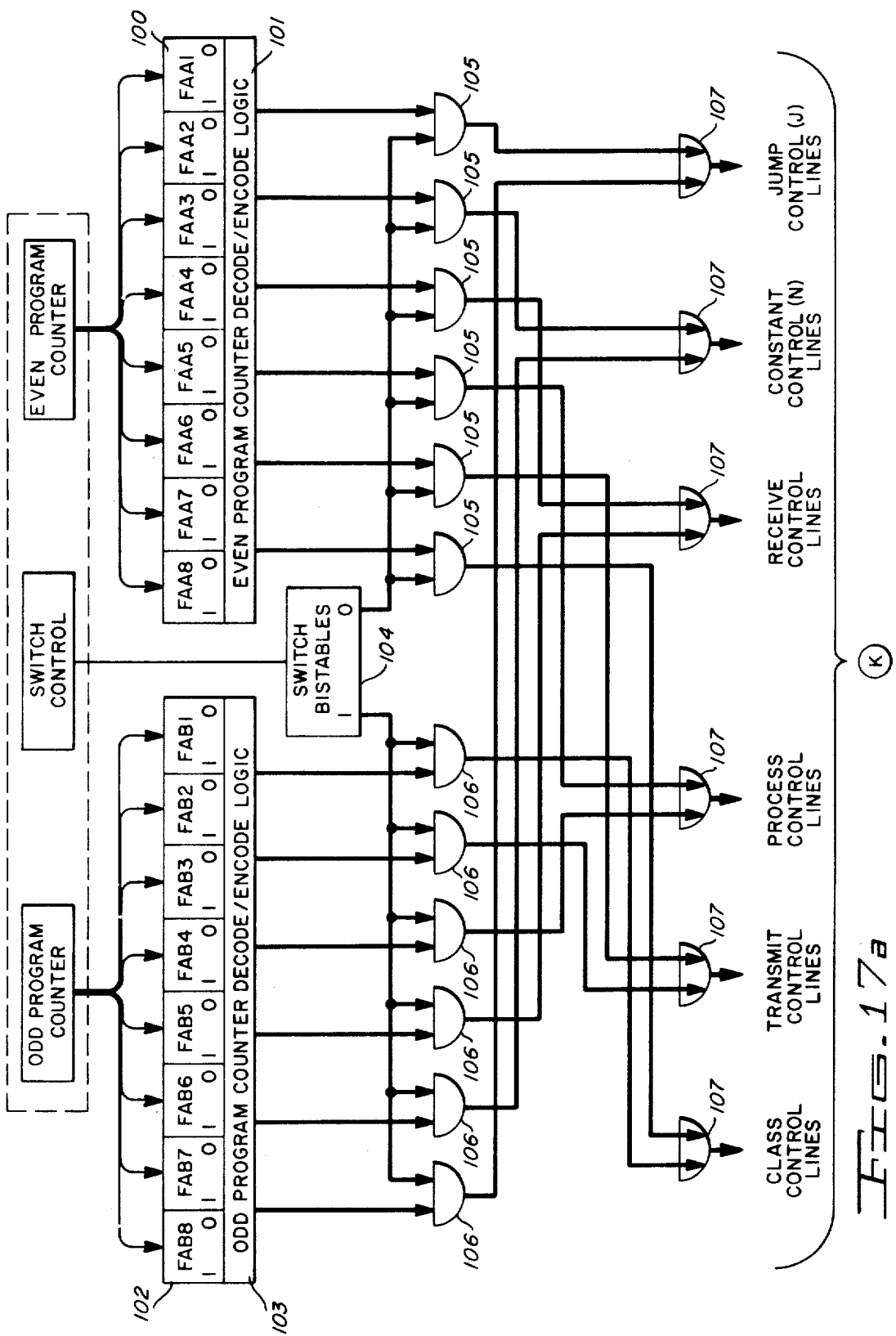

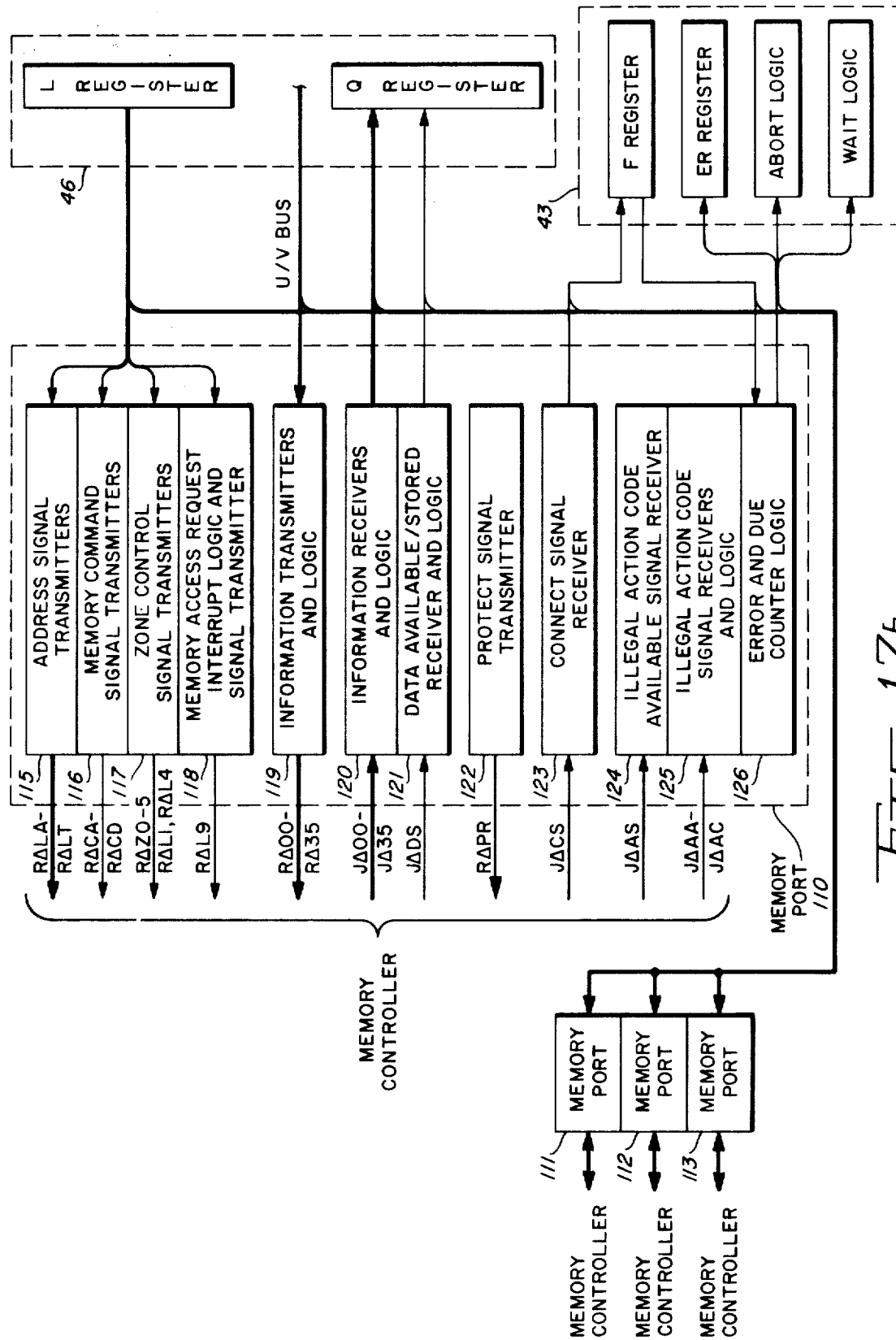

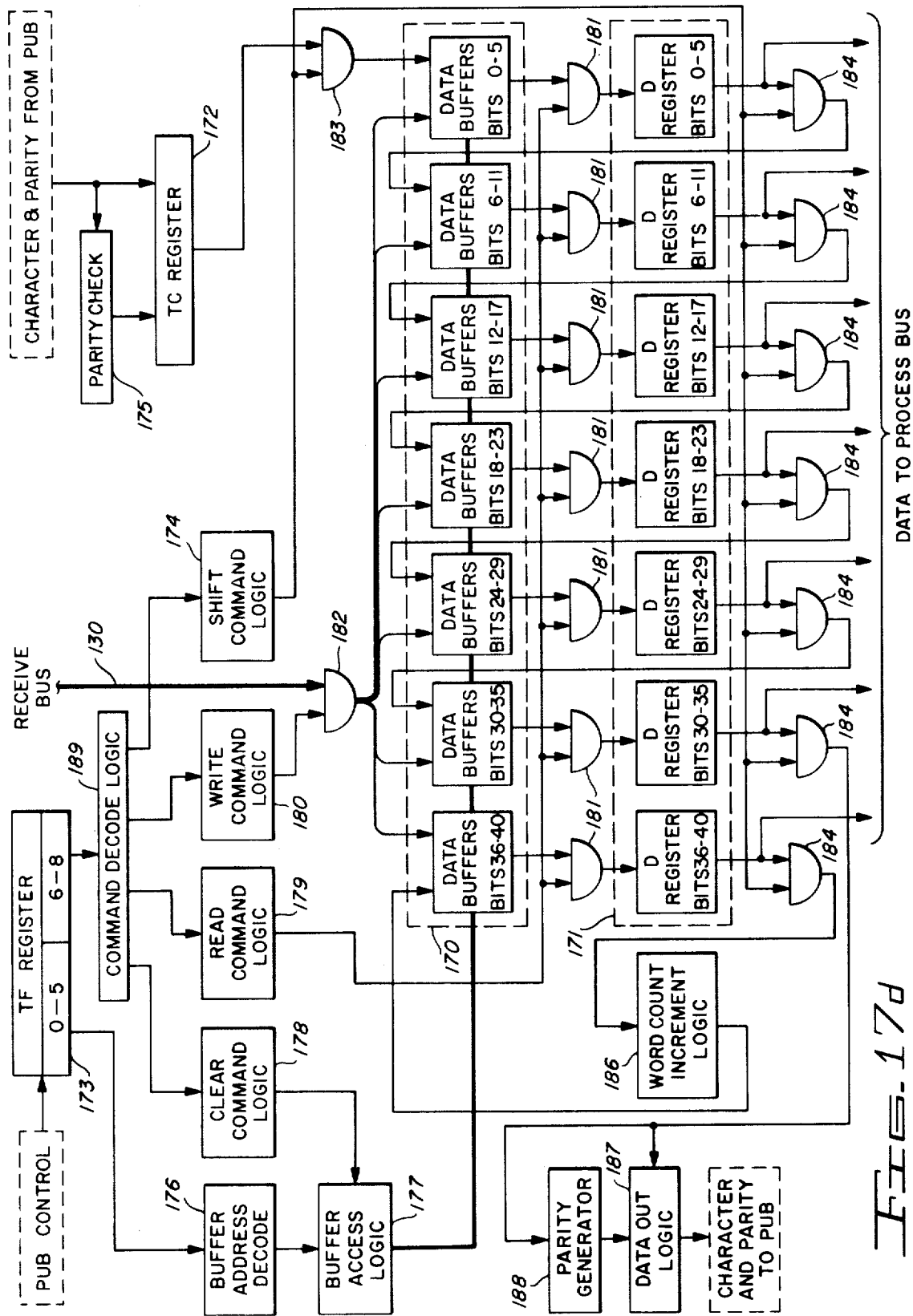

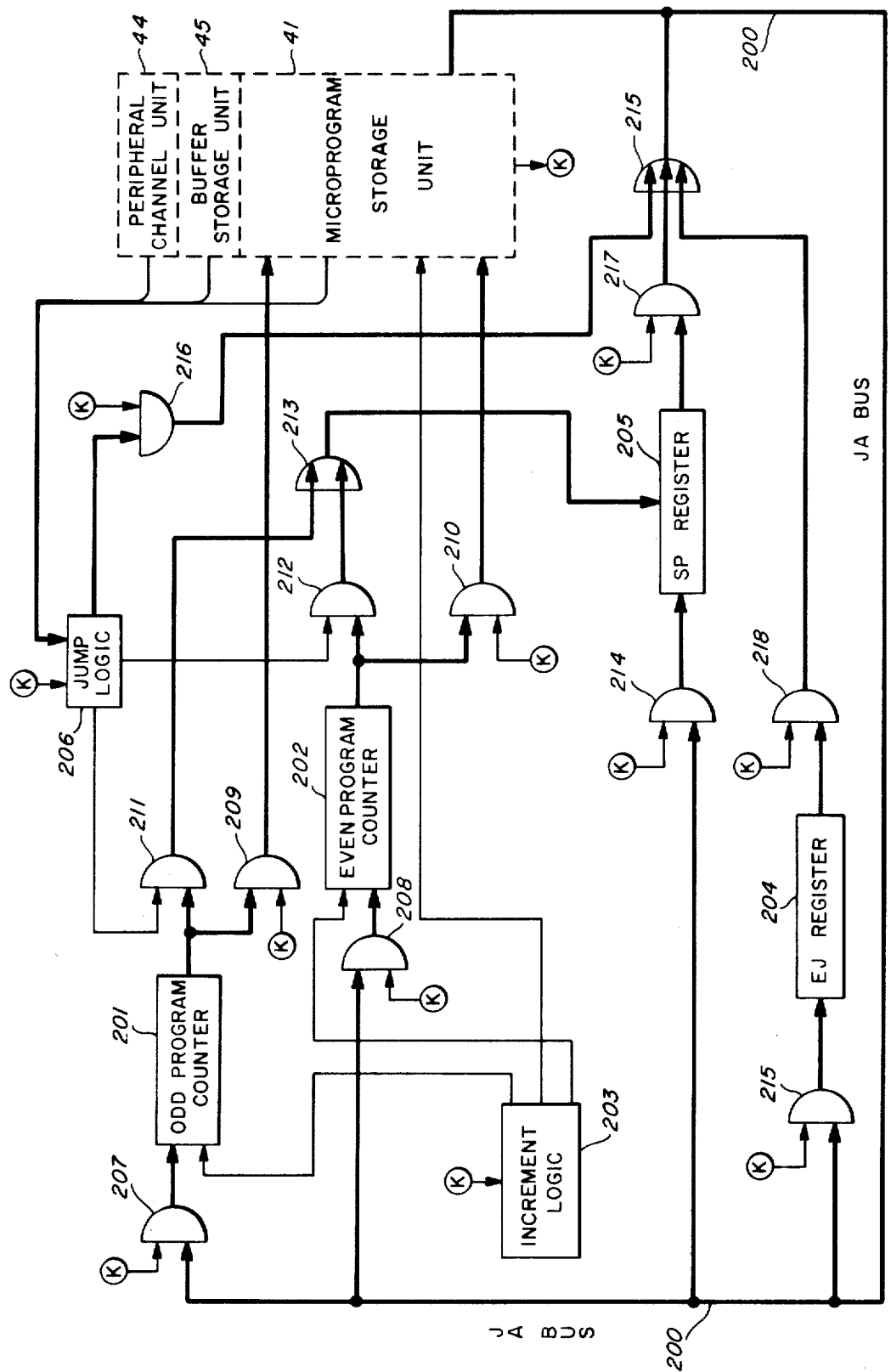

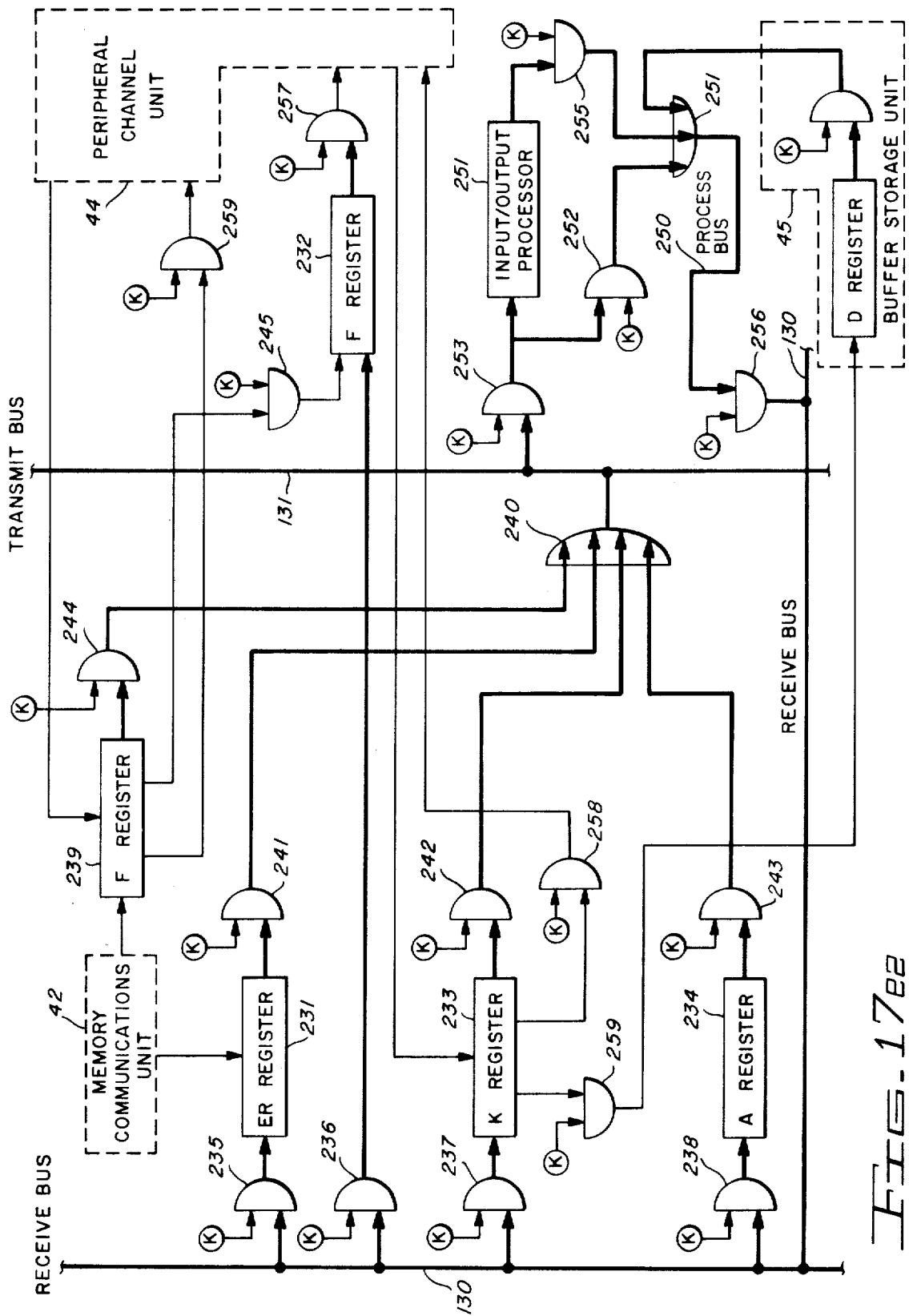

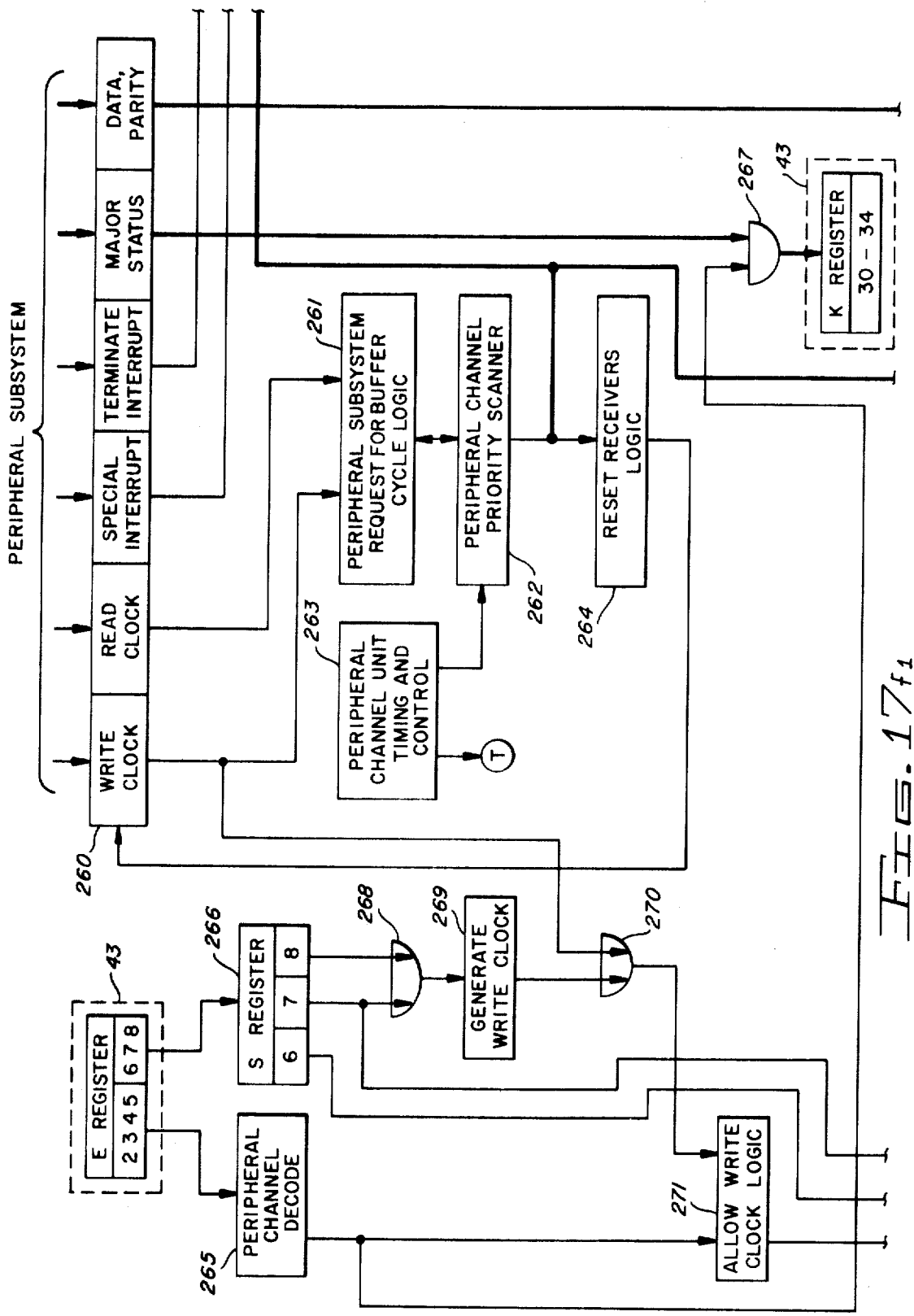
FIG. 17f1

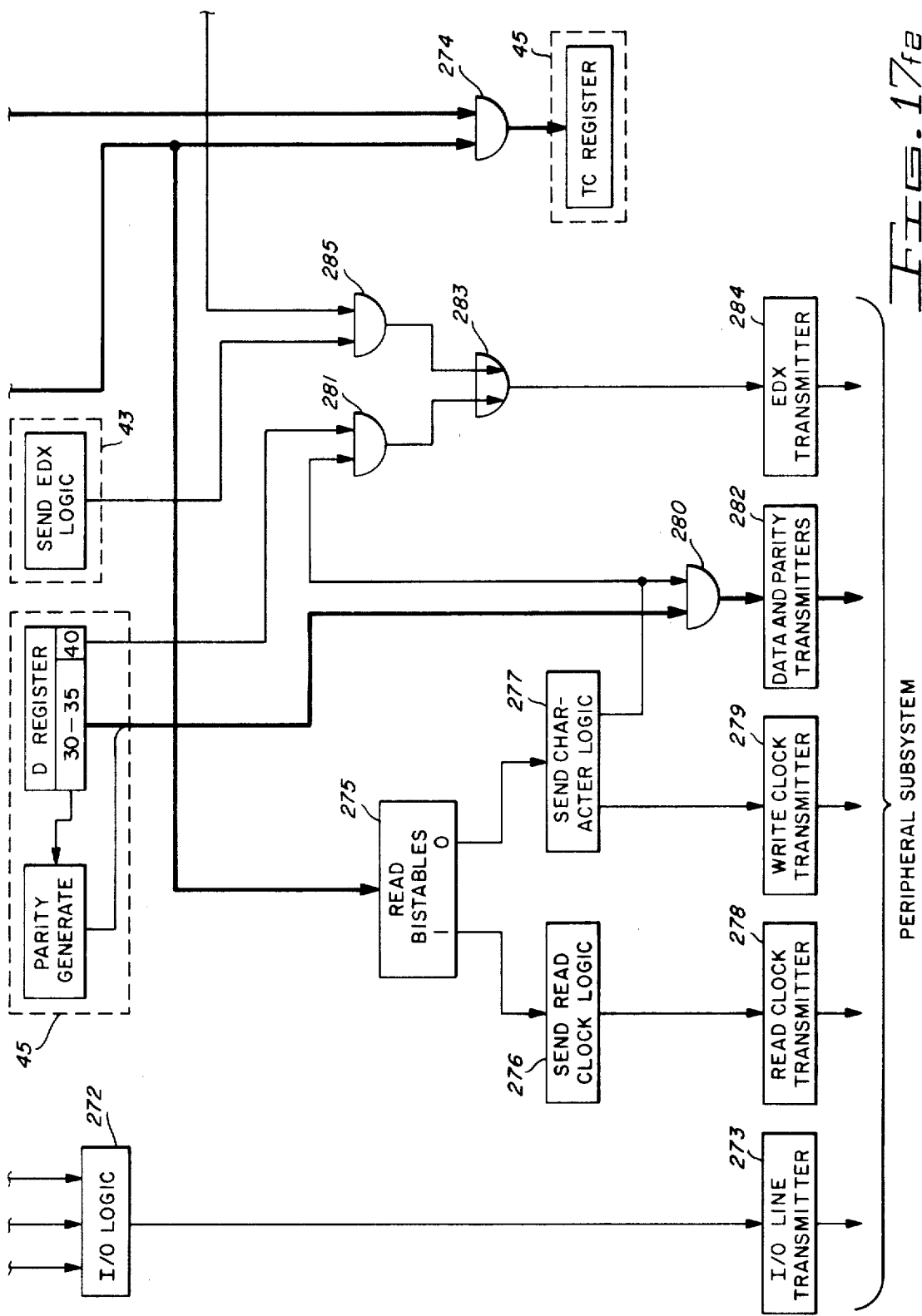

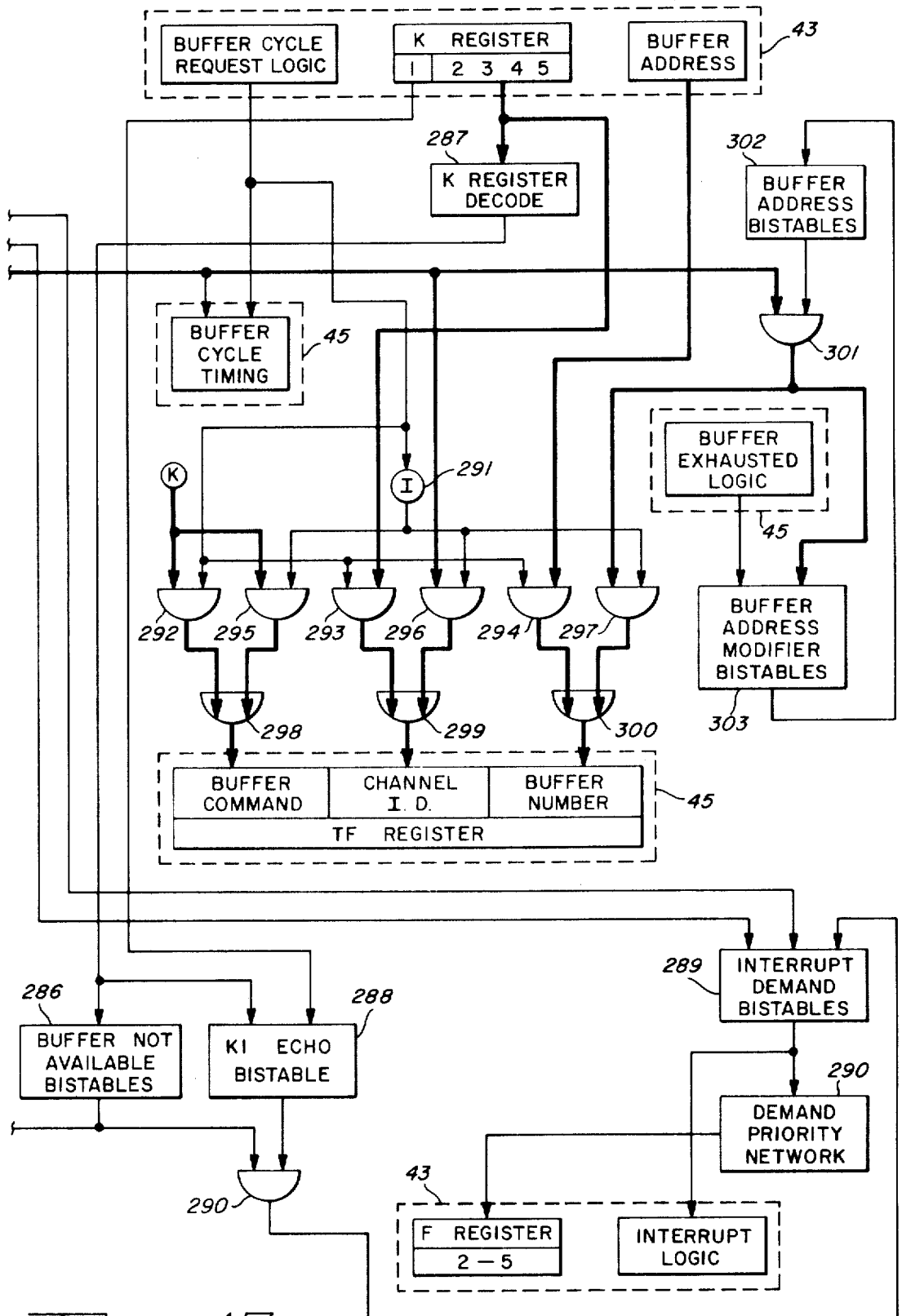

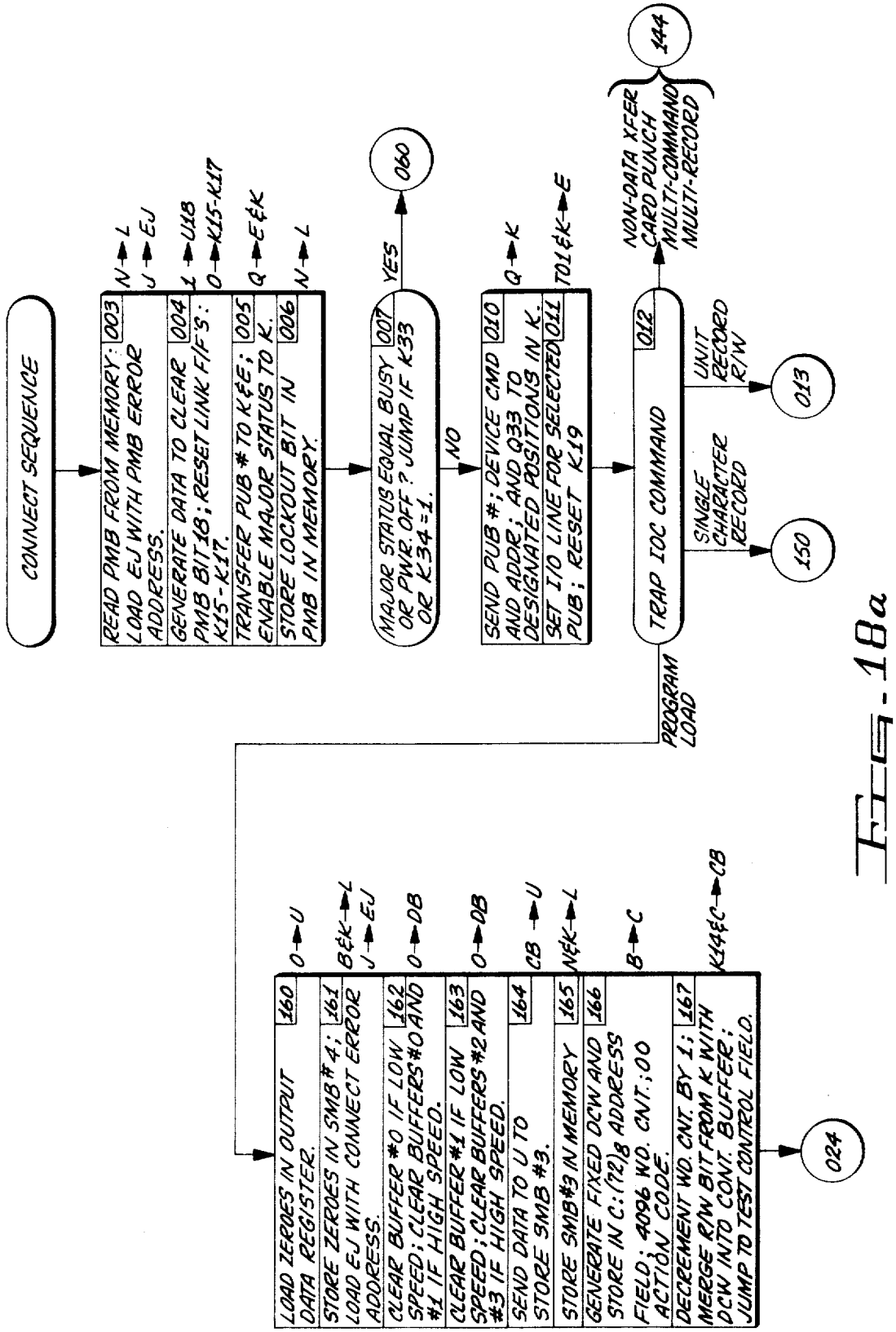

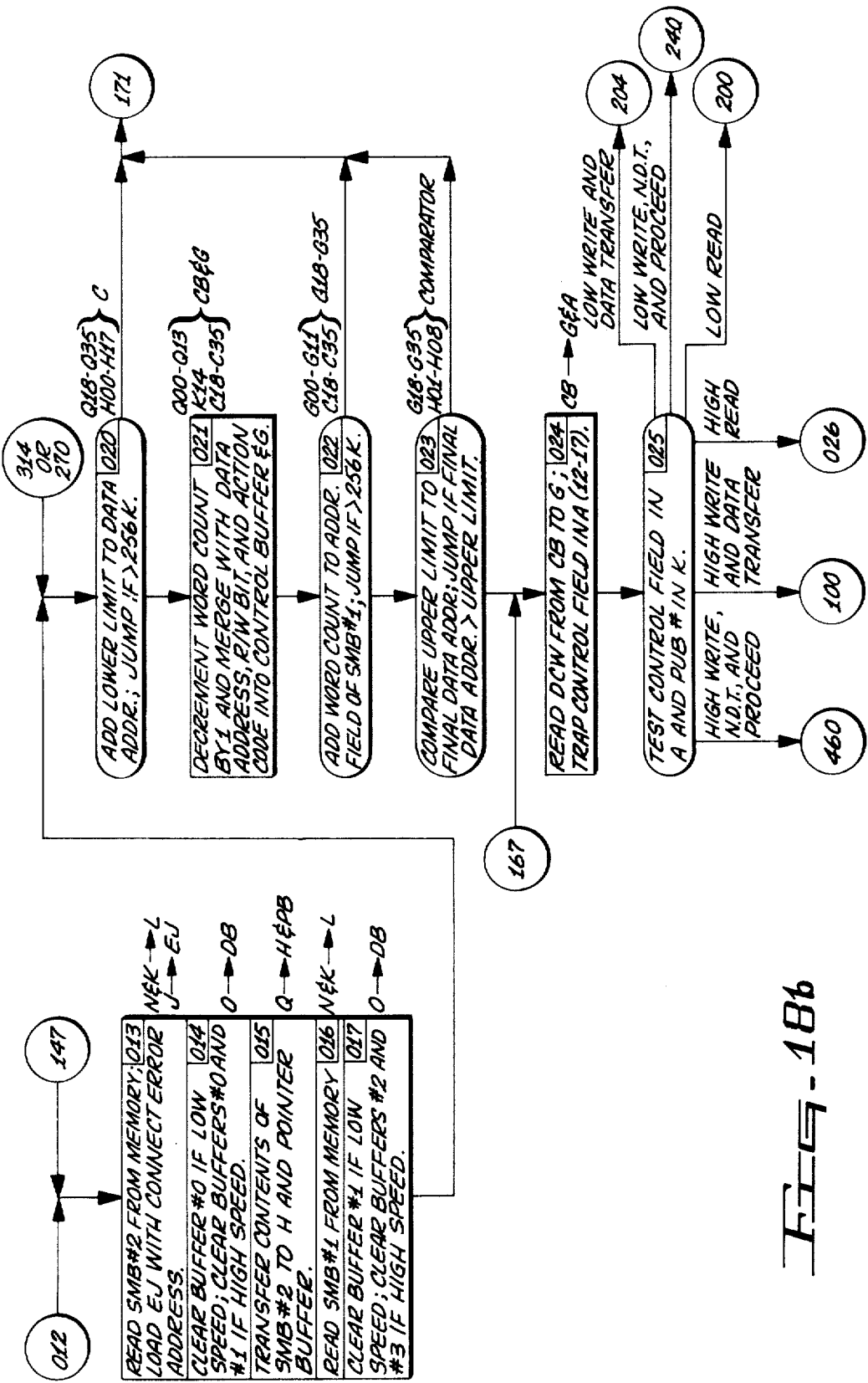

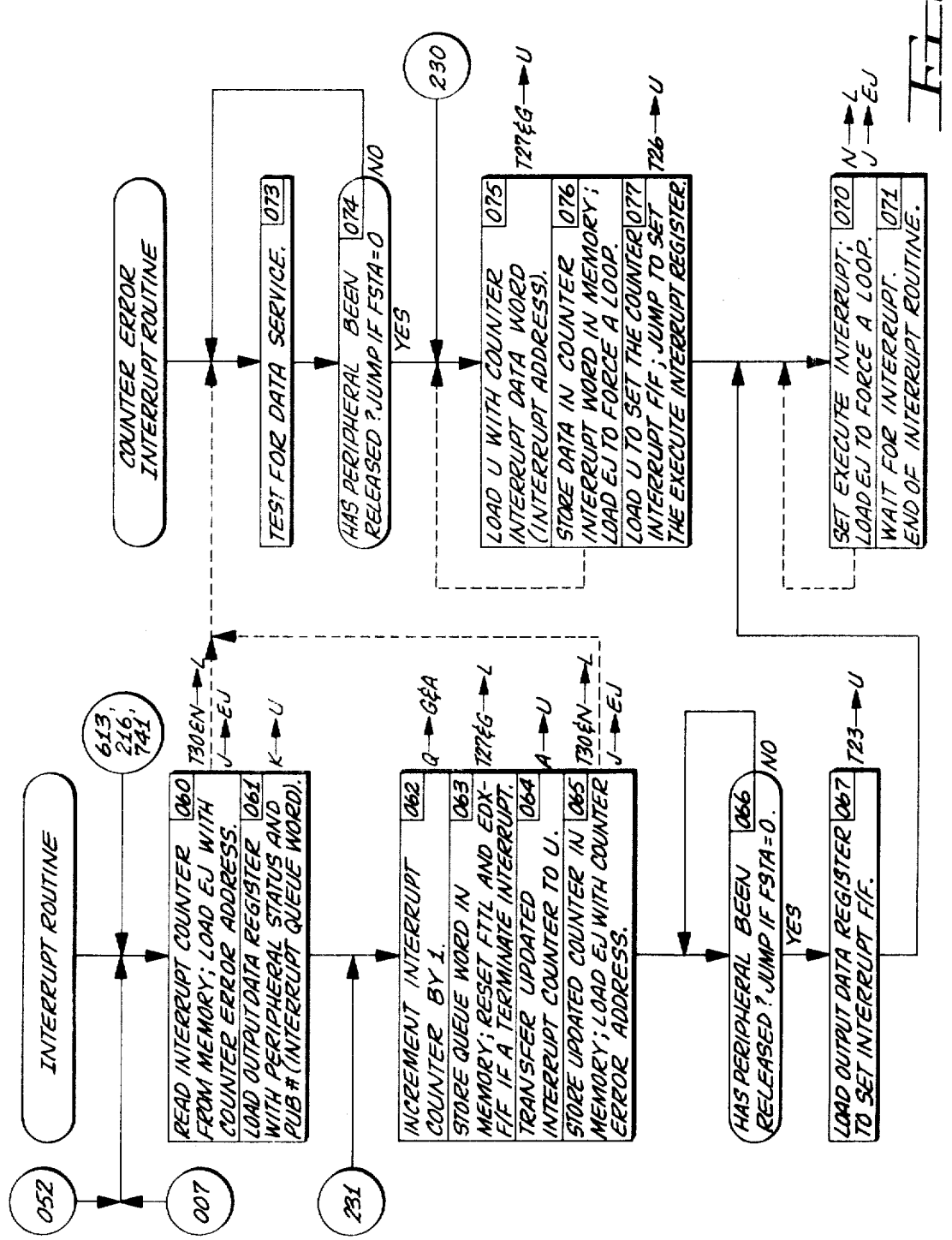

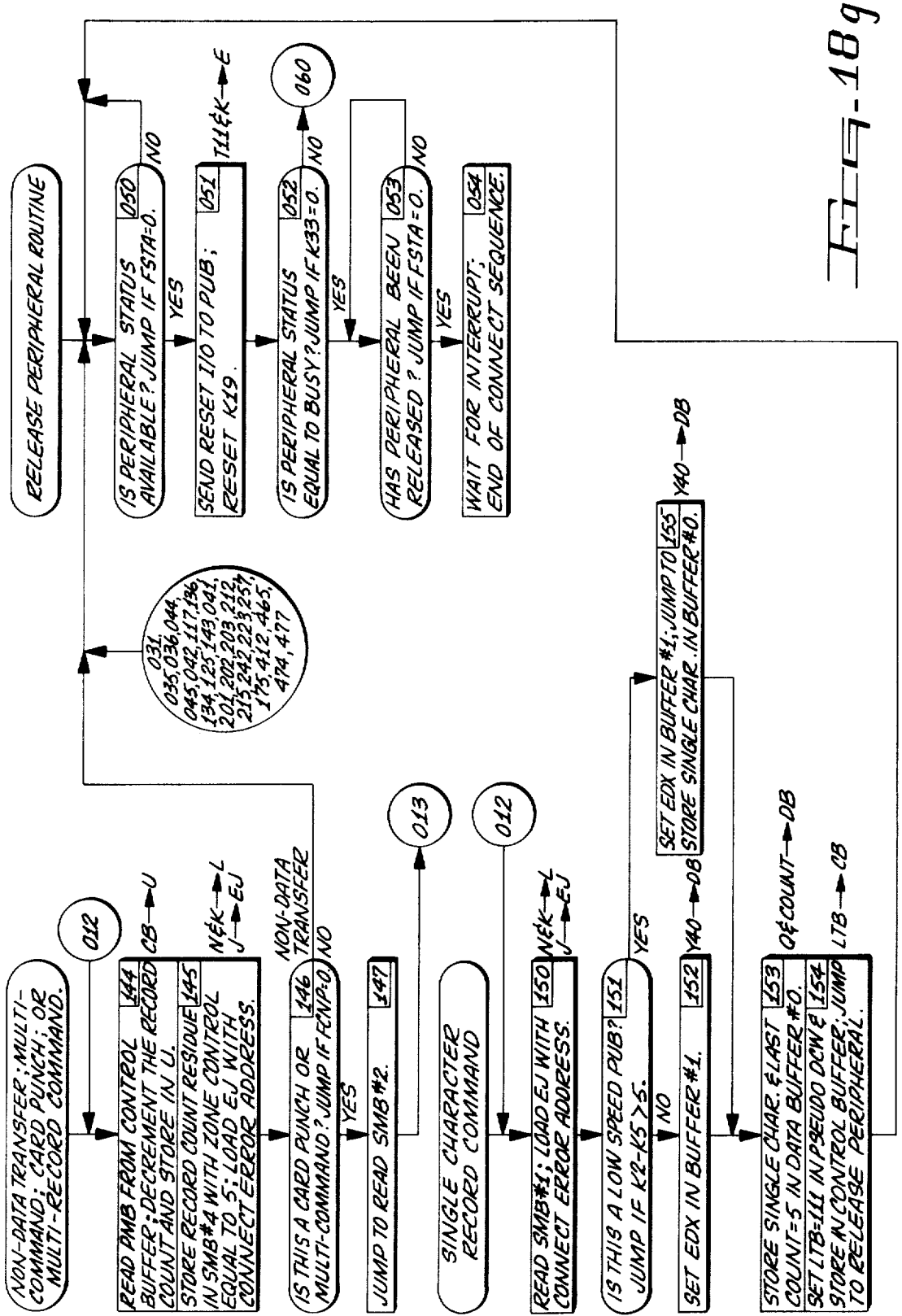

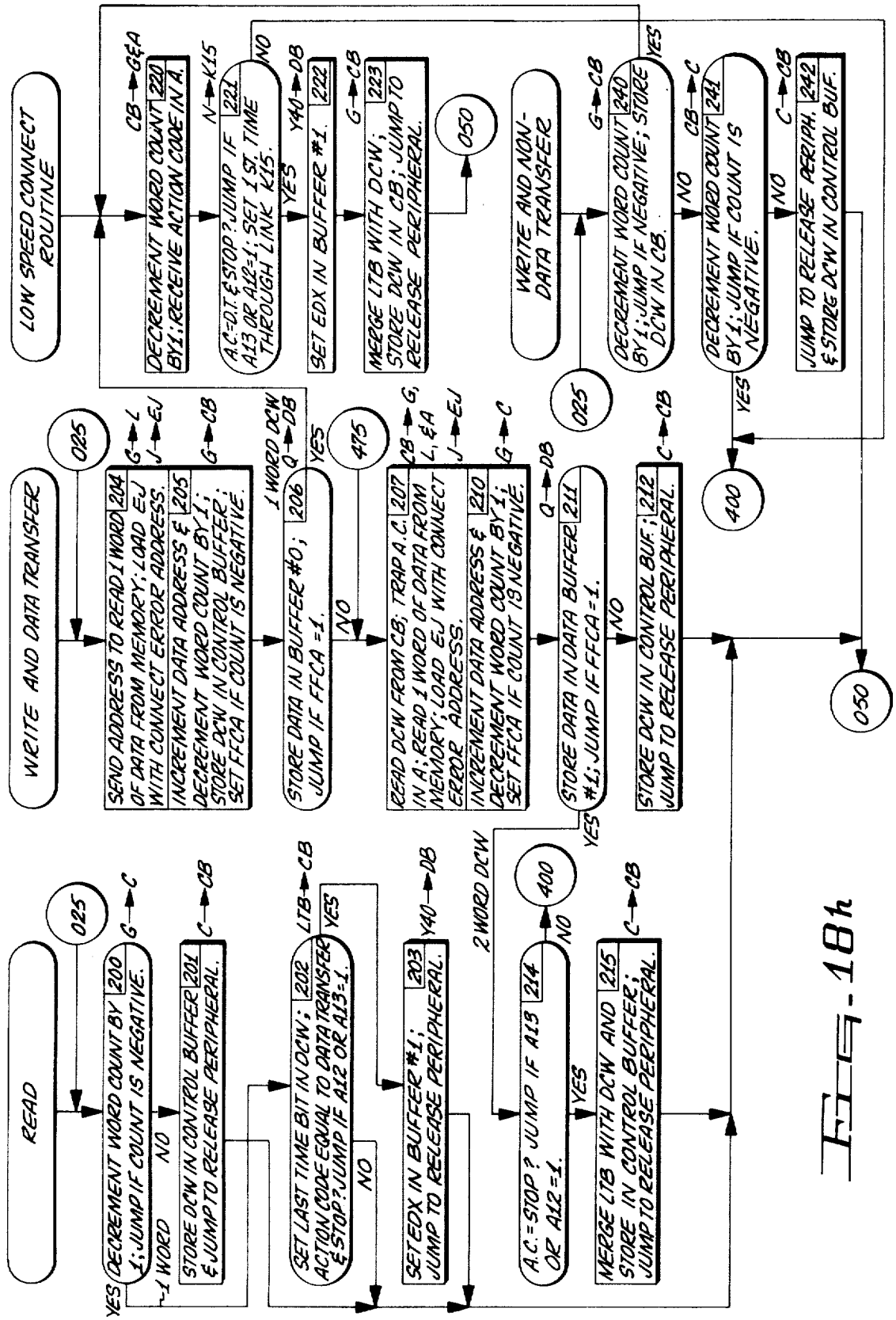
FIG_18h

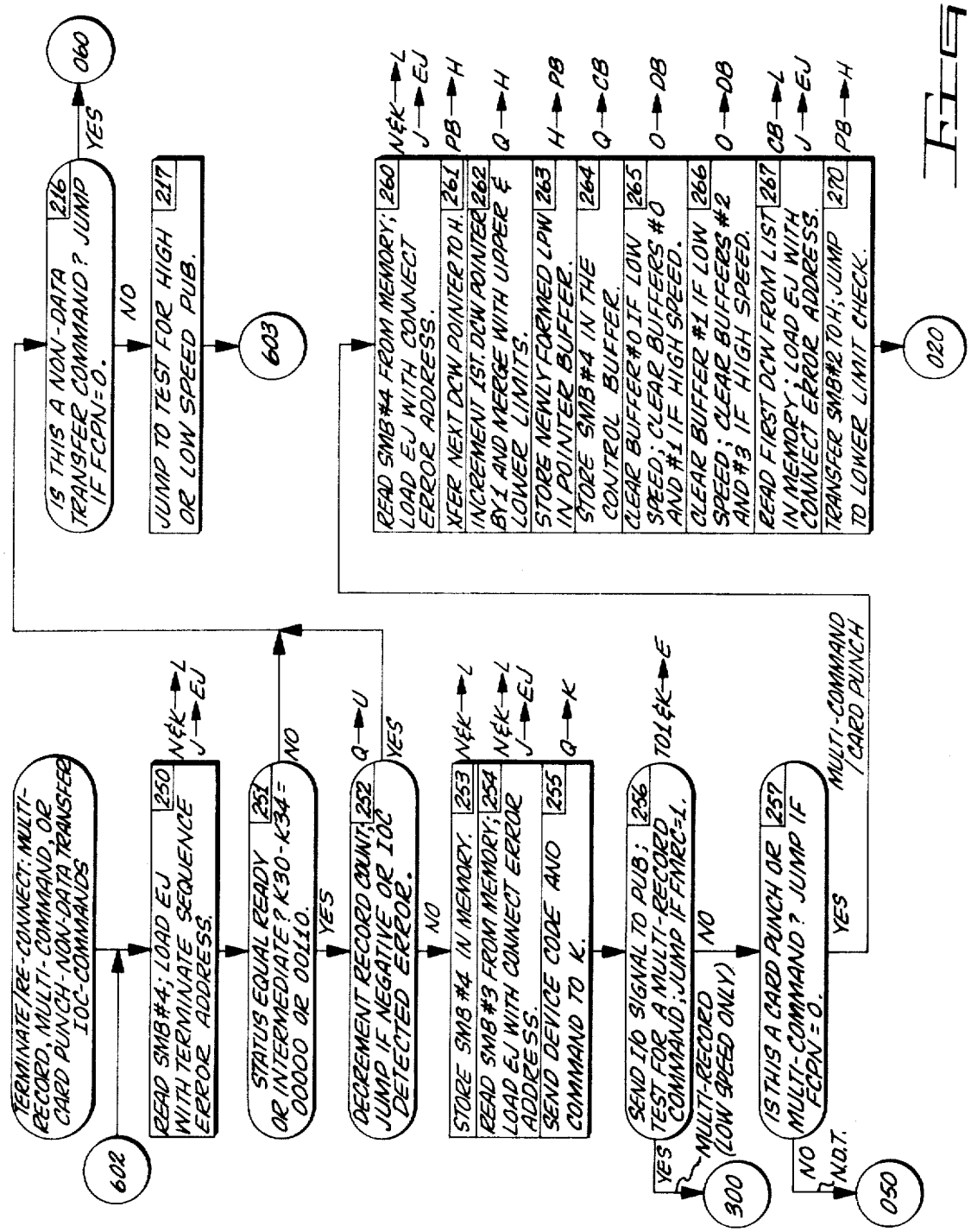

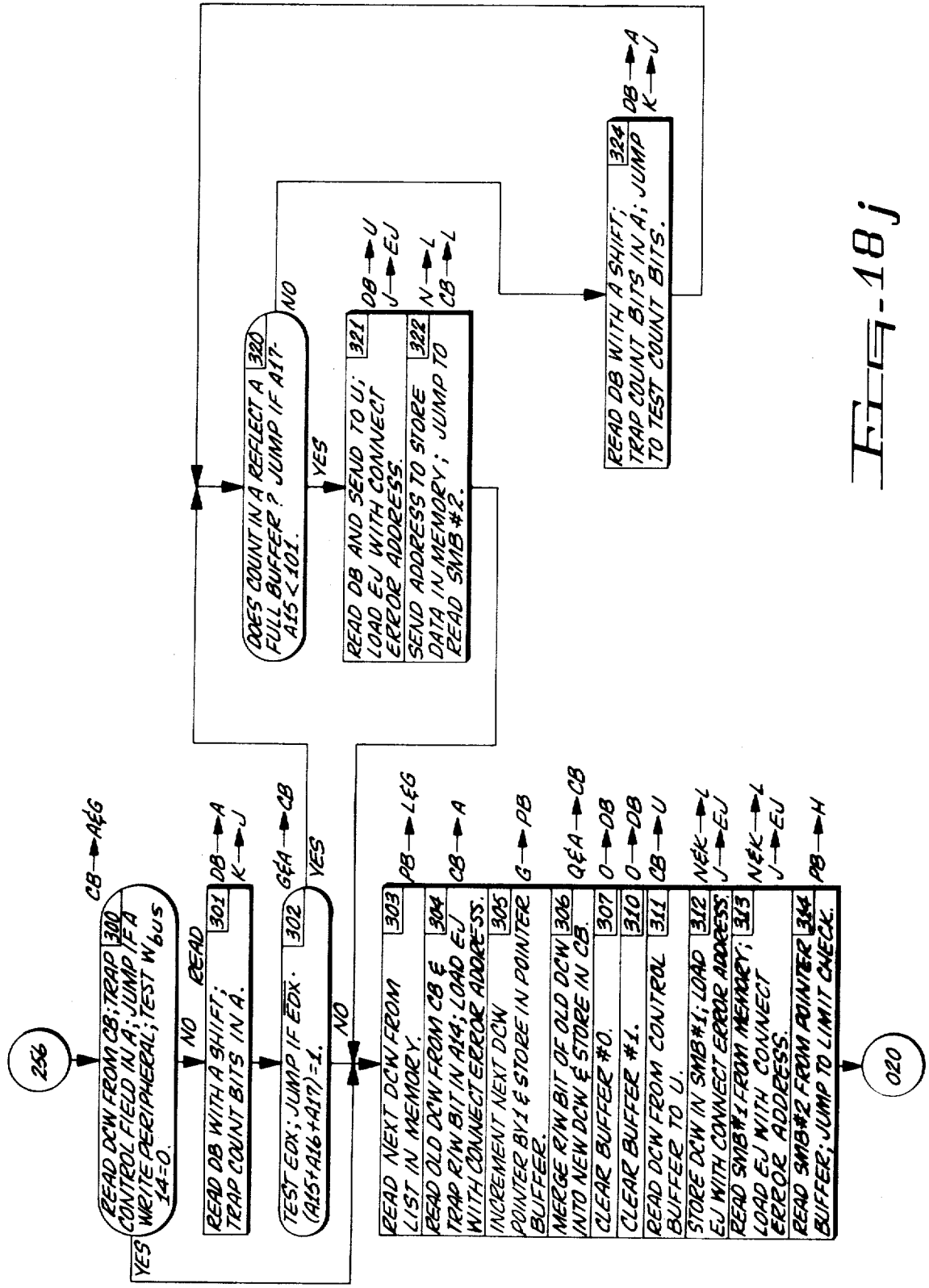

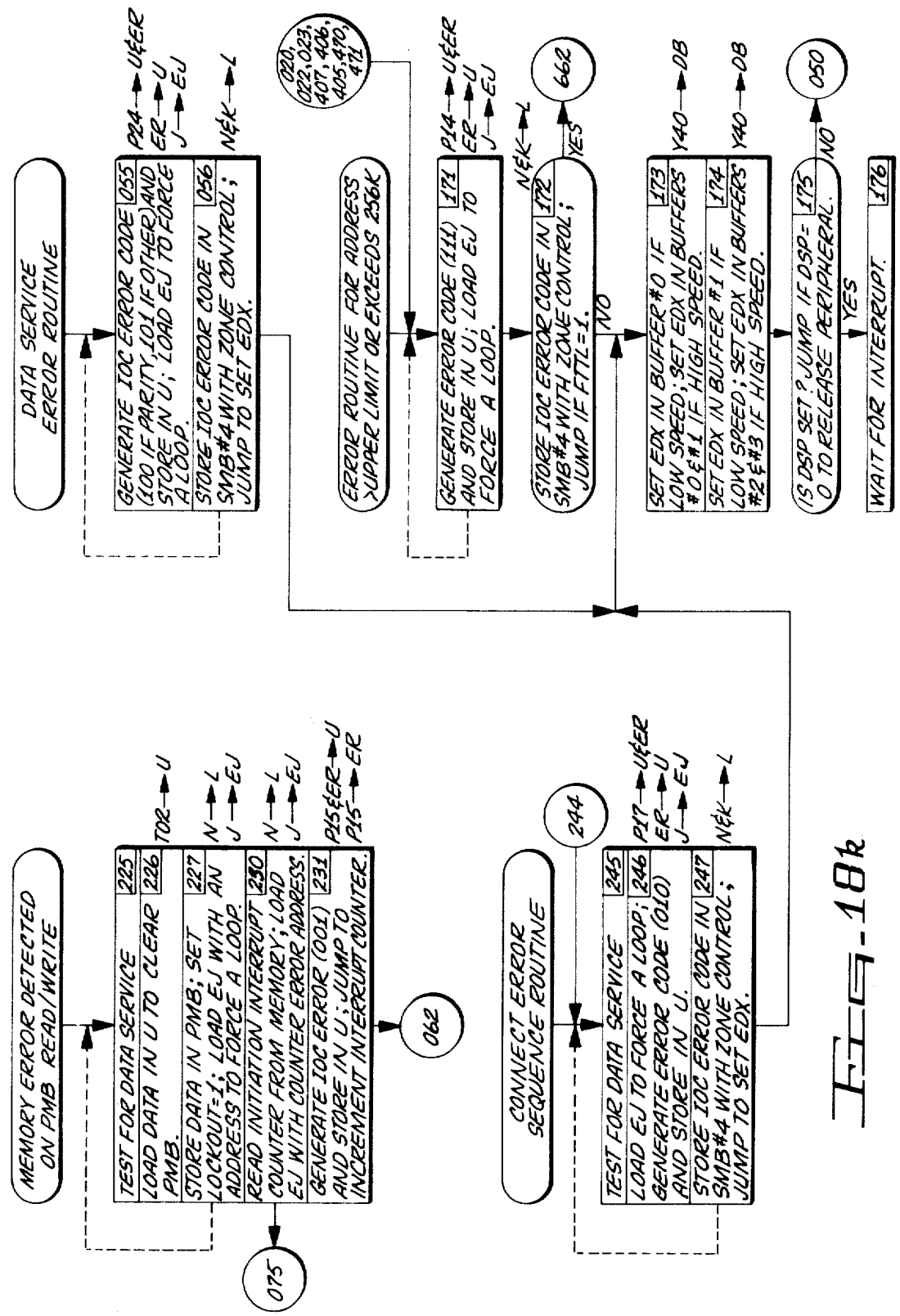

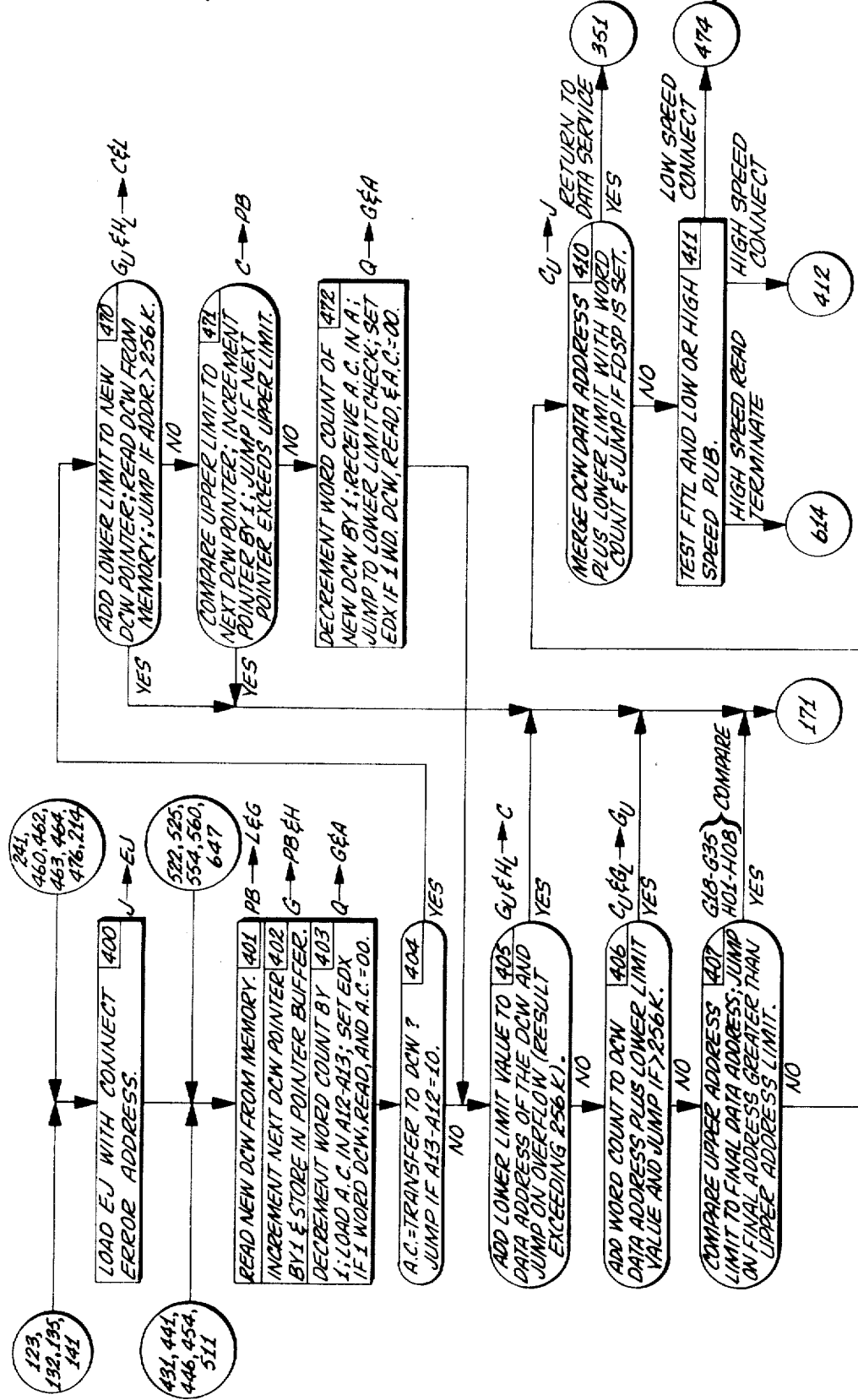

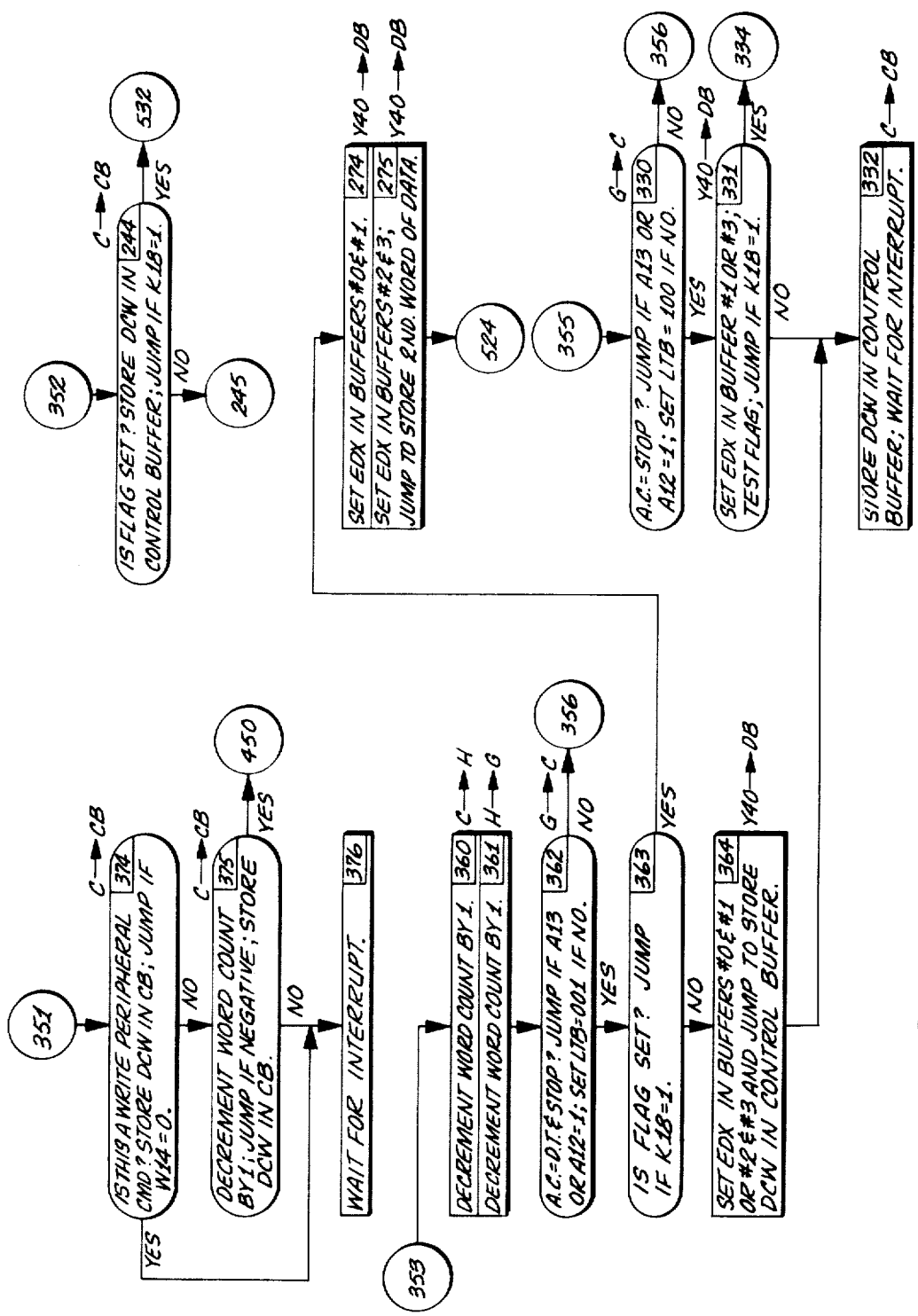

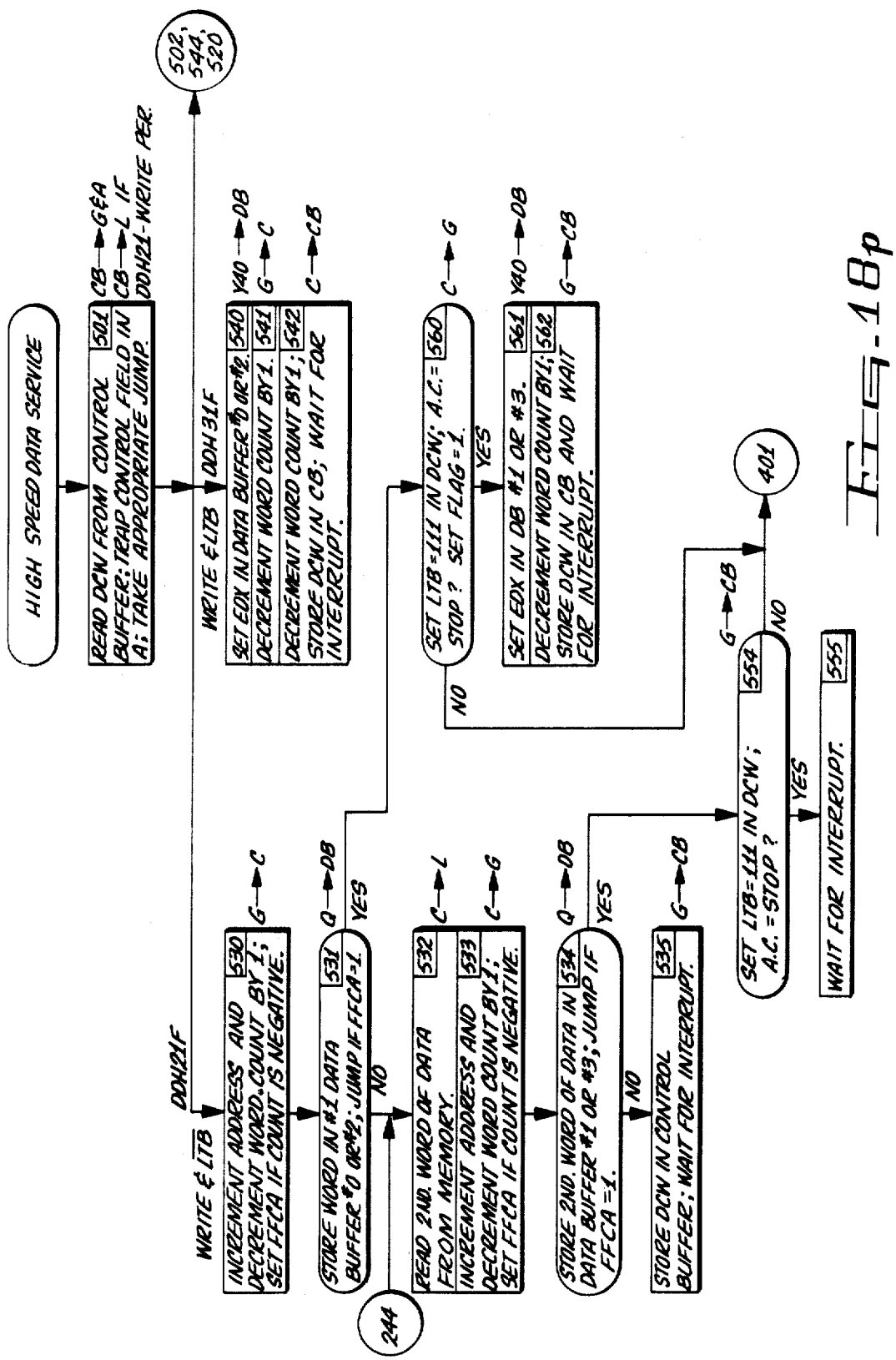

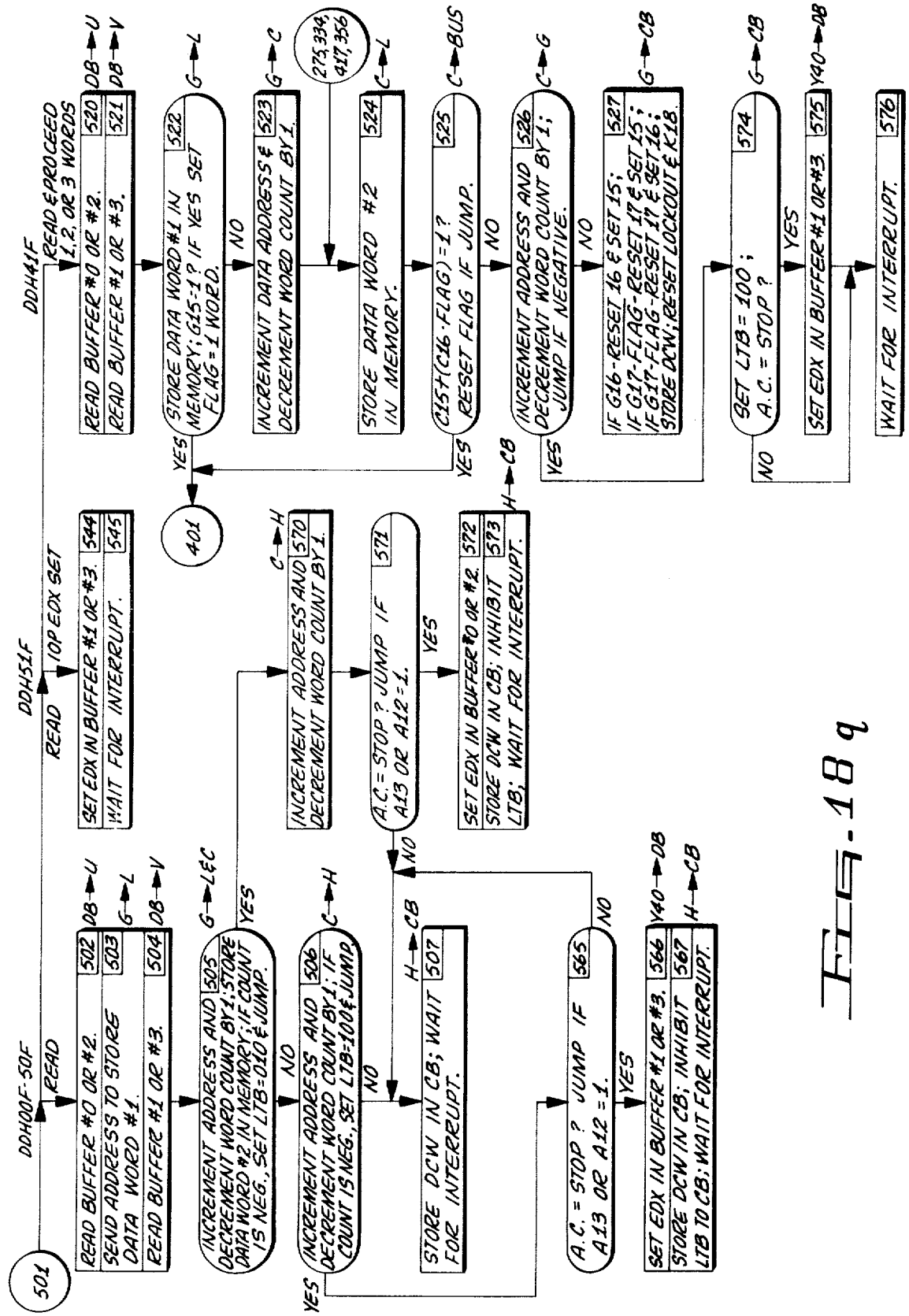

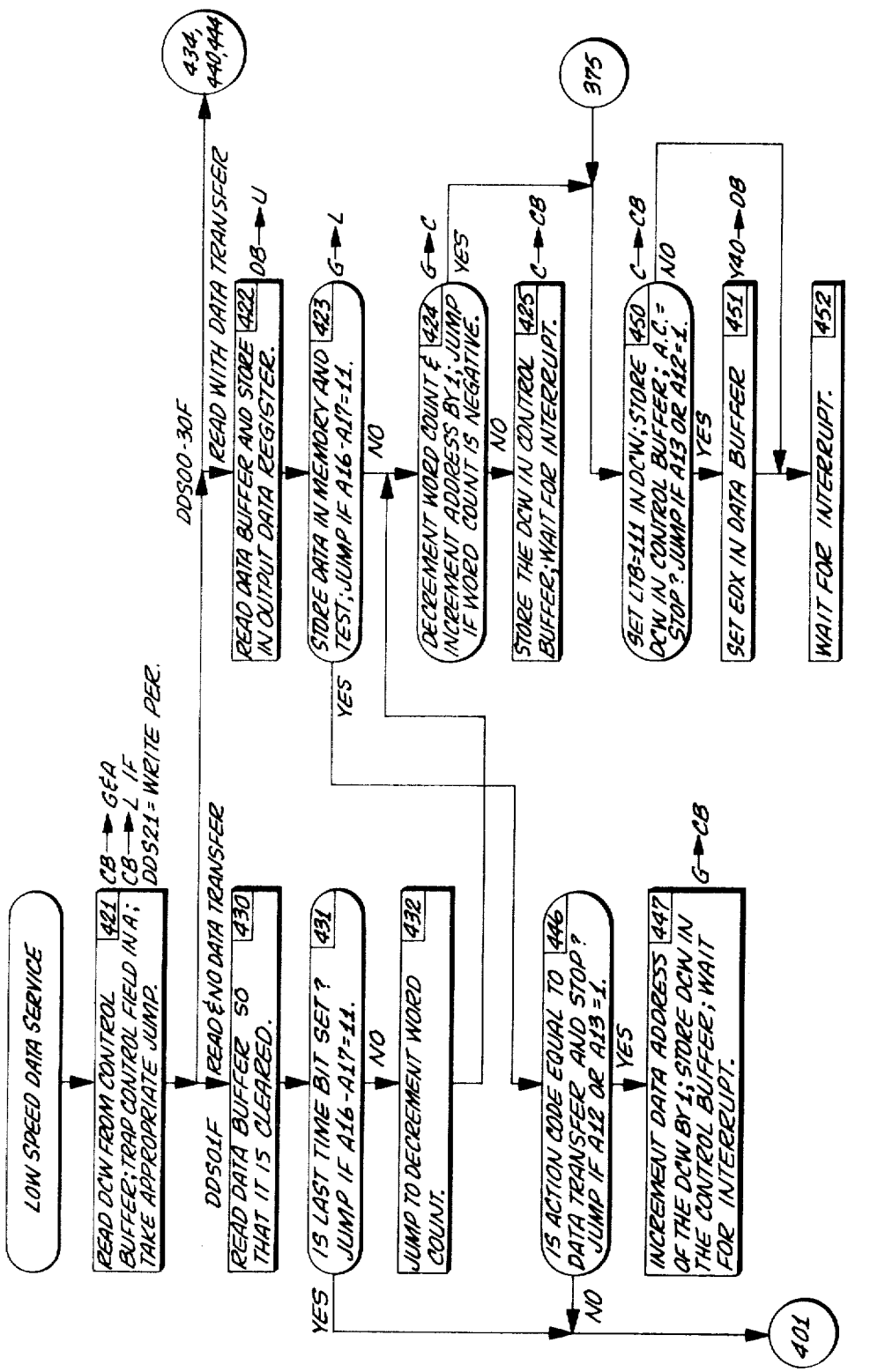

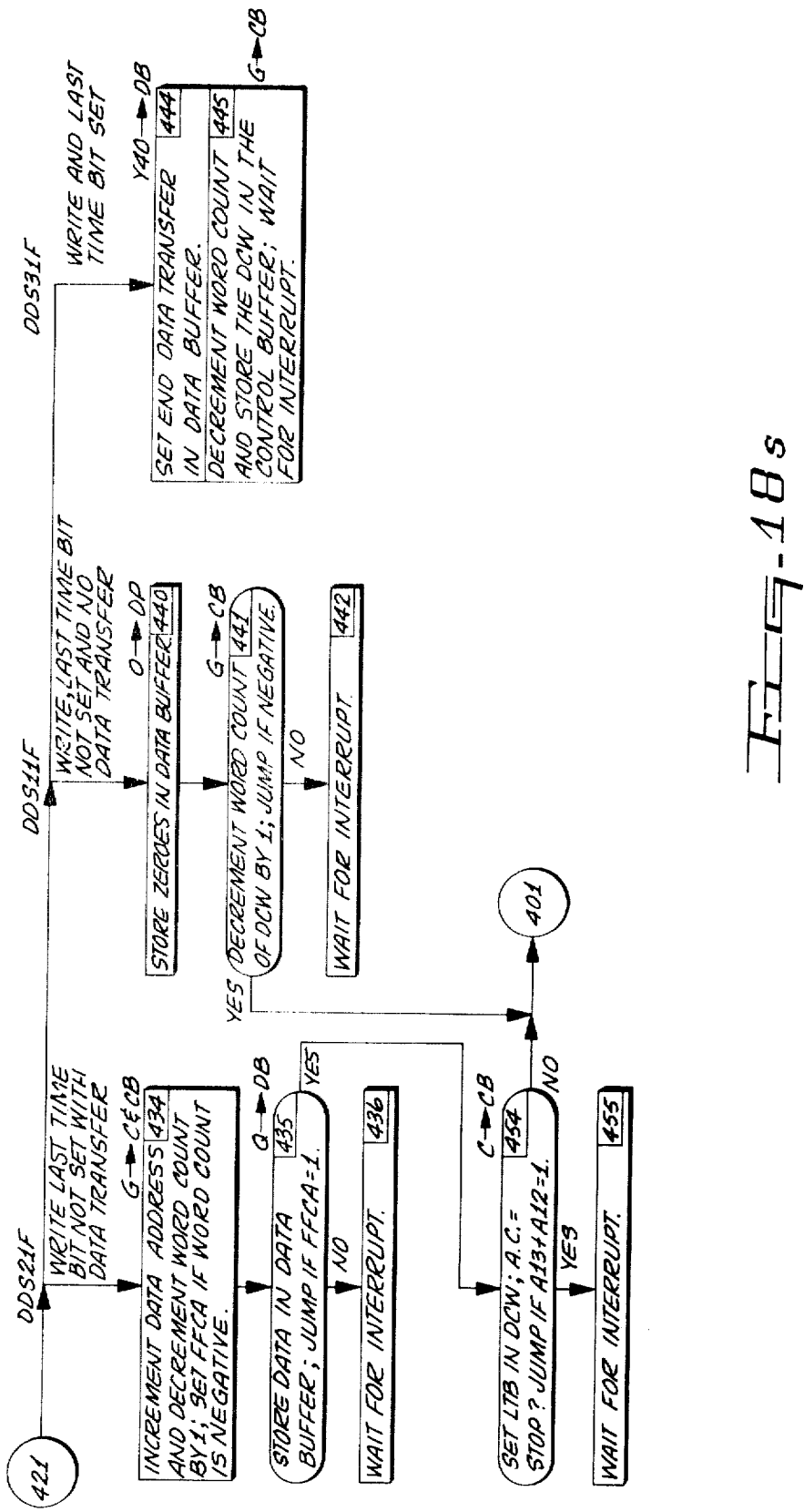

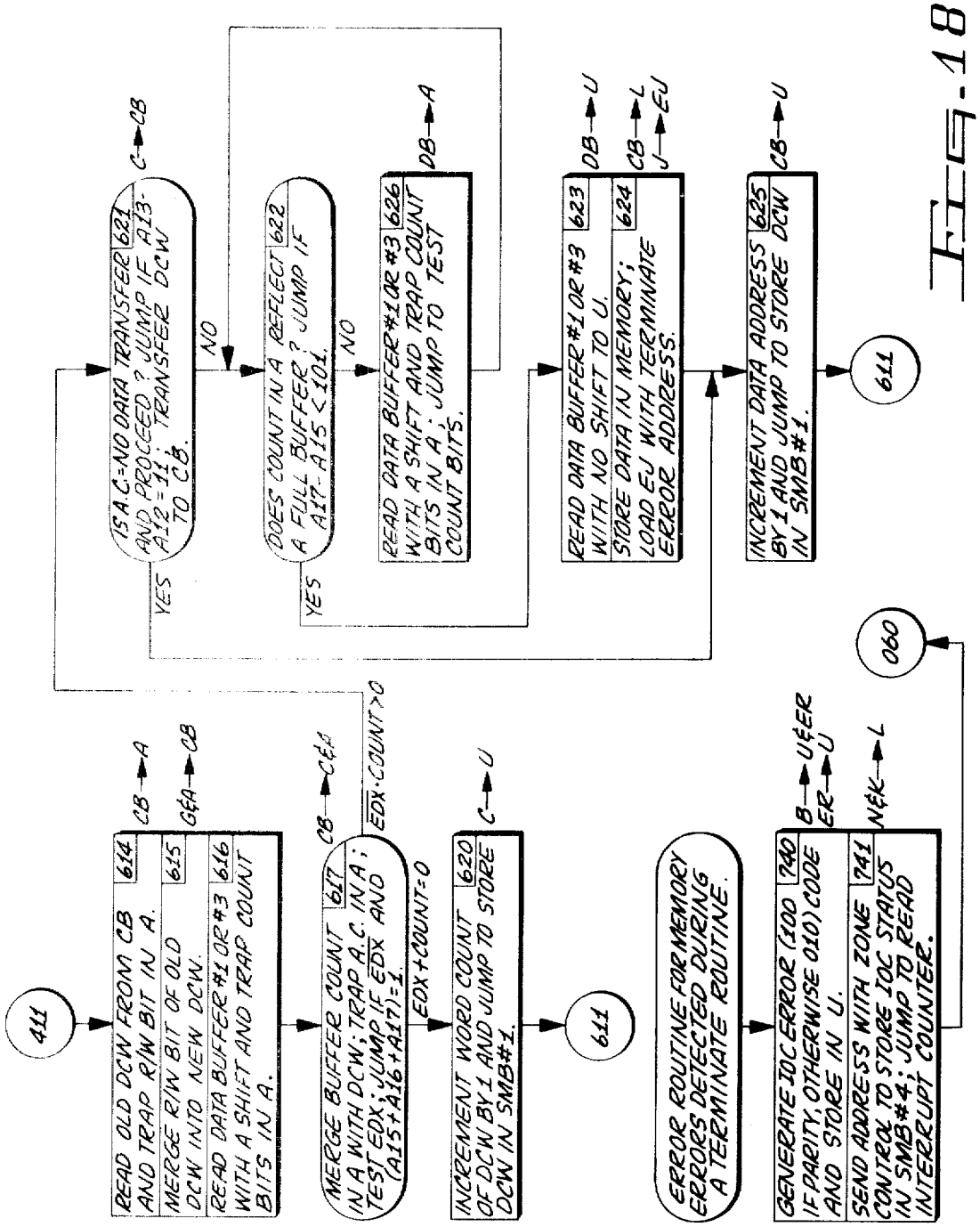

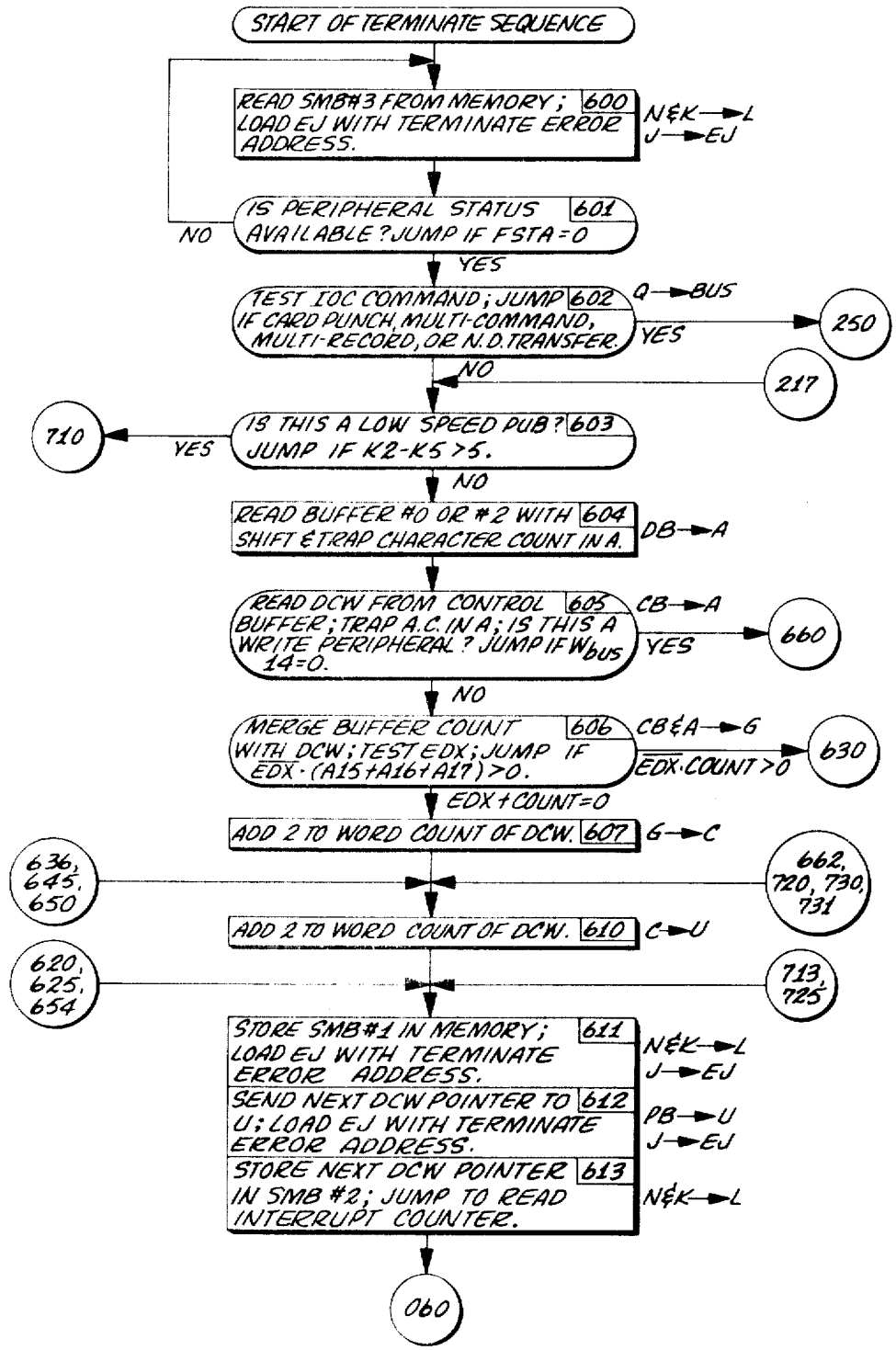

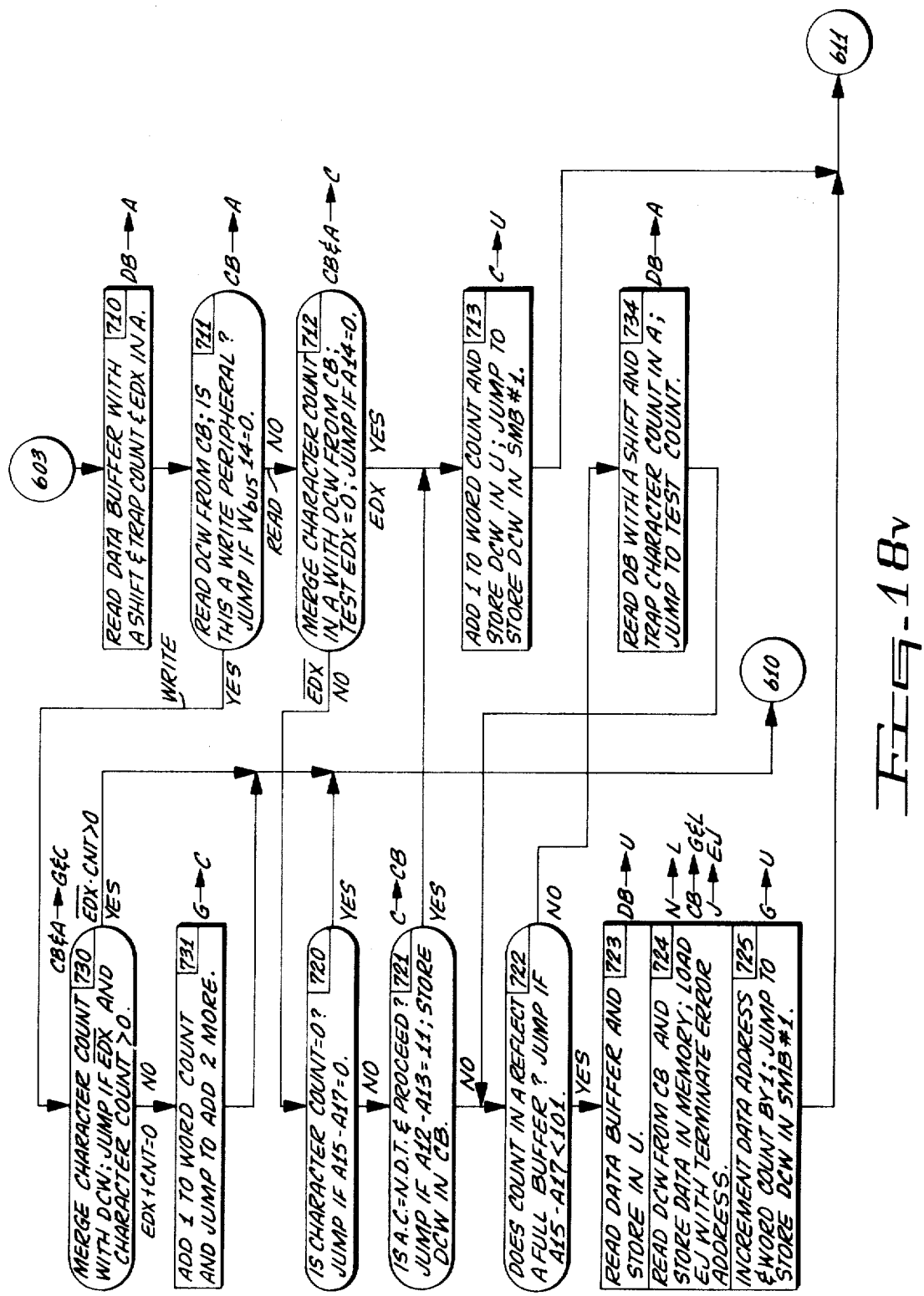

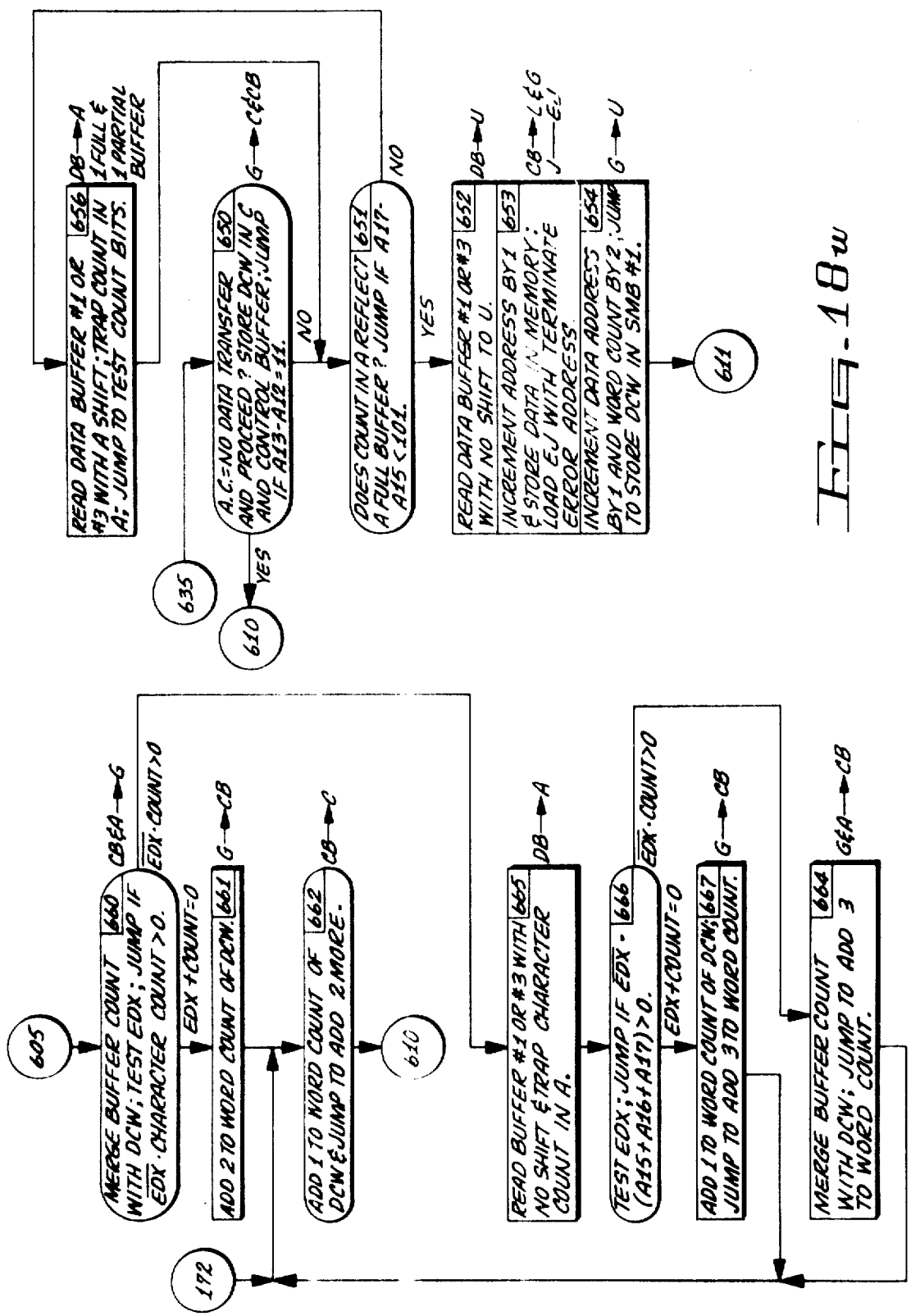

United States Patent Office 3,559,187
Patented Jan. 26, 1971

3,559,187
INPUT/OUTPUT CONTROLLER WITH LINKED
DATA CONTROL WORDS
John W. Figueroa, Palo Alto, Calif., William J. Morgan,
Phoenix, Ariz., and Rolland R. Rasmussen, Ridgecrest,
Calif., assignors to General Electric Company, a corporation of New York
Filed Nov. 13, 1968, Ser. No. 775,464
Int. Cl. G06f 15/16, 15/20, 3/00
U.S. Cl. 340—172.5                                6 Claims

ABSTRACT OF THE DISCLOSURE

In order to increase the throughput of an input/output controller within a modular data processing system, apparatus is provided within the input/output controller for transferring information across an interface to a memory at an increased rate within the constraints imposed by the interface. Information is transferred in accordance with data control words. Means are provided whereby a first data control word is used until its word count field is exhausted and in anticipation of this, another data control word may be fetched in order that information transfer may continue.

BACKGROUND OF THE INVENTION

In a modular configured data processing system, interface criteria for communicating modules must be defined with a certain strictness to realize the full benefit of modularity. A primary benefit flowing from the utilization of a design philosophy incorporating modularity is found in the possibility of substituting improved modules as they become available or substituting more powerful modules as system requirements expand. Thus, a data processing system may be updated and/or expanded in an economically feasible stratagem while obsolescence is avoided. Manifestly, the module interfaces must be determined with the utmost care inasmuch as they become design constraints upon the module progeny.

In a modular data processing system, the function of an input/output controller is to relieve the software of continual supervision of input/output activity. Typically, the management control program, after detection and analysis of a condition calling for input/output activity, issues an IOC command which is ultimately accepted by the input/output controller. In response to the command, the input/output controller directs a specified peripheral subsystem to perform a designated operation, monitors and supervises the progress of the operation, recognizes the termination of the operation, and responds to the termination by providing a commensurate indication to the management control program. An exemplary modular data processing system incorporating an input/output controller is disclosed in U.S. Patent 3,409,880. In that system, communications between the management control program and the input/output controller is indirect; i.e., the information communicated is stored in predetermined storage locations within a memory accessible by both the input/output controller and a processor executing the management control program.

As higher speed peripheral devices become available, a problem arises in chaneling the information across the predetermined interfaces. Certain known techniques are helpful in improving the high speed throughput across established interfaces. For example, increased throughput across the interfaces of an input/output controller can be achieved by expanding the buffering at each interface. By providing extensive buffering, throughput across an interface capable of passing a single unit of information, such as a single character or a single word, can approach the throughput which would be possible if the interfaces were two information units wide. In effect, a pseudo burst mode of information transfer can be realized with extensive buffering. Clearly, however, additional buffering quickly reaches a point of diminishing returns because of economic considerations.

Other factors in addition to the interface constraints affect the benefits afforded by a straightforward increase in buffering. Information transfer through an input/output controller, such as that disclosed in U.S. Patent 3,409,880 referenced above, takes place in accordance with data control words retrieved from the memory in response to certain IOC commands. Typically, the data control word comprises several information fields including an address field designating the location in memory of the first word of a data block to be transferred between the memory and a peripheral device and a word count field which specifies the number of words to be transferred. Under certain conditions, it is possible and desirable to link data control words whereby a first data control word is used until its word count field is exhausted and another data control word is fetched such that information transfer may continue. Where substantial buffering has been provided, the eventuality will be perceived of a data control word's count field exhausting with a plurality of words remaining in the buffers; i.e., one word in the buffers is associated with the exhausting data control word while the remainder of the information in the buffers is associated with the succeeding control word. When this condition is encountered, much of the advantages afforded by the additional buffering is lost in the time consumed to reorient the information in the buffers to be meaningful in the transfer continued under control of the new data control word.

BRIEF DESCRIPTION OF THE INVENTION

It is a broad object of this invention to provide an improved input/output controller for a modular data processing system.

It is another object of this invention to provide an input/output controller for achieving increased throughput across a predetermined interface.

It is a more specific object of this invention to provide an input/output controller within a modular data processing system for effecting high speed data transfer between a memory and a peripheral device utilizing linked data control words in coordination with buffer registers without excessive time penalty arising during passage of control of the data transfer from one data control word to a succeeding data control word.

These and other objects of this invention are achieved, according to one aspect of the invention, by providing double word buffering at the input/output controller-memory interface and quadruple word buffering for high speed peripheral channels which receive information, on a character-by-character basis, in burst mode; and by further providing apparatus within the input/output controller which functions to recognize the approach to exhaustion of the systematically decremented word count field of the data control word and responds to alert the input/output controller of the imminence of a condition calling for special microoperations to avoid the disruption of high speed data transfer. As high speed data transfer proceeds under control of a data control word, a three bit field in that data control word is modified and monitored by the input/output controller according to the IOC command being executed to determine whether or not a data word fetched under control of the data control word and held in the second of the double word buffers at the input/output controller-memory interface is to be saved and transferred to memory under control of the succeeding data control word in a link operation.

Additional objects of this invention, its advantages, scope, and the manner in which it may be practiced will become more readily apparent to persons conversant with the art from the following description of an exemplary embodiment taken in conjunction with the subjoined claims and the drawings of which:

FIG. 3 is a block diagram of a multi-processor data processing system in a configuration wherein two data processing systems overlap and share a plurality of input/output controllers;

FIG. 4 is a major block diagram of the input/output controller of a data processing system in which the instant invention is applicable;

FIGS. 5a–5i are symbolic diagrams illustrating the organization of the various types of words employed in the input/output controller of FIG. 4;

Figure 17C:
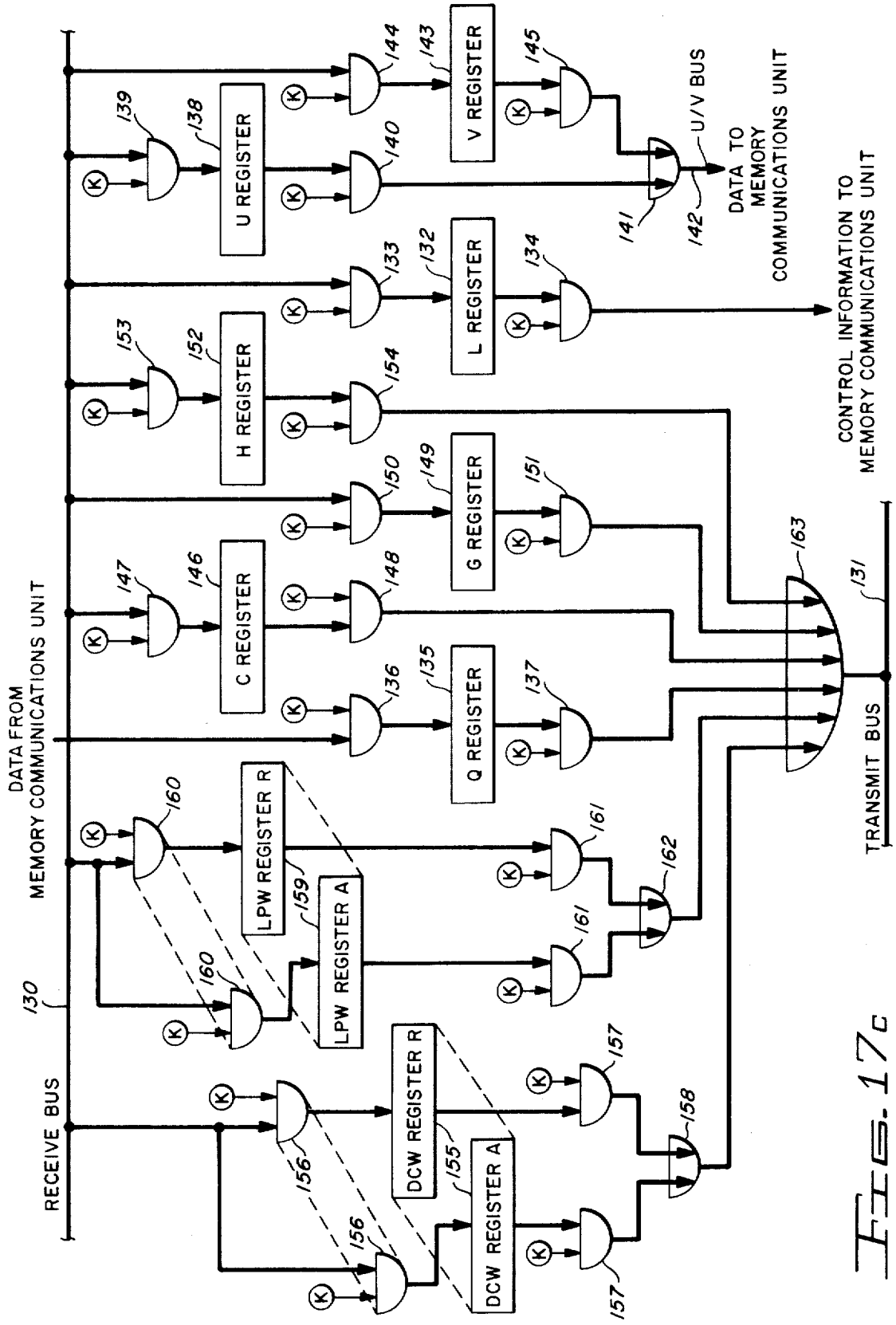
Figure 18C:
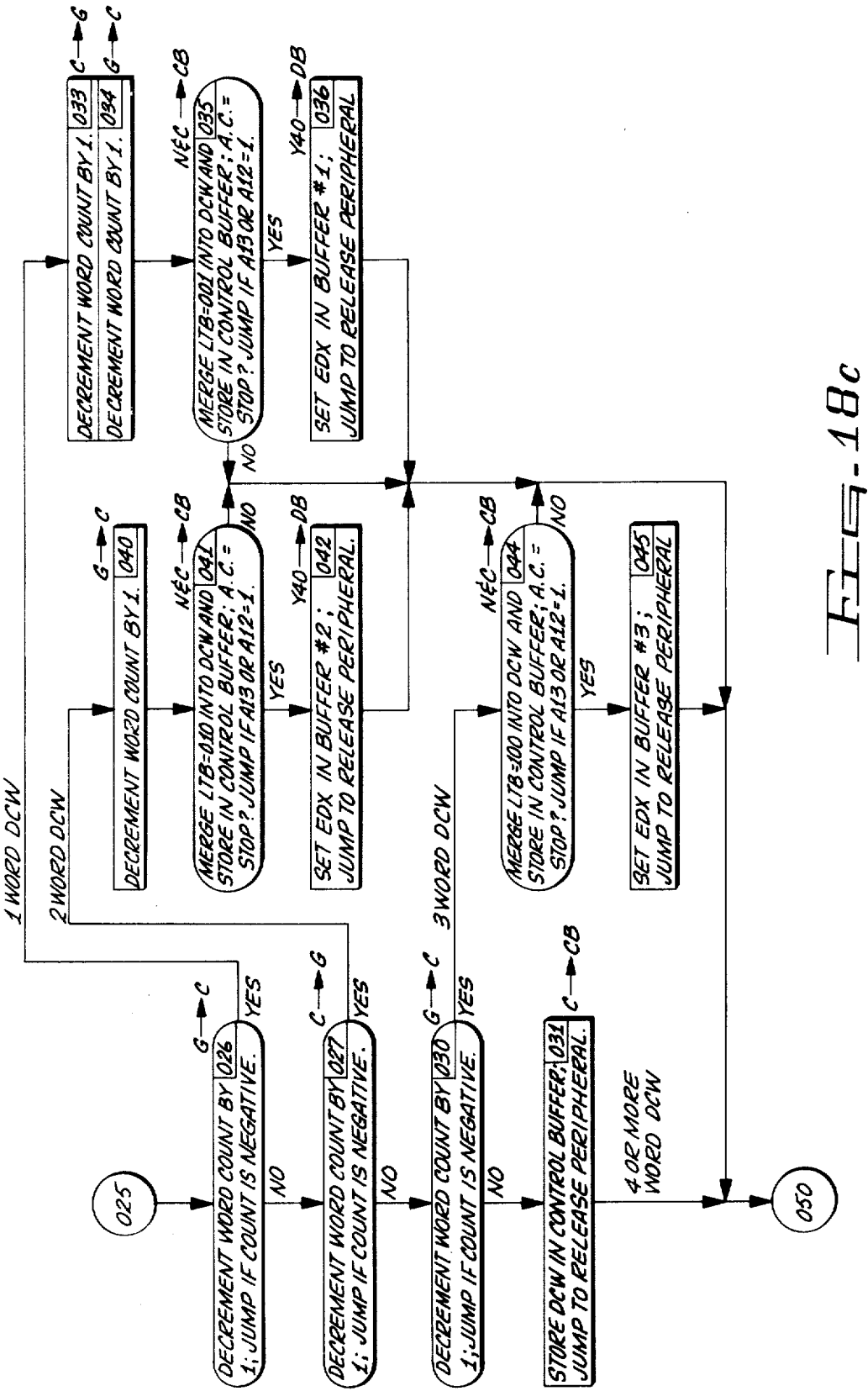
Figure 18E:
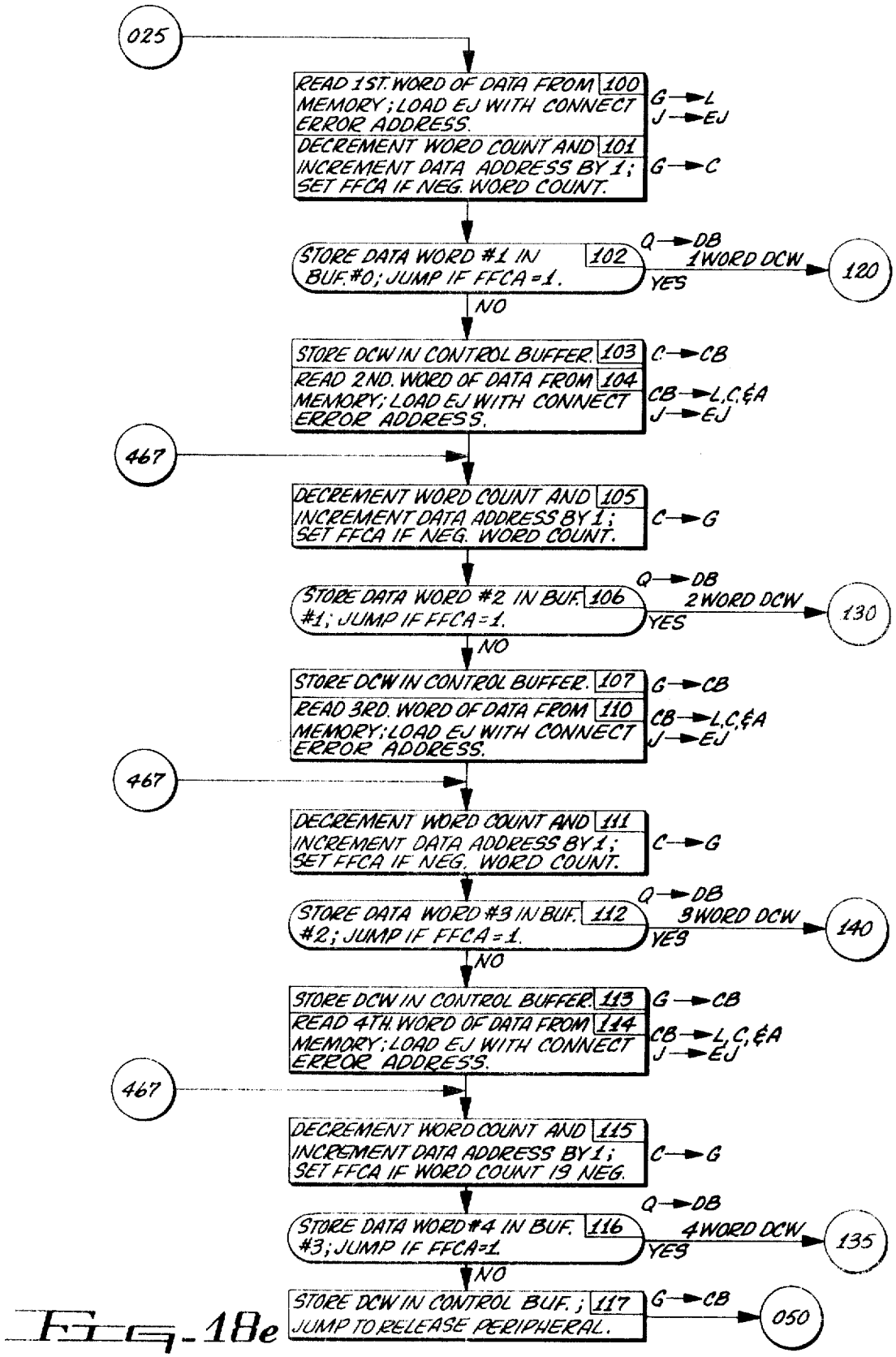
Figure 18F:
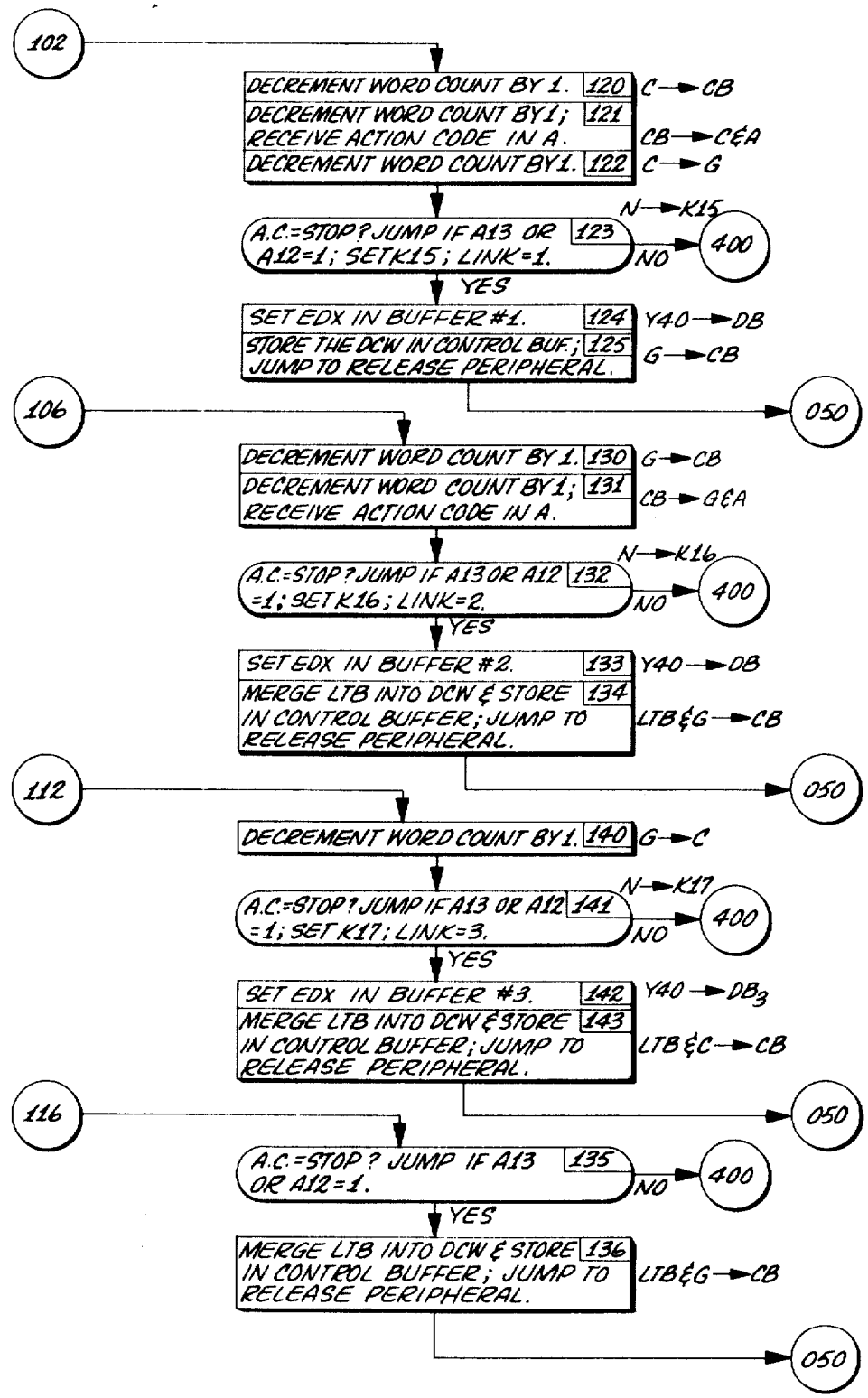
Figure 18M:
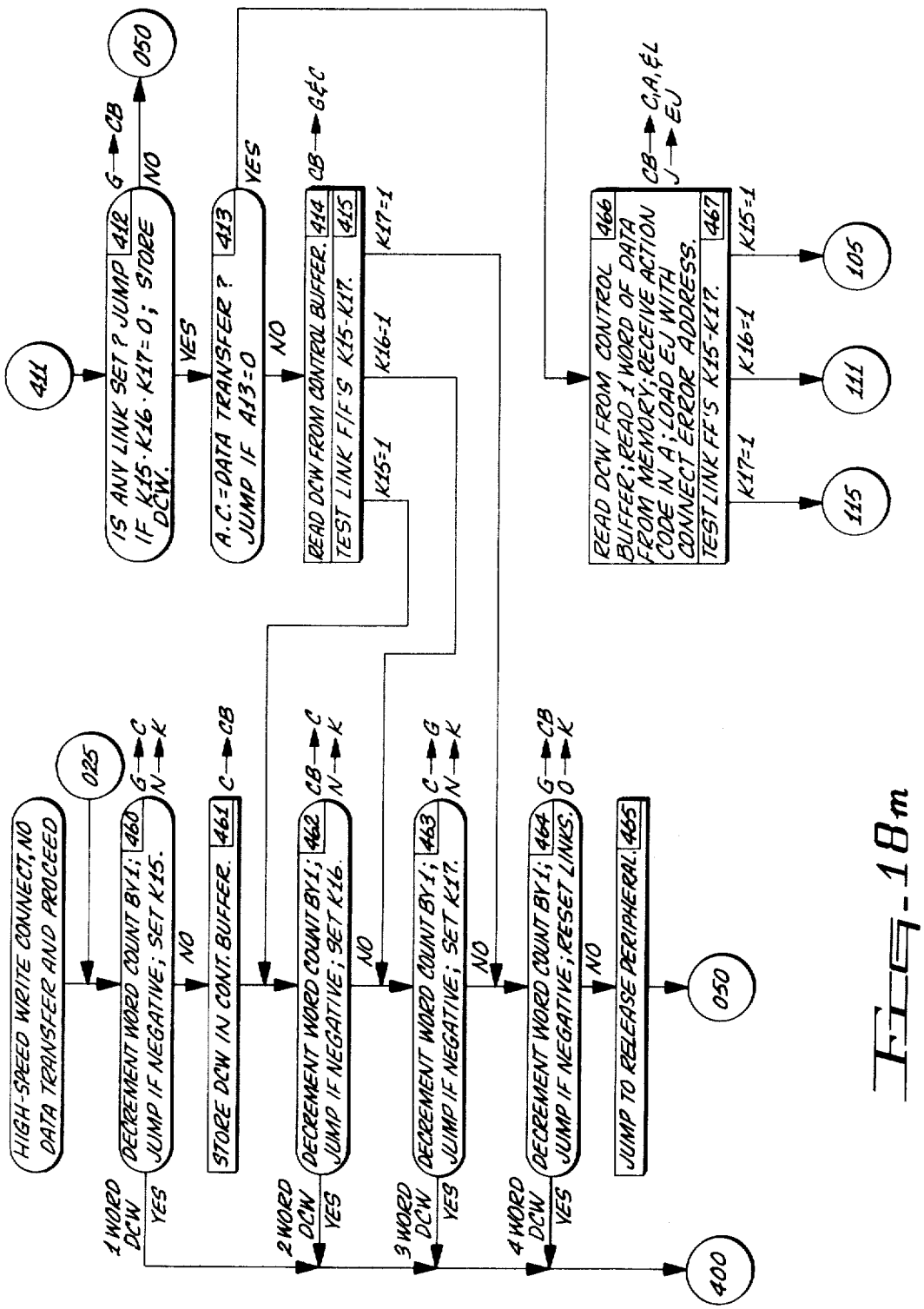
Figure 18N:
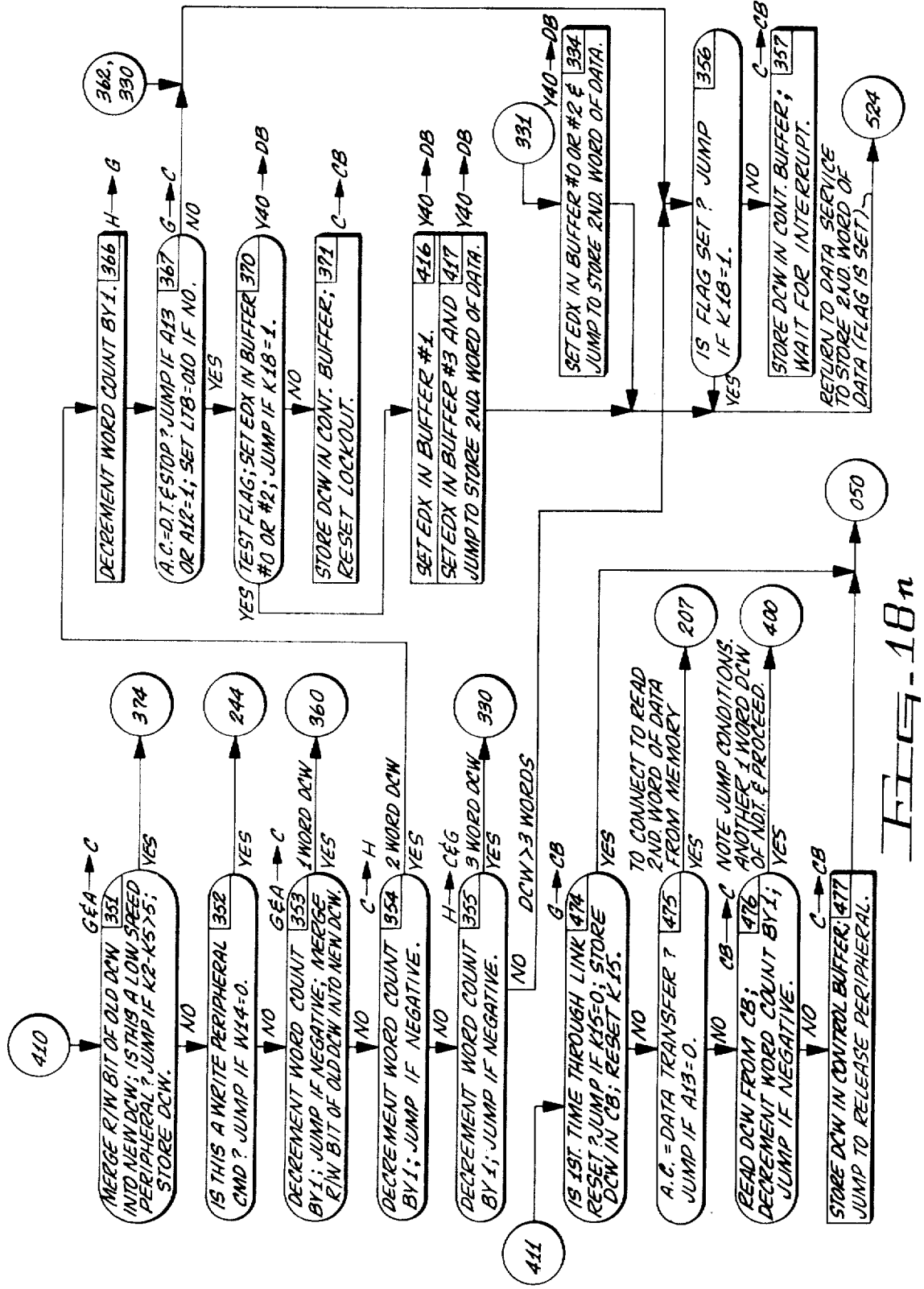
Figure 18X:
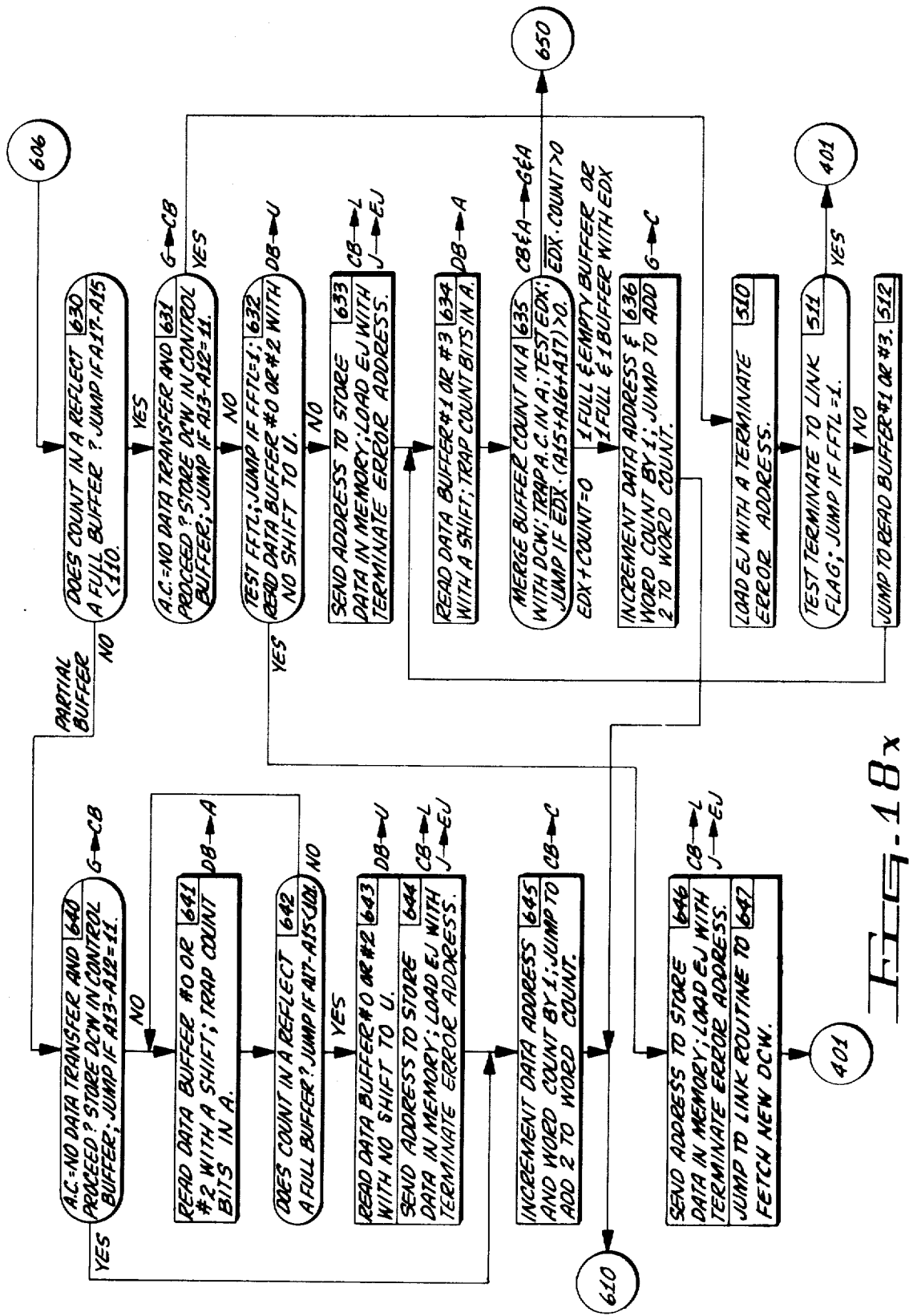

FIGS. 17a–17f3 comprise an intermediate block diagram of the input/output controller of FIG. 4 illustrating the information storage elements, the information transfer paths between these elements, and the major control elements of the input/output controller; and FIGS. 18a–18x is a flow chart illustrating the sequences, routines, and subroutines employed by the input/output controller in performing its functions.

GENERAL SYSTEM DESCRIPTION

The present invention is directed toward an improved input/output controller utilized in modular configured data processing systems such as those described below. Several configurations are set forth as typical environments for one or more input/output controllers incorporating the invention.

Figure 1:
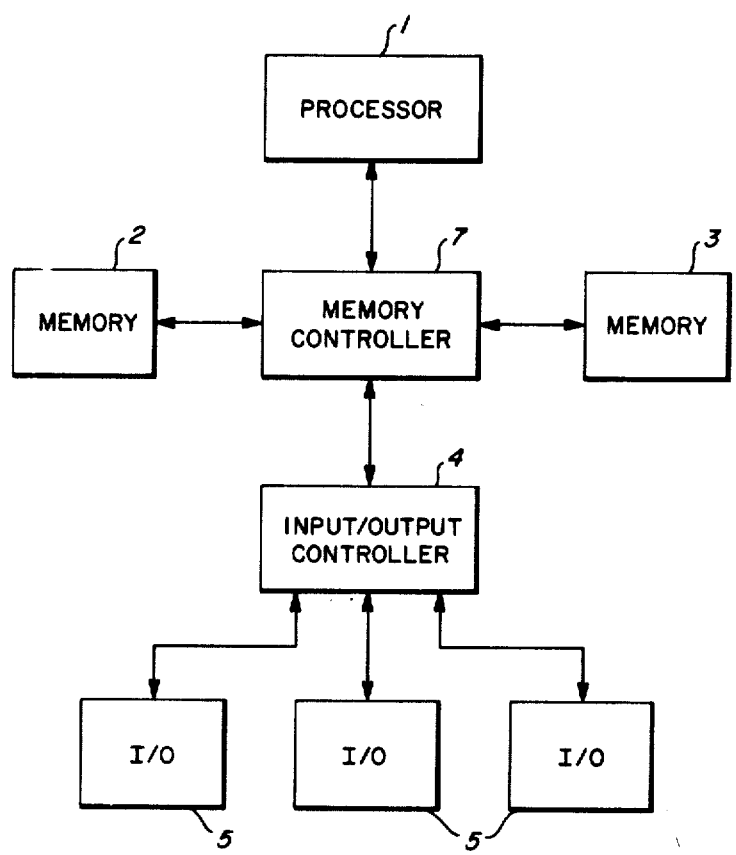
FIG. 1 is a block diagram of a data processing system in a single input/output controller configuration.

Referring to FIG. 1, a data processing system which includes a single data processor 1, a pair of memories 2 and 3, a single input/output controller 4, and a plurality of input/output subsystems 5 is illustrated. The processor, input/output controller, and memories are each connected to a memory controller 7 which controls all communication among the system elements and performs certain other tasks which will be explained as the description proceeds.

Figure 2:
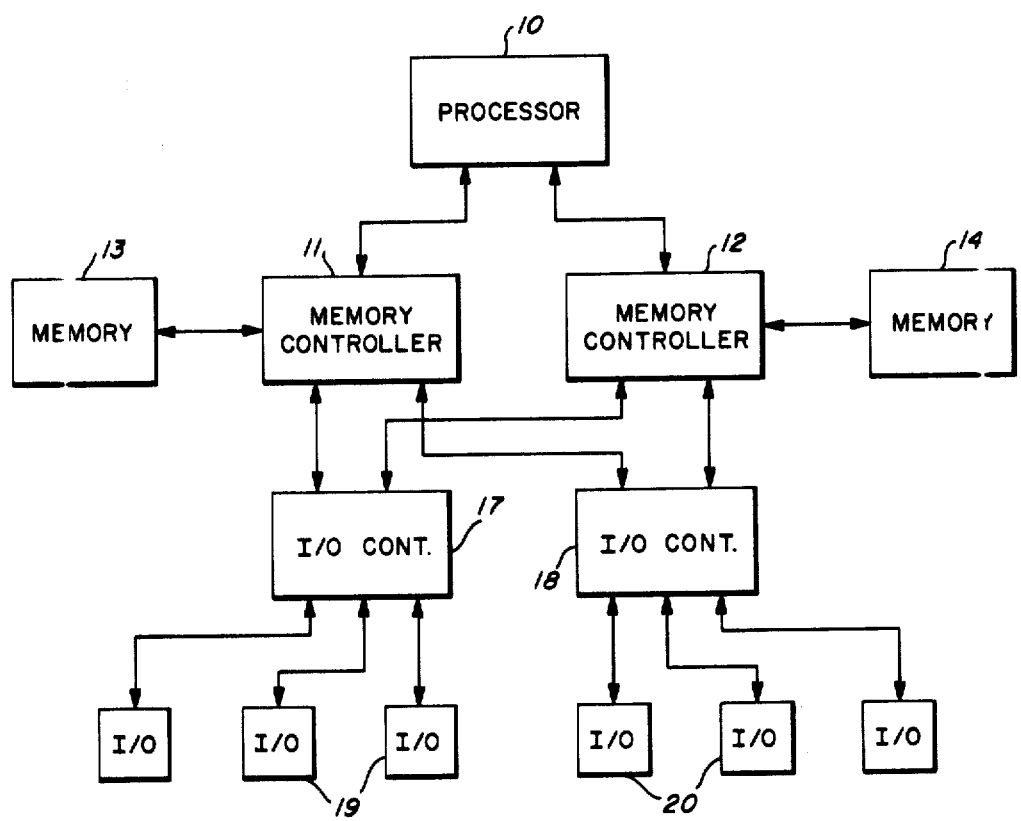
FIG. 2 is a block diagram of a data processing system utilizing multiple input/output controllers.

A multiple memory controller system configuration is shown in FIG. 2. A single processor 10 is connected to two memory controllers 11 and 12. Each memory controller is connected to a corresponding memory, 13 and 14, respectively. Thus, each of the memories may be accessed only through its corresponding memory controller. Input/output controllers 17 and 18 are each connected to both of the memory controllers 11 and 12; however, input/output controller 17 provides the necessary buffering and controlling of input/output subsystems 19 whereas input/output controller 18 performs these functions for input/output subsystems 20.

Referring to FIG. 3, a multi-processor system configuration comprehending the utilization of a plurality of memory controllers is shown. The configuration of FIG. 3 actually comprises overlapping data processing systems having intercommunication capabilities. Processor 22 is connected to a memory controller 23 which communicates with a memory 24. The memory controller 23 is therefore the "main memory controller" for the processor 22 and is accessible only by the processor 22 such that the memory 24 is reserved for use of the processor 22. The second data processor 25 is associated with and connected to a memory controller 26 which communicates with a memory 27. The memory 27 is for the exclusive use of processor 25 and may not be accessed by any of the remaining system elements of the data processing system depicted in FIG. 3.

Memory controller 30 is connected to both data processors 22 and 25; however, the memory controller 30 includes provision for designating one of the data processors as its control processor. Accordingly, processor 22 is designated internally by the memory controller 30 as its control processor, and the memory controller 30 will therefore look only to that processor for certain types of command information. The memory controller 30 is connected to memory 31 thus providing both processors 22 and 25 access to the memory 31. Similarly, memory controller 32 is connected to both data processor 22 and data processor 25; however, memory controller 32 also includes means for designating a particularly data processor as the control processor. Memory controller 32 may thus designate data processor 25 as its control processor thereby recognizing certain commands and certain operations only by the processor 25 even though the memory controller 32 is connected to both processors 22 and 25. The memory controller 32 is connected to a memory 34 thereby providing both the data processor 22 and data processor 25 access to the memory 34.

A plurality of input/output controllers 35, 36, and 37 are included within the multi-processor system of FIG. 3; and all the input/output controllers are connected to both memory controllers 30 and 32. Thus, each input/output controller may access either memory 31 or memory 34 through the corresponding memory controller 30 or 32. Therefore, an input/output controller, like a processor, may request access to a memory and be awarded priority in accordance with a predetermined priority scheme utilized in a particular memory controller while nevertheless being accorded a different priority in a different priority scheme utilized in a second memory controller. Each input/output controller communicates with a plurality of input/output subsystems as described previously.

As noted above, the configuration shown in FIG. 3 may actually comprise overlapping but otherwise independent data processing systems. Accordingly, the processors and other system elements have been designated by either the letter A or the letter B. Typically, data processing system A would include the processor 22, memory controller 23, and memory 24. The processor 22 would communicate with input/output controllers 35 and 36 through the memory controller 30. Data processing system B would include the processor 25, memory controller 26, and memory 27. The processor 25 would gain access to the memory 34 through the memory controller 32 and share the memory 34 with input/output controller 37. The two data processors A and B could communicate through the corresponding memory controllers 30 and 32 and thus be capable of accessing one another's memory to gain information and data to perform multi-processing operations wherein each processor is executing an independent program, which programs may nevertheless be interrelated in certain circumstances such as the execution of a master program simultaneously with a slave program.

INPUT/OUTPUT CONTROLLER—GENERAL

The input/output controller here described performs the function of harmonizing the asynchronous data transfer patterns of the many peripheral subsystems with the operation of other elements of the data processing system. The input/output controller performs this function with minimum interference to the operation of the processors of the system, requiring only a "connect" signal to initiate operation. In response to a connect signal, the input/output controller performs all required operations and informs the processor through a memory that the operations are completed. The exemplary input/output controller is able to service as many as sixteen peripheral subsystems, each of which may be simultaneously performing a different operation. The data transfer operations performed by the input/output controller in servicing the peripheral subsystems are under its internal control.

Functionally, the input/output controller comprises three elements, a first element which communicates with the remainder of the data processing system (this element comprises a memory communications unit), a second element which controls the operation of the input/output controller (this element comprises a microprogram storage unit, a working register unit, and a processing and control unit) and a third element which communicates with the peripheral subsystems (this element comprises a peripheral channel unit and a buffer storage unit). The second element of the input/output controller serves to provide a communications path at predetermined times between the first and third elements so that data and information may flow between a peripheral subsystem and a memory. Since a given peripheral subsystem requires the communications path provided by the second element between the first and third elements for only short periods (the length of time required to transfer a word of information), the peripheral subsystems share the second element of the input/output controller.

The second element of the input/output controller includes wired programs or routines which guide its operations. In response to a connect signal from a memory controller, the input/output controller retrieves and utilizes control words in conjunction with its own wired programs to perform and complete the required operations.

With reference to FIG. 4, the illustrated input/output controller 40 comprises a microprogram storage unit 41, a memory communications unit 42, a processing and control unit 43, a peripheral channel unit 44, a buffer storage unit 45, and a working register unit 46. Microprogram storage unit 41 provides storage for the programs which direct operations within the input/output controller 40 and furnishes control signals to processing and control unit 43, memory communications unit 42, and working register unit 46. Memory communications unit 42 serves as a communications path for data and control information flowing between memory controllers 47, 48, 49, and 50 and the input/output controller 40. Memory communications unit 42 includes four memory ports, identified in FIG. 4, as port A, port B, port C, and port D. Up to four memory controllers may be connected to the input/output controller, in each memory being connected to one of the memory ports. In FIG. 4, memory controller 47 is shown connected to port A of memory communications unit 42. Additional memory controllers 48, 49, and 50 may be connected to ports B, C, and D, as illustrated. As discussed in the section entitled "General System Description," each memory controller is, in turn, connected to one or more processors, now shown in FIG. 4. When the input/output controller 40 is associated, through memory communications unit 42, with more than one memory, apparatus is provided for supervising transmission of information between the input/output controller 40 and the several memory controllers.

Processing and control unit 43, in conjunction with working register unit 46, executes program operations in the input/output controller 40 in response to control signals furnished by microprogram storage unit 41. Peripheral channel unit 44 includes sixteen peripheral channels, each of the channels being connected to a peripheral subsystem 51 and provides a communication path for data and control information transferred between the peripheral subsystems and the input/output controller. Each of the peripheral subsystems 51 may comprise one or more of a plurality of commonly known peripheral devices such as magnetic drums, magnetic tape units, disc storage devices, printers, card readers, card punches, perforated tape devices, or document handlers. Buffer storage unit 45 provides temporary storage for data being transferred through the input/output controller 40 between the one or more memory controllers and the peripheral subsystems 51. The lines interconnecting the various units illustrated in FIG. 4 symbolically represent intercommunication paths for data and control information.

An input/output controller and a processor in a data processing system do not communicate directly but only through a memory, comprising a memory controller and memory storage unit, which serves as a coordinating system component. When an input/output controller has completed an assigned task or requires service, this information is transmitted by the input/output controller to a memory. Similarly, when it is necessary to initiate an action in the input/output controller, this information is transmitted by a memory to the input/output controller.

The input/output controller 40 illustrated in FIG. 4 is an independent data processing system and is capable of executing certain instructions in performing its function of communicating information between one or more memories and the peripheral subsystems of the data processing system. The instructions to the input/output controller, termed IOC commands, are stored in a memory along with other control information and are retrieved from the memory by the input/output controller. The input/output controller, in executing an IOC command, proceeds independently until execution of the command is completed. The input/output controller can receive IOC commands and other controller information from only one memory, termed the control memory. If the input/output controller is connected to more than one memory, the control memory is specified by switches within the input/output controller.

The fundamental unit of information employed in processing and communication in the input/output controller is a 36-bit word. Three general categories of words are employed by the input/output controller of FIG. 4 internally and in communicating with the memory controller:

(1) data words
(2) mailbox words, and
(3) interrupt queue words.

DATA WORDS

A data word in the input/output controller of FIG. 4 is a word which is transferred by the input/output controller between a memory and a peripheral subsystem. As illustrated in FIG. 5a, a data word comprises six characters of six binary digits each. The six characters of a data word are designated characters 0–5 from left to right, as shown. Character 0 is accorded the most significance and character 5 the least significance. Characters 1–4 are accorded successively decreasing orders of significance in correspondence with their positions within the data word.

MAILBOX WORDS

Data processing and data transfer operations in the input/output controller are performed under the control of mailbox words which are stored in fixed or predetermined storage locations in the control memory. Mailbox words are designated as primary mailbox words or secondary mailbox words. Each input/output controller is assigned a single primary mailbox word in a fixed storage location of its control memory. Up to sixty-four secondary mailbox words for each input/output controller are stored in fixed storage locations in its control memory, four secondary mailbox words, identified as secondary mailbox words #1, #2, #3, and #4, being provided for each peripheral channel of the peripheral channel unit.

Primary mailbox word

The primary mailbox word contains information required by the input/output controller to initiate an operation in a peripheral subsystem or to request status of a peripheral subsystem. The primary mailbox word is inserted in the predetermined storage location of the control memory by a processor.

FIG. 5b illustrates the organization of the primary mailbox word. Bit positions 30–35 of the primary mailbox word contain a peripheral device command which designates the operation to be performed by a particular peripheral subsystem or by a particular device of a multi-device peripheral subsystem.

Bit positions 24–29 of the primary mailbox word contains a peripheral device address which designates the particular device within a multi-device peripheral subsystem for which the peripheral device command is intended. This peripheral device address field is employed only if the peripheral subsystem comprises a plurality of devices as, for example, a magnetic tape subsystem having several tape handlers. The peripheral device address field is ignored if the peripheral subsystem consists of a single peripheral device.

Bit positions 20–23 of the primary mailbox word contain the peripheral channel address, i.e. the identification of the peripheral channel in the peripheral channel unit of the input/output controller to which the particular peripheral subsystem is connected. This peripheral channel address field specifies one of the peripheral channels A–R as indicated in FIG. 5b. Bit position 19 of the primary mailbox word is ignored by the input-output controller.

Bit position 18 of the primary mailbox word contains a lockout bit. This lockout bit is set to binary 0 when a primary mailbox word is initially stored by a processor in the predetermined memory location. The presence of a binary 0 in this bit position indicates to a processor that a new primary mailbox word may not yet be stored in the predetermined storage location of the control memory containing the primary mailbox word. This lockout bit is set to a binary 1 by the input/output controller when the primary mailbox word is read from the predetermined memory location under control of and for use by the input/output controller. The presence of a binary 1 in this bit position indicates to a processor that a new primary mailbox word may be stored in the primary mailbox fixed memory location.

Bit positions 12–17 of the primary mailbox word contain an IOC (input/output controller) command which specifies the type of operation to be managed by the input/output controller. The IOC commands determine the internal activity of the input/output controller and have no direct effect on the operation of the peripheral subsystems. The following IOC commands may be contained in the primary mailbox word, as illustrated in FIG. 5b:

(1) Unit Record Transfer: This IOC command is employed to transfer data between a memory and a peripheral subsystem under control of data control words (DCW) specified in the secondary mailbox fixed memory locations.

(2) Continuous Mode Non-Data Transfer: This IOC command is used for backspacing or forward-spacing records or files on magnetic tape and for all other non-data transfer operations specified by the peripheral device command field.

(3) Card Punch: This IOC command is used whenever the peripheral device command field contains a command specifying a card punch operation. This IOC command controls the transfer of data from a memory to a card punch subsystem.

(4) Multirecord: This IOC command is used, on normal speed channels only, to repeat a device command several times on the identified peripheral device utilizing a new DCW for each repeat.

(5) Write Single Character Record: This IOC command is used to transfer a file marker to a magnetic tape. The character to be transferred to the magnetic tape as the file marker is provided in secondary mailbox word #1.

(6) Program Load: This IOC command is employed for initial start-up of the data processing system to transfer the program to be executed from a peripheral subsystem to a memory.

(7) Multicommand: This IOC command is used, on high speed channels only, for causing the identified device to perform a search/select function followed by a read/write operation. The peripheral device command field of the primary mailbox word specifies the first operation. The second operation is specified in the peripheral device command field of the secondary mailbox word #3 which is otherwise an image of the primary mailbox word.

Bit positions 0–5 of the primary mailbox word contain a record count. If the IOC command is "continuous mode non-data transfer," the record count specifies the number of records to be backspaced or forward-spaced on magnetic tape. For all other non-data transfer operations, as specified by the peripheral device command field, the record count must be one. If the IOC command is "card punch," the record count must be twelve. If the IOC command is "multirecord," the record count specifies the number of times the device command is to be repeated. If the IOC command is "multicommand," the record count must be two. For all other IOC commands, the record count field is ignored. As depicted in FIG. 5b, 000 000 in the record count field is interpreted as $64_{10}$ by those IOC commands which recognize the field.

Secondary mailbox word #1

Figure 5C:
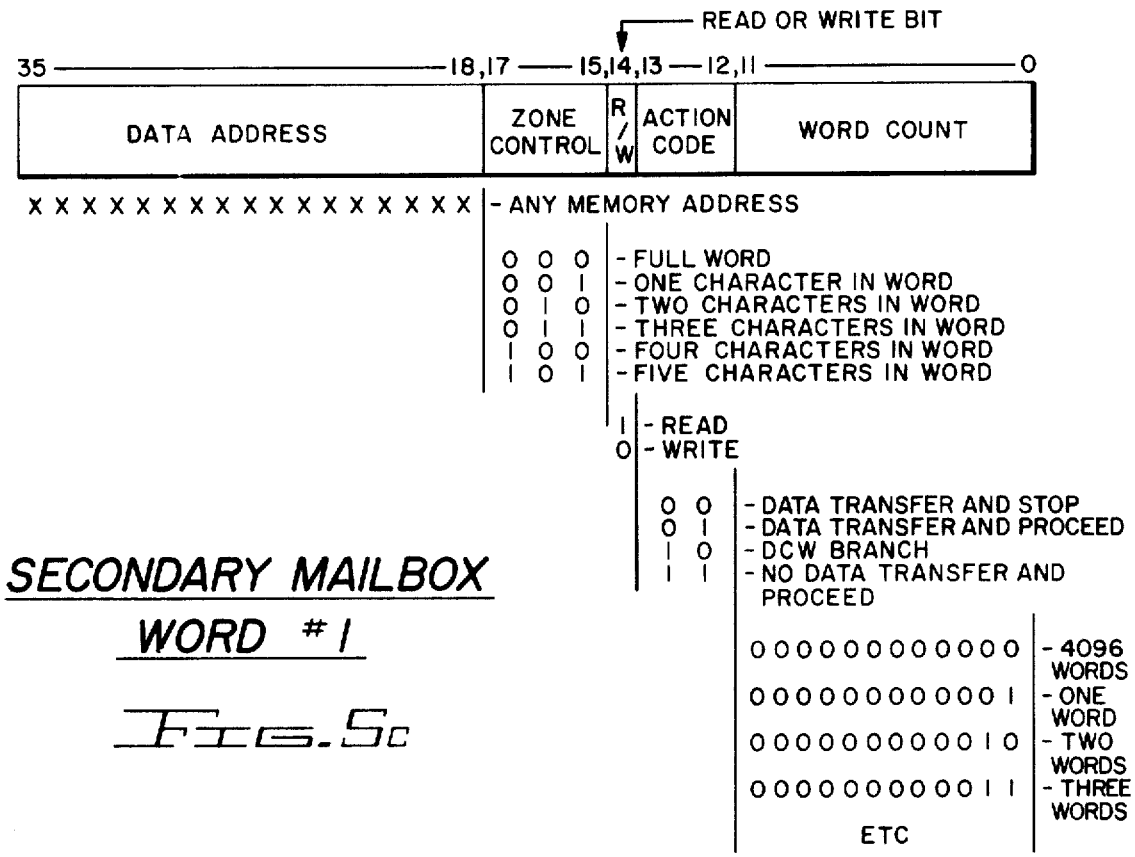

The format of secondary mailbox #1 is illustrated in FIG. 5c. At the beginning of a data transfer operation in the input/output controller, secondary mailbox word #1 contains the first data control word (DCW) to be used by the input/output controller in controlling the transfer of data between a memory and a peripheral subsystem during the data transfer operation. Secondary mailbox word #1 is stored in its fixed location in the control memory by the supervisory program. If more than one data control word is required to complete the transfer of data for the input/output data transfer operation, a new secondary mailbox word #1 is stored in the fixed memory location for use by the input/output controller or is fetched from a memory location specified in secondary mailbox #2 according to the action code contained in the present DCW.

Bit positions 18–35 of secondary mailbox word #1 contain a data address field. This data address field may contain one of four items of information, viz:

(1) When the secondary mailbox word #1 fixed storage location is initially loaded by the supervisory program, the data address field contains the relative address of the first word of a data block to be transferred between a memory and a peripheral subsystem. Prior to use, the input/output controller will add a base address to the data address field to make the data address field absolute. This addition of a base address is done each time a new data control word is obtained during the course of a data transfer operation.

(2) If the action code (explained below) of secondary mailbox word #1 is "DCW Branch," the data address field specifies the address of the memory location containing the next data control word to be employed in the course of the data transfer operation.

(3) Upon termination of a data transfer, the data address field contains the absolute address of word $N+1$, where word N was the last word transferred.

(4) If the IOC command contained in the primary mailbox word is "write single character record," bit positions 30–35 contain the character to be written on magnetic tape as a file marker.

Bit positions 15–17 of the secondary mailbox word #1 contain zone control bits which identify the position within a word of the information unit or character being transferred between a memory and a peripheral subsystem. The zone control field is used as a character counter by the input/output controller. During a read operation in a peripheral channel, if the data transfer terminates with an incomplete word in the input/output controller, the zone control field indicates the number of data characters contained in the incomplete word. During a data transfer in a peripheral channel when the data transfer terminates with an incomplete word in the input/output controller, the zone control field indicates the position within a word of the next character to be transferred between the input/output controller and a memory.

Bit position 14 of secondary mailbox word #1, termed the read or write bit, indicates whether the data transfer comprises a read or a write operation in the peripheral subsystem. If the data transfer is from a memory to a peripheral subsystem, bit position 14 contains a binary 0, indicating a write operation within the peripheral subsystem. If data transfer is from a peripheral subsystem to a memory, bit position 14 contains a binary 1, indicating a read operation within the peripheral subsystem.

Bit positions 12 and 13 of secondary mailbox word #1 contain an action code which modifies and further defines the operations specified by certain of the IOC commands. The following action codes are employed in secondary mailbox word #1, as illustrated in FIG. 5c:

(1) Data Transfer and Stop: This action code causes the input/output controller to transfer data between a peripheral subsystem and a memory under the control of secondary mailbox word #1 until the word count field of secondary mailbox word #1 is reduced to zero. The input/output controller will then terminate the data transfer.

(2) Data Transfer and Proceed: This action causes the input/output controller to obtain and employ another data control word when the word count field of the current data control word is reduced to zero. The new data control word controls further data transfer between a peripheral subsystem and a memory.

(3) DCW Branch: This action code causes the input/output controller to use the data address field of the data control word in secondary mailbox word #1 as the next DCW pointer, i.e. the address of the next data control word that is to be employed to control subsequent data transfers.

(4) No Data Transfer and Proceed: During a write operation, this action code causes the input/output controller to generate a number of zero characters corresponding to the contents of the word count field and transmits these zero characters to a peripheral subsystem. If a read operation is being performed, this action code causes a number of data words, as specified by the contents of the word count field, being transferred from the peripheral subsystem to memory to be masked. During both read and write operations, the word count field is decremented in a normal manner and upon reduction of the word count field to zero, the input/output controller obtains another data control word.

Bit positions 0–11 of secondary mailbox word #1 contain a word count field which specifies the number of words to be transferred between a memory and a peripheral subsystem. If data transfer is terminated before the word count field is reduced to zero, the word count field normally indicates the number of words remaining to be transferred.

Secondary mailbox word #2

Figure 5D:
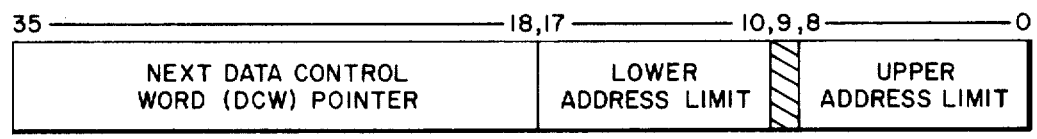

The organization of secondary mailbox word #2 is illustrated in FIG. 5d. This word is used to obtain and check additional data control words employed during data transfer operations in the input/output controller. Bit positions 18–35 of secondary mailbox word #2 contain the next DCW pointer, i.e. the address of the next data control word to be used by the input/output controller after the word count field of the current data control word has been reduced to zero. The address contained in the next DCW pointer field is an absolute address. If only one data control word is required in a data transfer operation, secondary mailbox word #2 is not used. However, if more than one data control word is required, the next DCW pointer field is employed to obtain subsequent data control words.

Bit positions 10–17 of secondary mailbox word #2 contain the lower address limit field which specifies the starting address of a 1024 word block which is to participate in data transfer. The lowest permissible address to be affected is defined by the eight binary digits of the lower address limit field followed by ten binary 0's. Bit positions 0–8 of secondary mailbox word #2 contain the upper address limit field which specifies the highest permissible address of a 1024 word block which is to participate in data transfer. The upper address limit field followed by ten binary 1's defines the highest permissible address to be affected. All commands comprehending transfer of data will have their range of address checked before any data is transferred to ensure that the operation will be within the range specified by the limits.

Secondary mailbox word #3

Figure 5E:
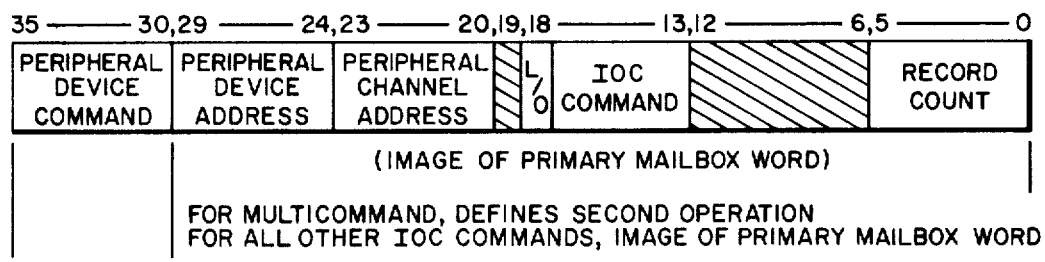

The organization of secondary mailbox word #3 is illustrated in FIG. 5e. For all IOC commands except "multicommand," this word is an image of the primary mailbox word and is employed at certain times during the operation of the input/output controller after the primary mailbox word has been destroyed. For the "multicommand" IOC command, as noted above, the peripheral device command field of secondary mailbox word #3 specifies the secondary operation, the remainder being an image of the primary mailbox word.

Secondary mailbox word #4

The organization of secondary mailbox word #4 is illustrated in FIG. 5f. This word is employed by the input/output controller to store status information and to store address and count information for use with particular IOC commands. Bit positions 18–35 of secondary mailbox word #4 contain the first data control word pointer, i.e. the absolute address of the first data control word (DCW) employed in a data transfer operation. This information is required by the input/output controller during execution of the "card punch" IOC command. When the "multicommand" IOC command is specified in the primary mailbox word, bits 18–35 of secondary mailbox #4 contain the absolute address of the first DCW of the second peripheral device command which is contained in secondary mailbox word #3.

Bit positions 12–17 of secondary mailbox word #4 contain IOC status information. In particular, bit positions 15–17 contain an internal or IOC (input/output controller) error code while bit positions 12–14 contain an external or memory error code. The binary representation of the possible IOC and memory error codes is illustrated in FIG. 5f.

Bit positions 6–11 of secondary mailbox word #4 are ignored by the input/output controller. Bit positions 0–5 contain the record count residue which indicates the number of records still to be processed in the event data transfer with a peripheral subsystem is terminated.

INTERRUPT QUEUE WORDS

Two types of interrupt queue words are employed in the input/output controller, viz. interrupt queue counter words and interrupt queue table words. These interrupt queue words, like the mailbox words, are stored in predetermined locations of the control memory. Three interrupt queue counter words and forty-eight interrupt queue table words are provided in the control memory. A set of one interrupt queue counter word and sixteen interrupt queue table words are assigned to each of the three types of program interrupts which may be initiated by the input/output controller, viz initiation interrupts, terminate interrupts, and special interrupts. The interrupt counter words are identified as the initiation interrupt counter word, the terminate interrupt counter word, and the special interrupt counter word. The interrupt queue table words are identified as initiation interrupt queue table words, terminate interrupt queue table words, and special interrupt queue table words. The interrupt queue words are employed by the input/output controller to furnish certain information through the control memory to a processor. The interrupt queue counter words are employed to identify the word of the corresponding queue table in which the most recent entry was made by the input/output controller.

Interrupt queue counter words

The organization of the interrupt queue counter words is illustrated in FIG. 5g. Bit positions 22–35 and 0–17 of the interrupt queue counter words are ignored by the input/output controller. Bit positions 18–21 contain the count field which specifies the relative location within the corresponding sixteen word interrupt queue table of the most recent entry made by the input-output controller. The format of the initiation, terminate, and special interrupt queue counter words is identical. The count field of an interrupt queue counter word is incremented each time the input/output controller stores information in the interrupt queue table of the corresponding type and decremented each time an interrupt is serviced. The count field functions as a modulo-16 counter and is therefore automatically reset to 0000 if sixteen more incrementations than decrementations occur from a time when the interrupt queue table is empty.

Interrupt queue table words

Interrupt queue table words are employed by the input/output controller to communicate status and other control information to a processor through the control memory. The organization of the interrupt queue table words is illustrated in FIG. 5h. Bit position 35 of an interrupt queue table word contains the synchronization bit which indicates the status of the interrupt queue table word. A binary 0 in the synchronization bit position indicates that the interrupt queue table word has been processed and that a new interrupt queue table word can be stored in that fixed memory location. A binary 1 in the synchronization bit position indicates that the interrupt queue table word has not yet been processed and, therefore, a new interrupt queue table word cannot yet be stored in that location of the control memory.

Bit position 34 of the interrupt queue table word contains a power code; a binary 0 in bit position 34 indicates that electrical power is being applied to a particular peripheral subsystem while a binary 1 indicates a power-off condition.

Bit positions 30–33 of the interrupt queue table word contain device major status information indicating the status of a particular peripheral device or subsystem. The possible binary digit combinations in the device major status field and the status information conveyed by each combination are illustrated in FIG. 5h. Bit positions 24–29 contain device substatus information to further define, in greater detail than is possible in the device major status field, the status of a peripheral subsystem.

Bit positions 12–17 contain IOC status information comprising an IOC error code and a memory error code identical to that discussed in conjunction with secondary mailbox word #4. Bit positions 2–5 of the interrupt queue table word contain the identification of the peripheral channel connected to the peripheral subsystem whose status is reflected in the interrupt queue table word. Bit positions 18–23, 6–11, 0, and 1 of the interrupt queue table word are ignored by the input/output controller.

Figure 5I:
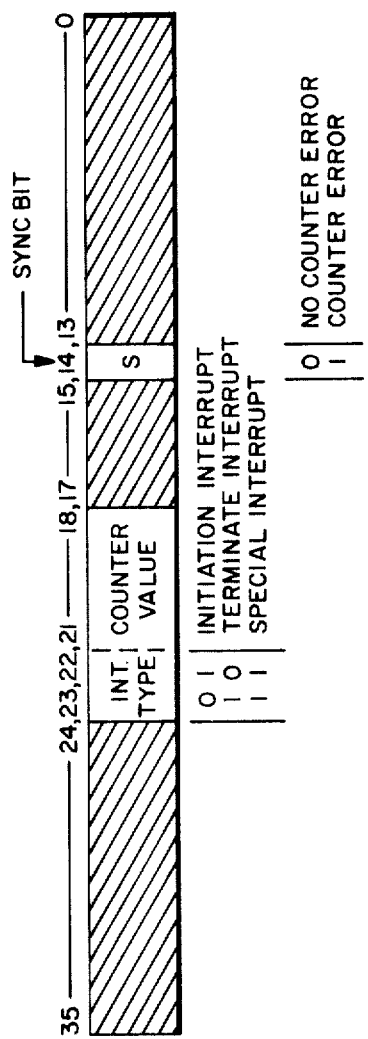

If a memory error is detected while the input/output controller is processing an interrupt counter or queue table entry, the input/output controller will place the type of interrupt and the value of the counter (which may be incorrect because of the memory error) along with a sync bit into a predetermined location in the control memory containing a queue counter error interrupt word. The sync bit is utilized to alert the processor to the occurrence of a queue counter/table error. The organization of the queue counter error interrupt word is illustrated in FIG. 5i.

INPUT/OUTPUT CONTROLLER—MEMORY COMMUNICATIONS

Communication between a memory port of the input/output controller and the memory controller connected to that memory port is effected through a group of lines carrying specific signals. These signals comprise input signals transmitted from the memory controller to the memory port of the input/output controller and output signals transmitted from the memory port to the memory controller. The designation of the signals passing between a memory port of the input/output controller and the memory controller connected to that port is basically the same for each memory controller-memory port connection.

Figure 6:
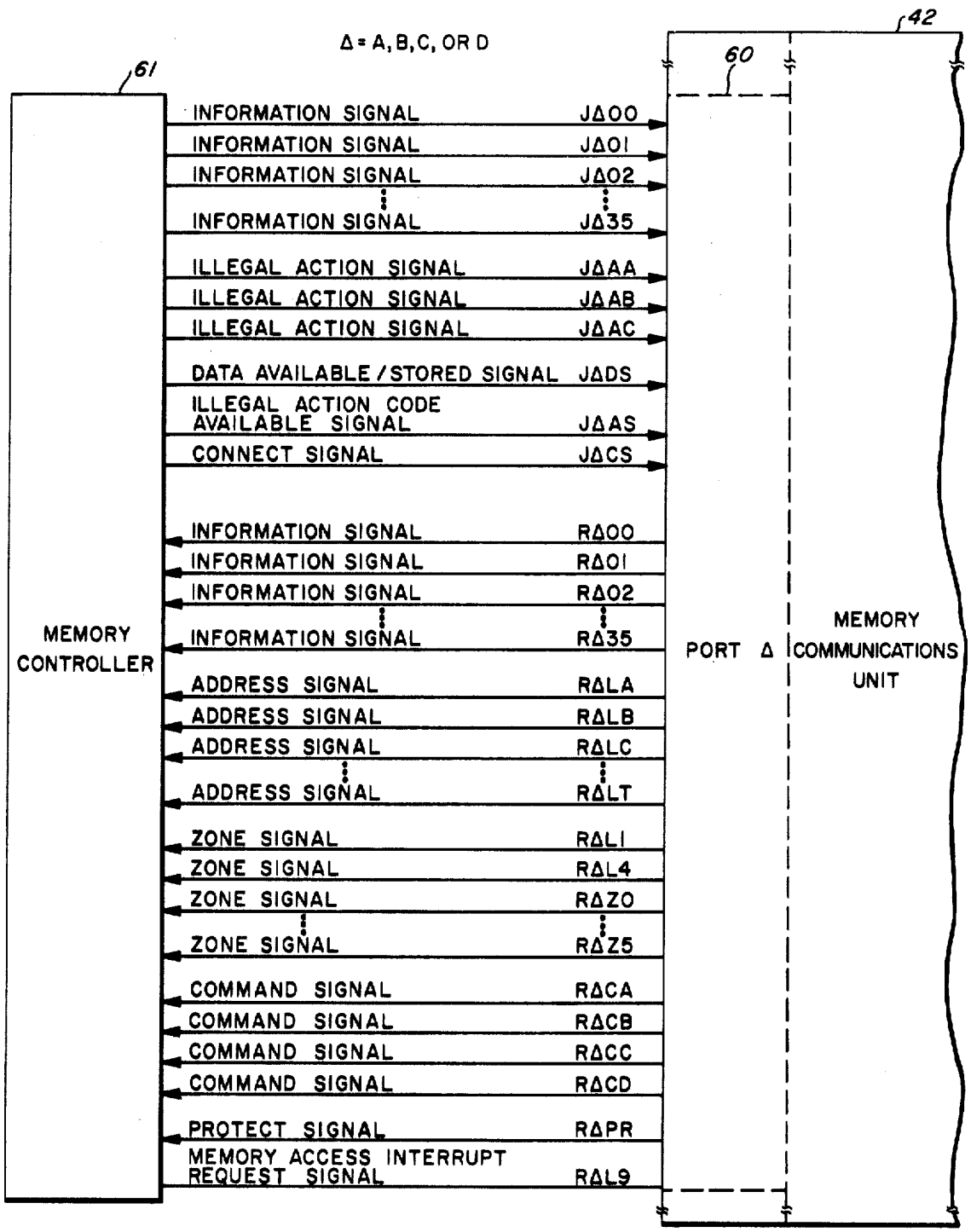
FIG. 6 is a symbolic diagram illustrating the interface of the input/output controller and a memory controller.

FIG. 6 illustrates the group of lines interconnecting a memory port 60 of memory communications unit 42 with a memory controller 61 and the signals on these lines. Memory port 60 is designated port Δ where Δ is one of the alphanumeric characters A, B, C, or D corresponding to one of the memory ports of the input/output controller.

SIGNAL TRANSFER—MEMORY CONTROLLER TO MEMORY COMMUNICATIONS UNIT

Referring to FIG. 6, the signals transmitted from memory controller 61 to memory port 60 include thirty-six information signals JΔ00–JΔ35 for transmitting information from memory controller 61 to memory port 60. The symbol "Δ" in the signal designations represents one of memory ports A–D with which the signals are associated. For example, signals JA00–JA35 identify the information bits being transmitted to memory port A from its corresponding memory controller. Similarly, signals JC00–JC35 identify the information bits being transmitted to memory port C from its corresponding memory controller. In addition to the information signals JΔ00–JΔ35, data available/stored signal JΔDS, illegal action signals JΔAA–JΔAC, illegal action code available signal JΔAS, and connect signal JΔCS are transmitted from memory controller 61 to memory port 60.

The thirty-six information signals JΔ00–JΔ35 serve to transfer both mailbox words and data words from the memory controller 61 to the corresponding memory port 60 of the memory communications unit 42. Data available/stored signal JΔDS is furnished by memory controller 61 to indicate to the input/output controller that one of the following events has occurred:

(a) Information has been placed on the information lines and is available to memory port 60 of the input/output controller as information signals JΔ00–JΔ35; or (b) Information transmitted from memory port 60 of the input/output controller to memory controller 61 has been stored in the addressed storage location of memory and the storage cycle is completed.

Illegal action code signals JΔAA, JΔAB, and JΔAC indicate to the input/output controller whether or not an error was detected by memory controller 61 during its operation in conjunction with its memory storage unit and the type of error detected, if any. The illegal action indications which may be transmitted by the memory controller to the input/output controller are as follows:

(a) Nonexistent address (001)—this illegal action code indicates that the input/output controller has transmitted to the memory controller an address which exceeds the actual storage capability of the memory controller memory;

(b) Parity error (011)—this illegal action code indicates that a parity error has occurred during execution of a read/restore command;

(c) No illegal action (000)—this code indicates that no illegal action has occurred in memory.

When more than one illegal action occurs simultaneously, only the code corresponding to the error of highest priority is transmitted. The order of priority of the illegal action codes, ranging from highest priority to lowest priority, is that presented above. The illegal action codes listed are employed in the memory error code fields of secondary mailbox word #4 (see FIG. 5f) and the interrupt queue table words (see FIG. 5h).

Illegal action code available signal JΔAS is furnished by the memory controller 61 to indicate to the input/output controller that the memory cycle requested by the input/output controller has been completed and that the illegal action code signals JΔAA–JΔAC are available on the illegal action lines. The illegal action information represented by the illegal action signals JΔAA, JΔAB, and JΔAC is valid only at the time that the illegal action code available signal JΔAS occurs.

Connect signal JΔCS is transmitted from memory controller 61 to the input/output controller through memory port 60 to cause the input/output controller to initiate an input/output operation. In response to connect signal JΔCS, the input/output controller obtains mailbox words from memory through the memory controller 61, these mailbox words containing information required by the input/output controller to accomplish the input/output operation.

SIGNAL TRANSFER—MEMORY COMMUNICATIONS UNIT TO MEMORY CONTROLLER

The output signals transmitted from memory port 60 to memory controller 61 include thirty-six information signals RΔ00–RΔ35, eighteen address signals RΔLA–RΔLT, eight zone signals RΔL1, RΔL4, and RΔZ0–RΔZ5, four command signals RΔCA–RΔCD, protect signal RΔPR, and memory access interrupt request signal RΔL9. Information signals RΔ00–RΔ35 are used to transfer data words and interrupt information, in addition to control information, from the input/output controller to the memory controller. Address signals RΔLA–RΔLT specify the storage location in memory from which information is to be transferred to the input/output controller or to which information is to be transferred from the input/output controller. The eighteen address signals RΔLA–RΔLT permit any one of up to 262,144 memory storage locations to be addressed. Zone signals RΔL1, RΔL4, and RΔZ0–RΔZ5 are employed during transfer of a single data character from memory controller 61 to the input/output controller to specify the character position in the word of the character to be transferred. The relationship between the zone signals and the character position specified by the zone signals is as follows:

| Zone signals | | | | | | | | Character or Byte, position (Figure 5a) |
|---|---|---|---|---|---|---|---|---|
| RΔZ0 | RΔZ1 | RΔL1 | RΔZ2 | RΔZ3 | RΔZ4 | RΔL4 | RΔZ5 | |
| 0 | 0 | 0 | 0 | 0 | 0 | 0 | 0 | 1 5. |
| 0 | 0 | 0 | 0 | 0 | 1 | 1 | 0 | 0 4. |
| 0 | 0 | 0 | 0 | 1 | 0 | 0 | 0 | 0 3. |
| 0 | 0 | 0 | 1 | 0 | 0 | 0 | 0 | 0 2. |
| 0 | 1 | 1 | 0 | 0 | 0 | 0 | 0 | 0 1. |
| 1 | 0 | 0 | 0 | 0 | 0 | 0 | 0 | 0 0. |
| 1 | 1 | 1 | 1 | 1 | 1 | 1 | 1 | 1 Entire word transferred. |

As tabulated above, during the transfer of a full word between the input/output controller and memory controller 61, zone control is not employed and each of zone signals RΔL1, RΔL4, and RΔZ0–RΔZ5 is a binary 1.

Command signals RΔCA–RΔCD are provided by the input/output controller to specify the operation to be performed by the memory controller 61 when a memory access interrupt request is granted by the memory controller. The command signal codes and the commands corresponding to these codes are as follows:

| Command signals | | | | Command |
|---|---|---|---|---|
| RΔCA | RΔCB | RΔCC | RΔCD | |
| 0 | 0 | 0 | 0 | Read/Restore: In response to this command, memory controller 61 retrieves the contents of the storage location specified by address signals RΔLA–RΔLT and places the word as signals JΔ00–JΔ35, on the information lines to the memory port 60 accompanied by the data available/stored signal JΔDS. |
| 0 | 1 | 0 | 0 | Clear/Write: In response to this command, the memory controller 61 receives from the input/output controller the information represented by information signals RΔ00–RΔ35 and stores this information in the memory storage location specified by address signals RΔLA–RΔLT. The zone signals RΔL1, RΔL2, and RΔZ0–RΔZ5 determine, during transfer of a single character, the location of the character within a word. |
| 1 | 1 | 1 | 0 | Set Execute Interrupt Cells: In response to this command, memory controller 61 receives the program interrupt information represented by signals RΔ00–RΔ35 and stores this information in the interrupt cells which comprise the memory interrupt register of memory controller 61. |

Protect signals R∆PR is always a binary 1 and indicates to memory controller 61 that the input/output controller is permitted unrestricted access to all storage locations of memory. Memory access interrupt request signal R∆L9 is employed by the input/output controller to request access to memory controller 61 in order to transfer information or to transfer a program interrupt request between the input/output controller and memory controller 61.

MEMORY CONTROLLER—GENERAL

Figure 7:
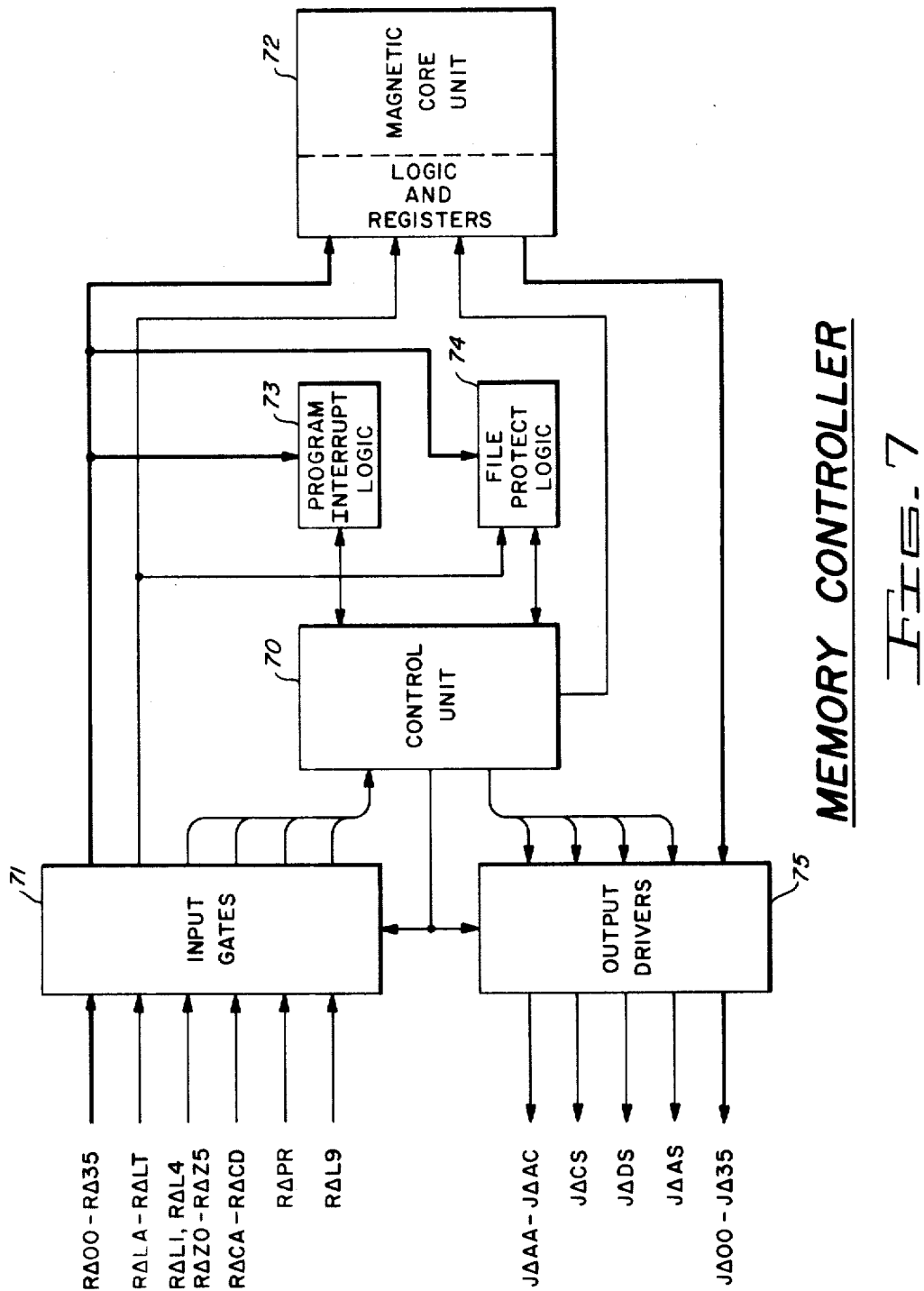
FIG. 7 is a major block diagram of a memory controller which may be employed with the input/output controller of FIG. 4.

FIG. 7 is a simplified block diagram of memory controller 61 indicating the general organization of the memory and the structure employed to receive and transmit signals transferred between memory and memory port 60 of the input/output controller. Coordination and control of the operations within memory controller 61 are effected by control unit 70. Control unit 70 receives the zone, command, protect, and memory access interrupt request signals transmitted by the input/output controller through input gates 71. Input gates 71 also direct the information signals to magnetic core unit 72, program interrupt logic 73, and file protect logic 74.

Program interrupt logic 73 includes the interrupt cells of the memory interrupt register. File protect logic 74 prohibits access to certain memory blocks if protect signal R∆PR is a binary 0. However, as noted above, protect signal R∆PR from the input/output controller is always a binary 1, thereby permitting the input/output controller unlimited access to memory storage locations. Program interrupt logic 73 and file protect logic 74 communicate with control unit 70. Control unit 70, in response to signals provided by input gates 71 transmits control information to the logic and registers of magnetic core unit 72, as illustrated in FIG. 7. The address signals transmitted by the input/output controller are directed by input gates 71 to file protect logic 74 and to magnetic core unit 72.

Information signals originating in magnetic core unit 72 during a read/restore operation are transmitted to the input/output controller through output drivers 75. Output drivers 75 also furnish, in response to signals from control unit 70, the illegal action, data available/stored, illegal action code available, and connect signals to the input/output controller. Enabling and disabling signals for input gates 71 and output gates 75 are provided by control unit 70.

MEMORY CONTROLLER OPERATION

Command signals R∆CA–R∆CD, transmitted to memory controller 61 from the input/output controller, define the basic operations performed by the memory controller for the input/output controller. One of these basic operations is executed by the memory controller 61 to serve the input/output controller upon acknowledgement by the memory controller of a memory access interrupt request signal R∆L9 from the input/output controller. If the input/output controller is connected to more than one memory controller, the memory controller to which a particular command is directed is controlled by port address assignment switches within the input/output controller. The commands which may be transmitted from the input/output controller to a memory controller are "read/restore," "clear/write," and "set execute interrupt cells."

Read/restore command

Figure 8:
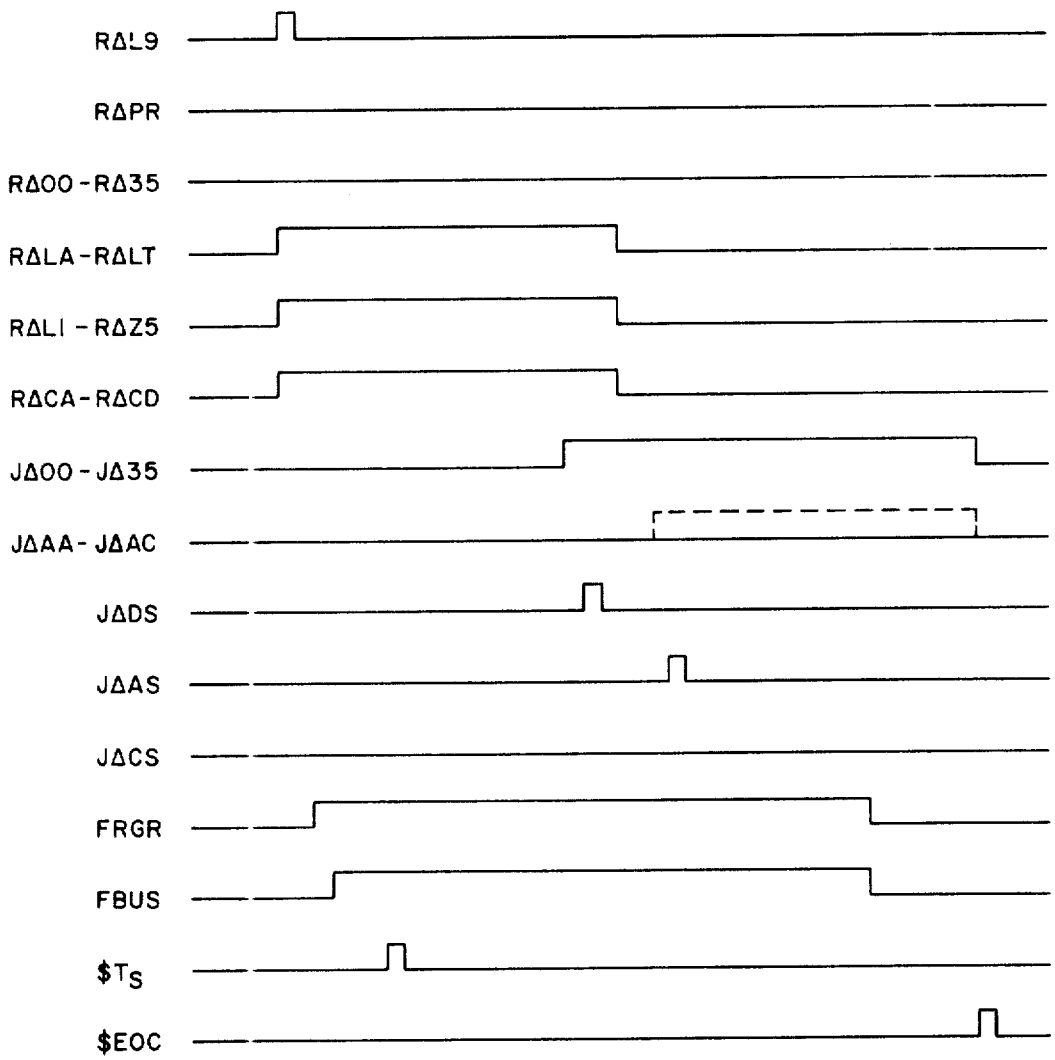
FIG. 8 is a timing diagram illustrating the sequence of signals which occur in response to the transmission of a read/restore command from the input/output controller to a memory controller.

Transfer of information between memory and the input/output controller is accomplished by a specific sequence of signals transmitted between the memory controller 61 and the input/output controller. The sequence of signals which occurs during a read/restore command is illustrated in FIG. 8. With reference to FIG. 8, the sequence is initiated by the input/output controller which transmits a memory access interrupt request signal R∆L9 to the memory controller 61 accompanied by address signals R∆LA–R∆LT, zone signals R∆L1, R∆L4, and R∆Z0–R∆Z5, command signals R∆CA–R∆CD, and protect signal R∆PR. Command signals R∆CA–R∆CD specify the read/restore command. In response to request signal R∆R9, a flip-flop RGR in control unit 70 of memory controller 61 is set to the 1-state to provide signal FRGR indicating that the request for a memory access interrupt has been granted. Subsequently, a flip-flop BUS (busy) in control unit 70 is set to the 1-state to provide signal FBUS which blocks out all other memory access interrupt requests. Control unit 70 then generates pulse signal $T_S to initiate the read/restore cycle in memory controller 61. During the read/restore cycle, memory controller 61 employs protect signal R∆PR and the address information furnished by the input/output controller to read the desired information from the addressed memory location and place it on the information lines as signals J∆00–J∆35. When the information is available on the information lines, memory controller 61 transmits the data available/stored signal J∆DS to the input/output controller. The zone signals are not used by memory controller 61 during a read/restore operation.

If an error is detected by memory controller 61 during execution of the read/restore command, the nature of this error is described by the illegal action signals J∆AA–J∆AC, and the availability of the illegal action signals is indicated to the input/output controller by illegal action code available signal J∆AS. The RGR and BUS flip-flops of control unit 70 are then reset to the 0-state and the control unit issues internal signal $E0C to indicate end of command execution.

Clear/write command

Figure 9:
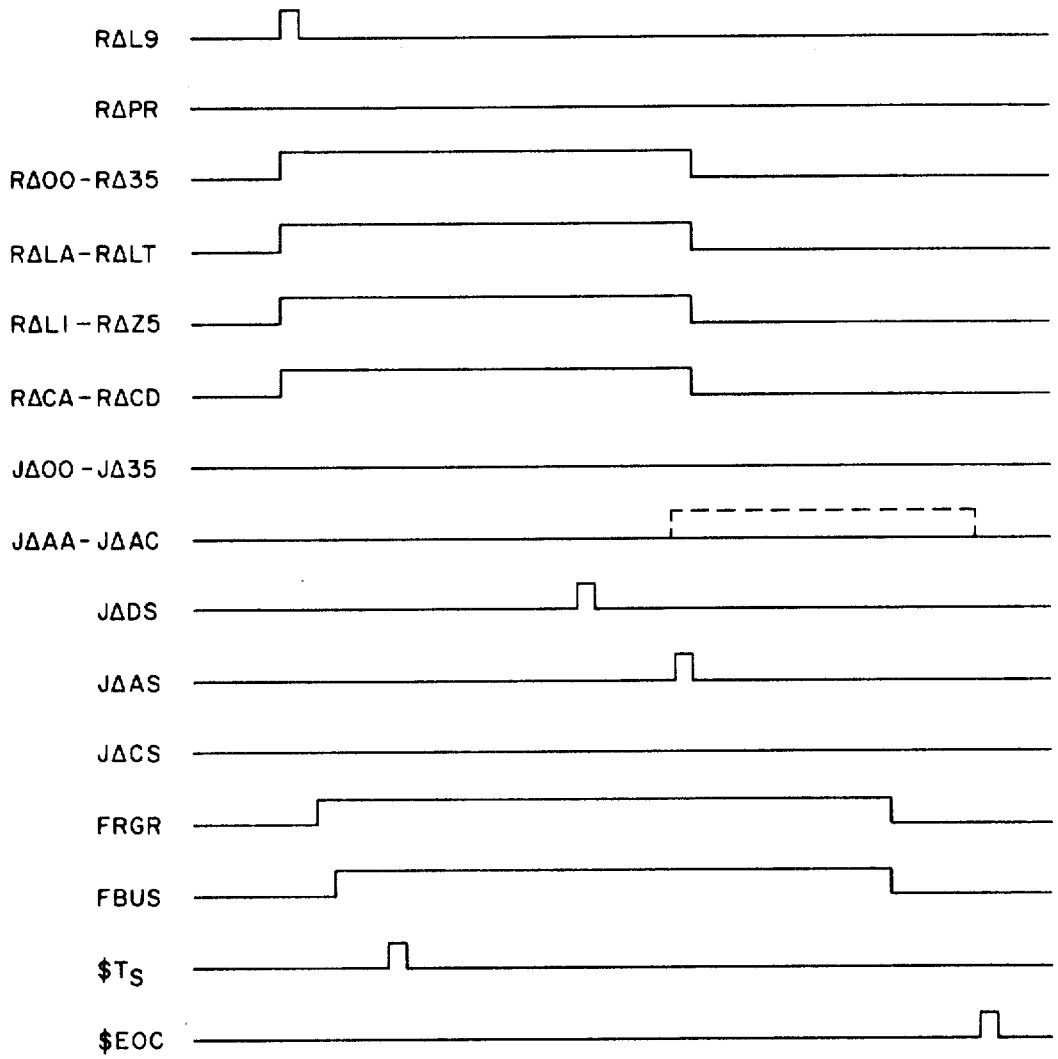
FIG. 9 is a timing diagram illustrating the sequence of signals which occur in response to the transmission of a clear/write command from the input/output controller to a memory controller.

During performance of a clear/write operation in response to a clear/write command from the input/output controller, memory controller 61 stores the information represented by information signals J∆00–J∆35 from the input/output controller in the memory storage location specified by address signals R∆LA–R∆LT. The signal sequence for the clear/write command, illustrated in FIG. 9, is similar to that of the read/restore command. During the clear/write sequence, memory controller 61 clears the addressed memory storage location and then stores the information provided by the input/output controller in that location. Memory controller 61 examines the zone signals during the clear/write command sequence and utilizes the zone signals, if a single character is to be stored to determine the position within the word of the character.

Set execute interrupt cells command

Figure 10:
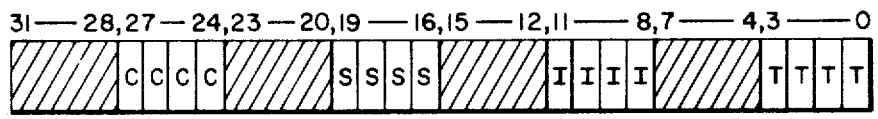
FIG. 10 is a symbolic diagram illustrating the memory interrupt register of a memory employed with the input/output controller of FIG. 4 and the contents of this register.

During execution of the set execute interrupt cells command, program interrupt request information is transmitted from the input/output controller to memory controller 61. This program interrupt request information is stored in the interrupt cells of the memory controller interrupt register contained in the memory program interrupt logic 73. The memory controller interrupt register, the organization of which is illustrated in FIG. 10, comprises thirty-two execute interrupt cells connected in a priority sequence. FIG. 10 also illustrates the cell corresponding to each type of interrupt request from each memory port. The program interrupt request transmitted by the input/output controller sets a predetermined one of the interrupt cells. The control processor, which is also connected to the memory controller, periodically checks the memory interrupt register for the presence of program interrupt requests set in the interrupt cells. Upon detection of a program interrupt request, the processor causes an appropriate subroutine to be executed to service the interrupt request in accordance with its priority.

Figure 11:
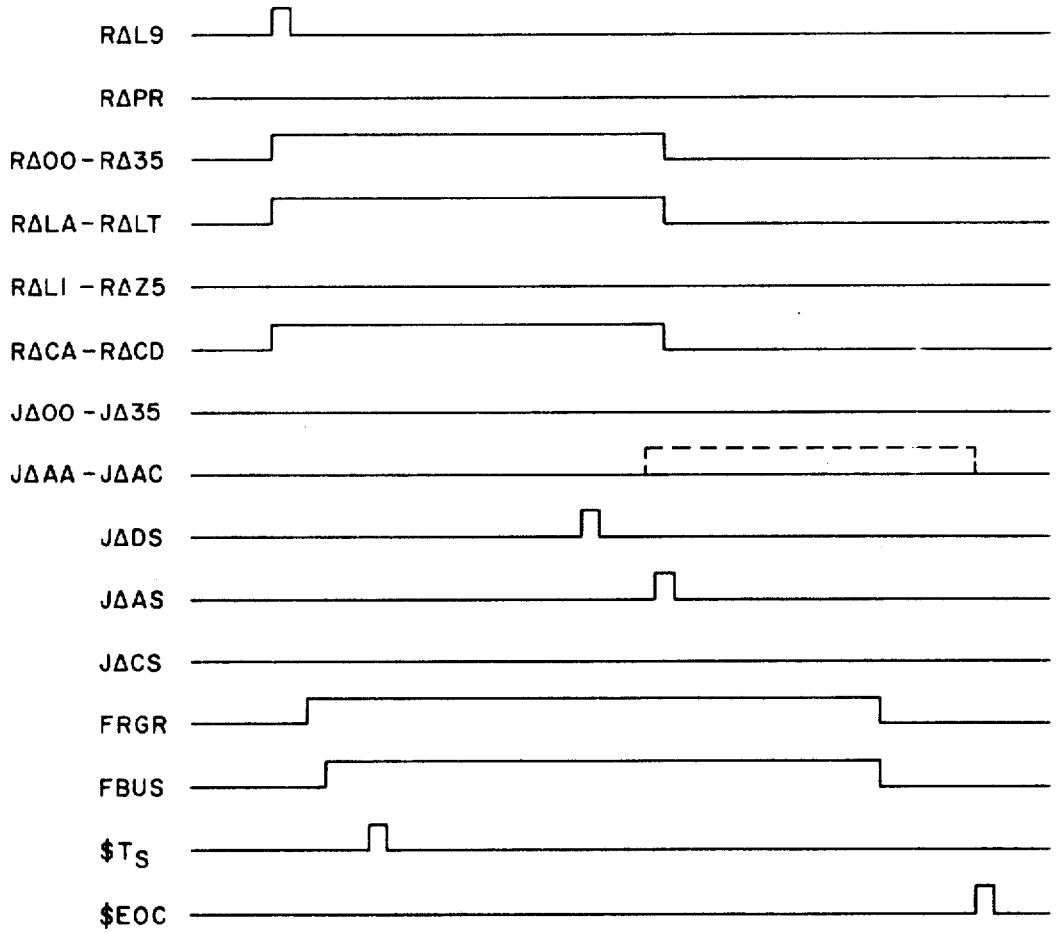
FIG. 11 is a timing diagram illustrating the sequence of signals which occur in response to transmission of a set execute interrupt cells command from the input/output controller to the memory controller.

The sequence of signals which occurs when the input/output controller stores program interrupt request information in the execute interrupt cells of the memory interrupt register is illustrated in FIG. 11. As in the signal sequence of the clear/write command, the sequence is initiated by transmission of memory access interrupt request signal RΔL9 to memory controller 61, along with protect signal RΔPR, information signals RΔ00–RΔ35, address signals RΔLA–RΔLT, and command signals RΔCA–RΔCD. The command signals define the "set execute interrupt cells" command. The information signals define which of the interrupt cells of the memory interrupt register are to be set during execution of the command by memory controller 61. Zone information is not transmitted to the memory controller during execution of this command. As illustrated in FIG. 11, the sequence of signals is similar to that of the clear/write command. The data available/stored signal JΔDS indicates to the input/output controller that the appropriate interrupt cells in the memory program interrupt logic have been set.

A more detailed description of the memory controller will be found in U.S. patent application Ser. No. 731,681, entitled "Communication Apparatus in a Computer System," by Frederick B. Banan et al., said reference being assigned to the same assignee as the present invention.

INPUT/OUTPUT CONTROLLER—PERIPHERAL SUBSYSTEM COMMUNICATION

Communication between a peripheral channel of the input/output controller and its respective peripheral subsystem is effected by means of a group of lines carrying predetermined singals. These signals comprise input signals transmitted from the peripheral subsystem to the peripheral channel and output signals transmitted from the peripheral channel to the peripheral subsystem. The signals passing between a peripheral channel and an associated peripheral subsystem are the same regardless of the type of peripheral subsystem, each of the peripheral subsytems receiving and transmitting the same number and type of signals during operation. Thus, any peripheral subsystem may be connected to any peripheral channel. In practice, because the peripheral channels are assigned relative priorities, the peripheral subsystem connected to a particular peripheral channel will be determined by the relative data transfer rate of the peripheral subsystem and other priority considerations.

Figure 12:
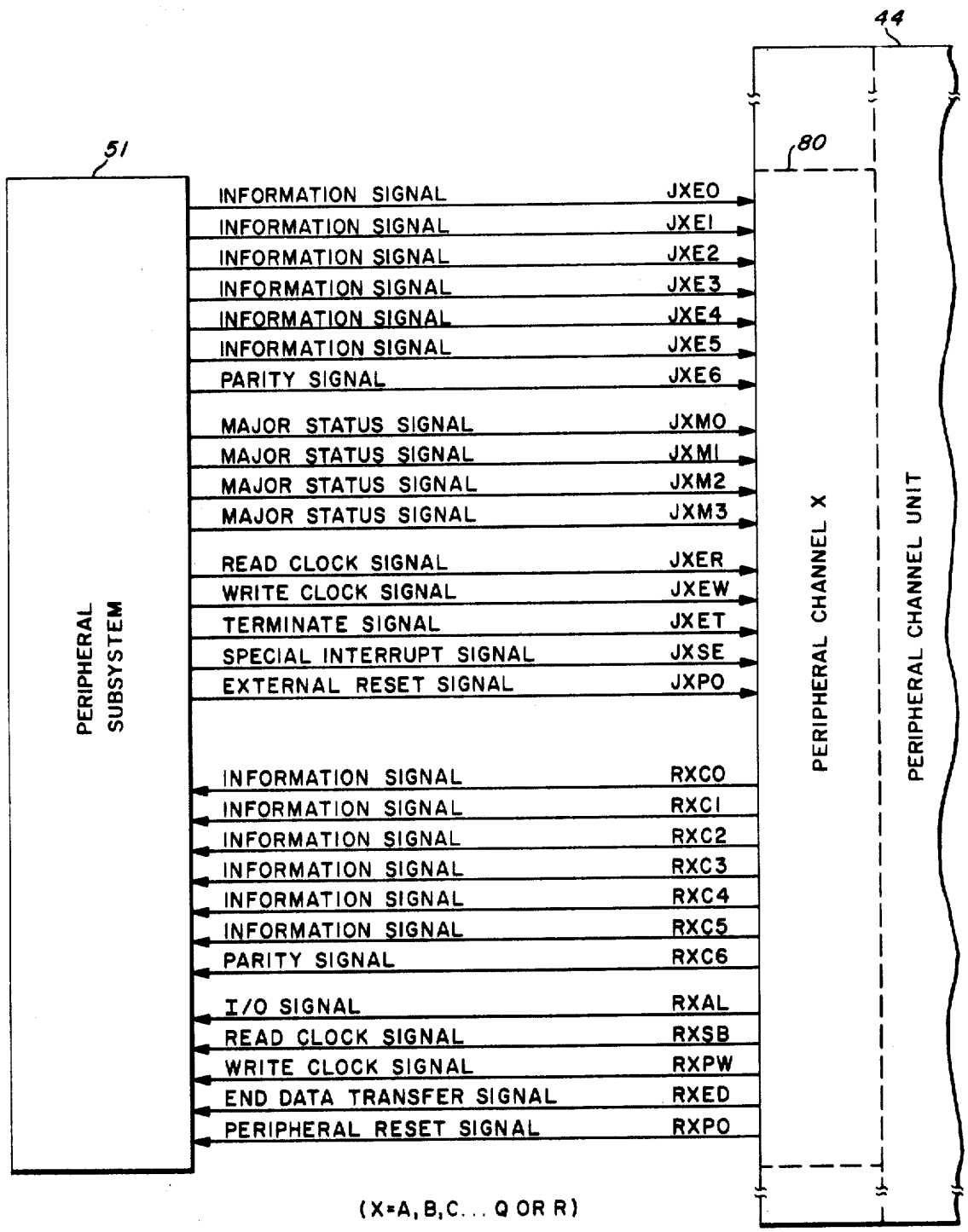
FIG. 12 is a symbolic diagram illustrating the interface between the input/output controller and a peripheral subsystem.

FIG. 12 illustrates a group of lines interconnecting a peripheral channel 80 of peripheral channel unit 44 with a peripheral subsystem 51 and illustrates the signals on these lines. Peripheral channel 80 is designated peripheral channel X, where X represents one of the alphanumeric characters A–H, J–N, and P–R corresponding to one of the peripheral channels of the peripheral channel unit.

SIGNAL TRANSFER—PERIPHERAL SUBSYSTEM TO PERIPHERAL CHANNEL

The input signals transmitted from the peripheral subsystem to the peripheral channel include six signals representing a character of information being transferred from peripheral subsystem 51 to peripheral channel 80 of peripheral channel unit 44. A signal is also provided for transmitting a parity bit from the peripheral subsystem to the peripheral channel unit. The information bits and the parity bit are identified as signals JXE0–JXE6, as illustrated in FIG. 12. The letter X in the signal designations represents one of the alphanumeric characters A–H, J–N, and P–R, each of these alphanumeric characters identifying one of the sixteen peripheral channels of the peripheral channel unit. For example, signals JAE0–JAE6 identify the information and parity bits being transmitted to peripheral channel A from its corresponding peripheral subsystem. Similarly, signals JQE0–JQE6 identify the information and parity bits being transmitted to peripheral channel Q from its corresponding peripheral subsystem.

Four bits of major status information, represented by signals JXM0–JXM3, are also transmitted from peripheral subsystem 51 to peripheral channel X. Additionally, a read clock signal JXER, a write clock signal JXEW, a terminate signal JXET, a special interrupt signal JXSE, and an external reset signal JXPO are transmitted from peripheral subsystem 51 to peripheral channel 80.

The six information signals JXE0–JXE5 serve to transfer both data characters and substatus information from the peripheral subsystem to the corresponding peripheral channel of the input/output controller. The major status signals JXM0–JXM3 indicate to the input/output controller the general status of the corresponding peripheral subsystem. The codes employed to represent major status are illustrated in FIG. 5h.

Read clock signal JXER is employed during the transfer of data from peripheral subsystem 51 to peripheral channel 80. Signal JXER indicates to peripheral channel 80 that a character of data has been transmitted by the peripheral subsystem and is available to the input/output controller on the information lines. Write clock signal JXEW is employed during the transfer of data from the input/output controller to the peripheral subsystem, and also during the transmission of command and address information from the input/output controller to the peripheral subsystem. When used during the transmission of data, the JXEW signal represents a request by the peripheral subsystem for a data character. When used during the transmission of command and address information to the peripheral subsystem, the signal JXEW represents a request by the peripheral subsystem either for the address or for the command information.

Terminate signal JXET is transmitted by the peripheral subsystem to the peripheral channel when a data transfer has been ended as, for example, when the peripheral subsystem detects a physical end-of-record. Special interrupt signal JXSE is employed by the peripheral subsystem to indicate that a unique situation has occurred within the peripheral subsystem. For example, special interrupt signal JXSE may indicate the completion of an off-line operation by a device of the peripheral subsystem, such as completion of a rewinding operation by a tape handler. External reset signal JXPO is employed to suppress transient signals from a peripheral subsystem and is also used to indicate when a peripheral subsystem is present and capable of communication with the peripheral channel.

SIGNAL TRANSFER—PERIPHERAL CHANNEL TO PERIPHERAL SUBSYSTEM

The output signals transmitted from peripheral channel 80 in FIG. 12 to peripheral subsystem 51 include six information signals RXC0–RXC5 and a parity bit represented by signal RXC6. I/O signal RXAL, read clock signal RXSB, write clock signal RXPW, end data transfer signal RXED and peripheral reset signal RXPO are also transmitted from peripheral channel 80 to peripheral subsystem 51.

Information signals RXC0–RXC5 serve to transfer command and device address information as well as data characters from peripheral channel 80 to peripheral subsystem 51. I/O signal RXAL is used by peripheral channel 80 to inform peripheral subsystem 51 that device address and command information is to be transmitted by the peripheral channel and received by the peripheral subsystem.

Read clock signal RXSB is used during the transfer of data from peripheral subsystem 51 to peripheral channel 80. Read clock signal RXSB indicates to the peripheral subsystem that the last character transmitted on the information lines has been received by the peripheral channel and the peripheral channel is ready to accept the next character. Write clock signal RXPW is used during the transfer of data from peripheral channel 80 to peripheral subsystem 51 and also during the transmission of device address and command information to the peripheral subsystem. During the transmission of data to the peripheral subsystem, signal RXPW indicates that a character of data has been transmitted by peripheral channel 80 and is available to the peripheral subsystem on the information lines. During the transmission of device address and command information to peripheral subsystem 51, write clock signal RXPW indicates to the peripheral subsystem that either device address or command information has been transmitted by the peripheral channel and is available to the peripheral subsystem on the information lines.

End data transfer signal RXED is transmitted by peripheral channel 80 to inform peripheral subsystem 51 that data transfer is to cease. In response to this signal, the peripheral subsystem discontinues the data transfer operation Peripheral reset signal RXPO is transmitted to peripheral subsystem 51 to initialize the peripheral subsystem so that it is capable of accepting a new I/O signal RXAL.

PERIPHERAL SUBSYSTEM—DETAILS

Figure 13:
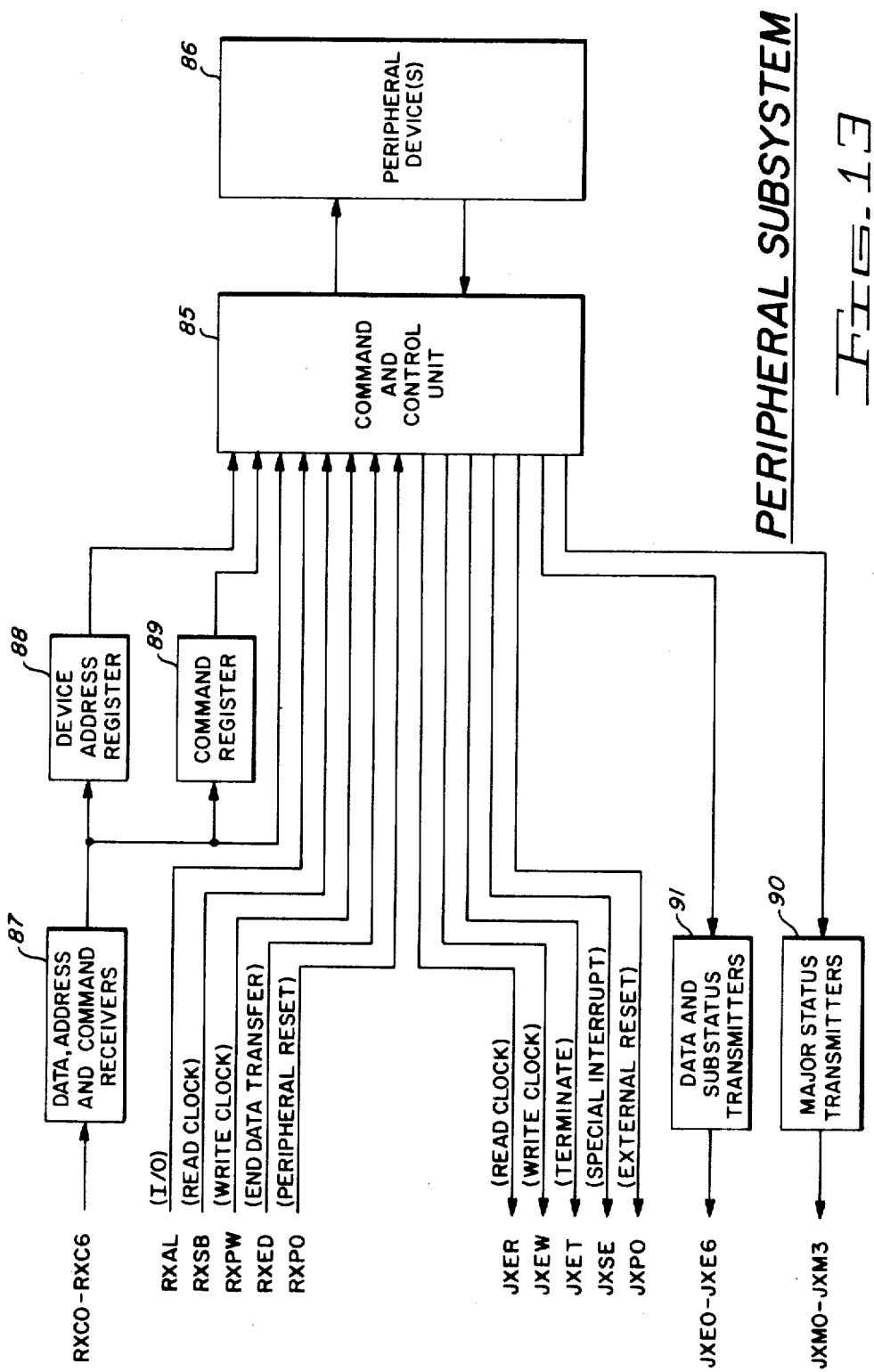
FIG. 13 is a major block diagram of a typical peripheral subsystem employed with the input/output controller of FIG. 4.

FIG. 13 is a block diagram of a representative peripheral subsystem and illustrates the general organization of the peripheral subsystem and the structure employed to receive and transmit signals passing between the peripheral subsystem and the corresponding peripheral channel. Referring to FIG. 13, coordination and control of the operations within the peripheral subsystem are effected by command and control unit 85 which receives all signals transmitted from the peripheral channel to the peripheral subsystem and which initiates all signals transmitted from the peripheral subsystem to the peripheral channel. Peripheral device 86 communicates directly with command and control unit 85. In certain peripheral subsystems, for example magnetic tape subsystems, a plurality of peripheral devices may be connected to command and control unit 85.

As illustrated in FIG. 13, information signals RXC0–RXC6 are applied to data, address, and command receivers 87. If information signals RXC0–RXC6 comprise data, this data is transmitted directly from receivers 87 to command and control unit 85. If signals RXC0–RXC6 comprise device address information, the output of receivers 87 is transmitted to device address register 88 which stores the identification of the one of peripheral devices 86 to which a command is directed. If signals RXC0–RXC6 comprise command information, this command information is transmitted from receivers 87 to command register 89 for application to command and control unit 85.

Major status information to be transmitted from the peripheral subsystem to the input/output controller originates in command and control unit 85 and is applied to major status transmitters 90 which generate major status signals JXM0–JXM3. Similarly, data and substatus information are applied to data and substatus transmitters 91 by command and control unit 85. Transmitters 91 provide information signals JXE0–JXE6 to the peripheral channel. The remaining signals transmitted from the peripheral subsystem to the peripheral channel are provided by command and control unit 85 as illustrated in FIG. 13.

Initiation of an operation in a peripheral subsystem is effected by the transmission of a device address and a device command from the input/output controller to the selected peripheral subsystem. The peripheral subsystem to which the command and address information is transmitted is determined by the peripheral channel address in bit positions 20–23 of the primary mailbox word illustrated in FIG. 5b. The peripheral device address is transmitted from the input/output controller to the peripheral subsystem to define the particular device of a multi-device peripheral subsystem for which the device command is intended. If the peripheral subsystem consists of only one device, the device address is ignored. If employed, the peripheral device address information transmitted to the peripheral subsystem by the input/output controller is obtained from the peripheral device address field in bit positions 24–29 of the primary mailbox word. The peripheral device command is transmitted by the input/output controller to define the exact function which the peripheral subsystem is to perform. The peripheral device command is also obtained by the input/output controller from the primary mailbox word, shown in FIG. 5b.

COMMAND SEQUENCE

Transmission of device address information, if needed, and command information from the input/output controller to a peripheral subsystem is accomplished by a specific sequence of signals exchanged between the input/output controller and the peripheral subsystem. This sequence, termed a command sequence, is illustrated in FIG. 14.

Figure 14:
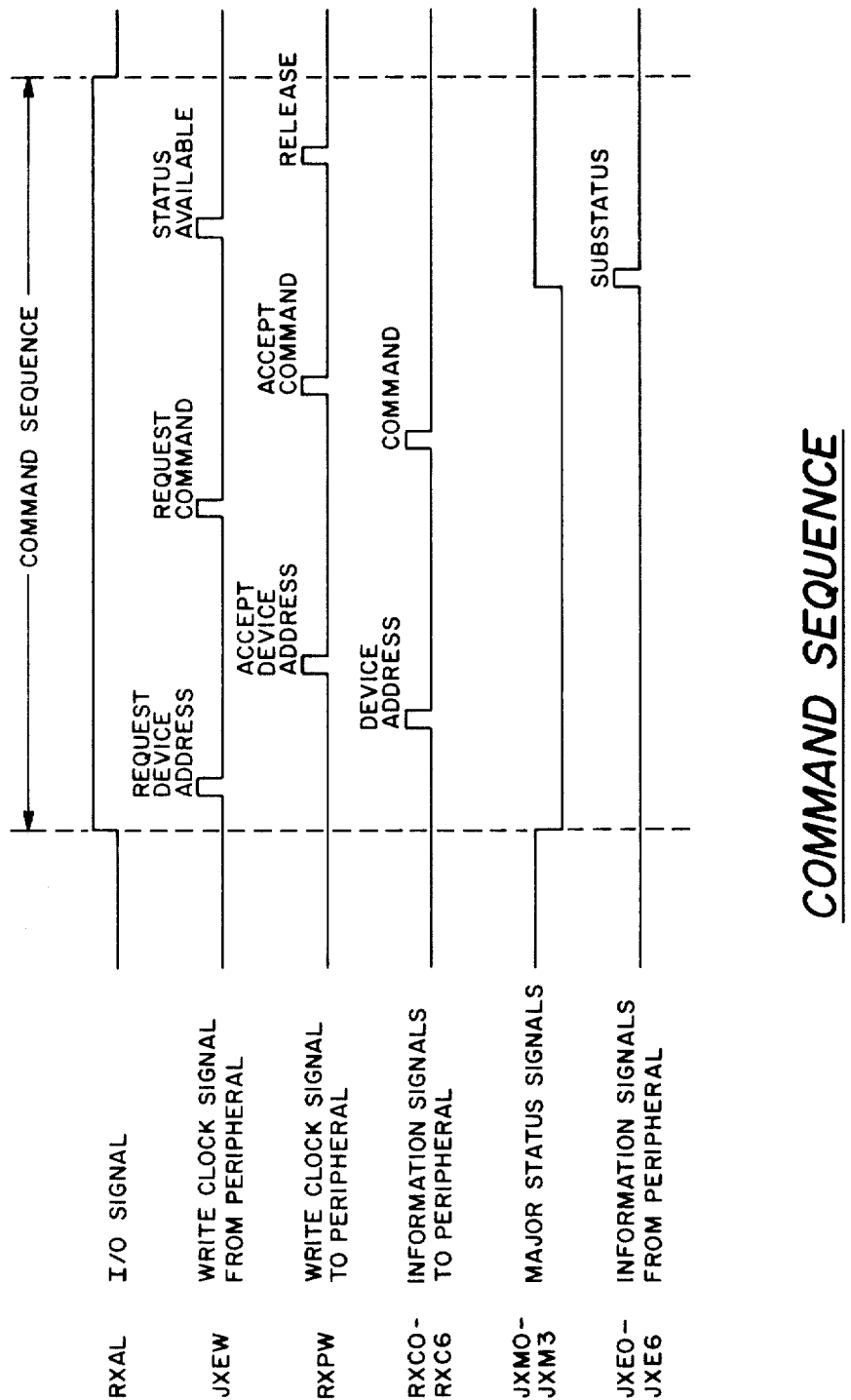
FIG. 14 is a timing diagram illustrating a command sequence during which address and command information are transferred between the input/output controller and a peripheral subsystem.

With reference to FIG. 14, the command sequence commences when the input/output controller transmits the I/O signal RXAL through the peripheral channel to the peripheral subsystem. In response to I/O signal RXAL, the peripheral channel resets the major status signal receivers to the 0-state. In addition, I/O signal RXAL causes the peripheral subsystem to transmit write clock signal JXEW. This signal represents a request for the device address. In response to this request, the input/output controller places device address information, represented by signals RXC0–RXC5, on the information lines and transmits write clock signal RXPW to indicate to the peripheral subsystem that the device address is available on the information lines.

Upon receipt of write clock signal RXPW, the peripheral subsystem transfers the device address information represented by signals RXC0–RXC5 to the device address register. If the peripheral subsystem is not a multi-device peripheral subsystem, the device address information is ignored. The peripheral subsystem next transmits write clock signal JXEW to the input/output controller, this signal representing a request for command information. In response to this request, the input/output controller places the command information, represented by signals RXC0–RXC5, on the information lines, also transmitting write clock signal RXPW to indicate to the peripheral subsystem that command information is available on the information lines.

Upon receiving the command information from the input/output controller, the peripheral subsystem transmits major status information to the input/output controller by means of major status signals JXM0–JXM3. If it is desirable to also transmit substatus information to the input/output controller, information signals JXE0–JXE5 are employed to transmit a six bit substatus character to the input/output controller. Subsequently, the peripheral subsystem transmits another write clock signal JXEW to the input/output controller to indicate that status information is available on the major status lines and, if substatus is also being transmitted, on the information lines. Following this "status available" signal, the input/output controller transmits another write clock signal RXPW, termed the "release" signal, to the input/output controller to indicate the end of the command signal sequence.

As a result of the command sequence, the peripheral subsystem connected to the peripheral channel addressed by the primary mailbox word receives address information, if a multi-device peripheral subsystem, identifying the peripheral device affected, and command information indicating the operation which the peripheral subsystem is to perform. If the peripheral device command requires transfer of data between the peripheral subsystem and the input/output controller, such data transfer is effected in either a read sequence or a write sequence.

READ SEQUENCE

Figure 15:
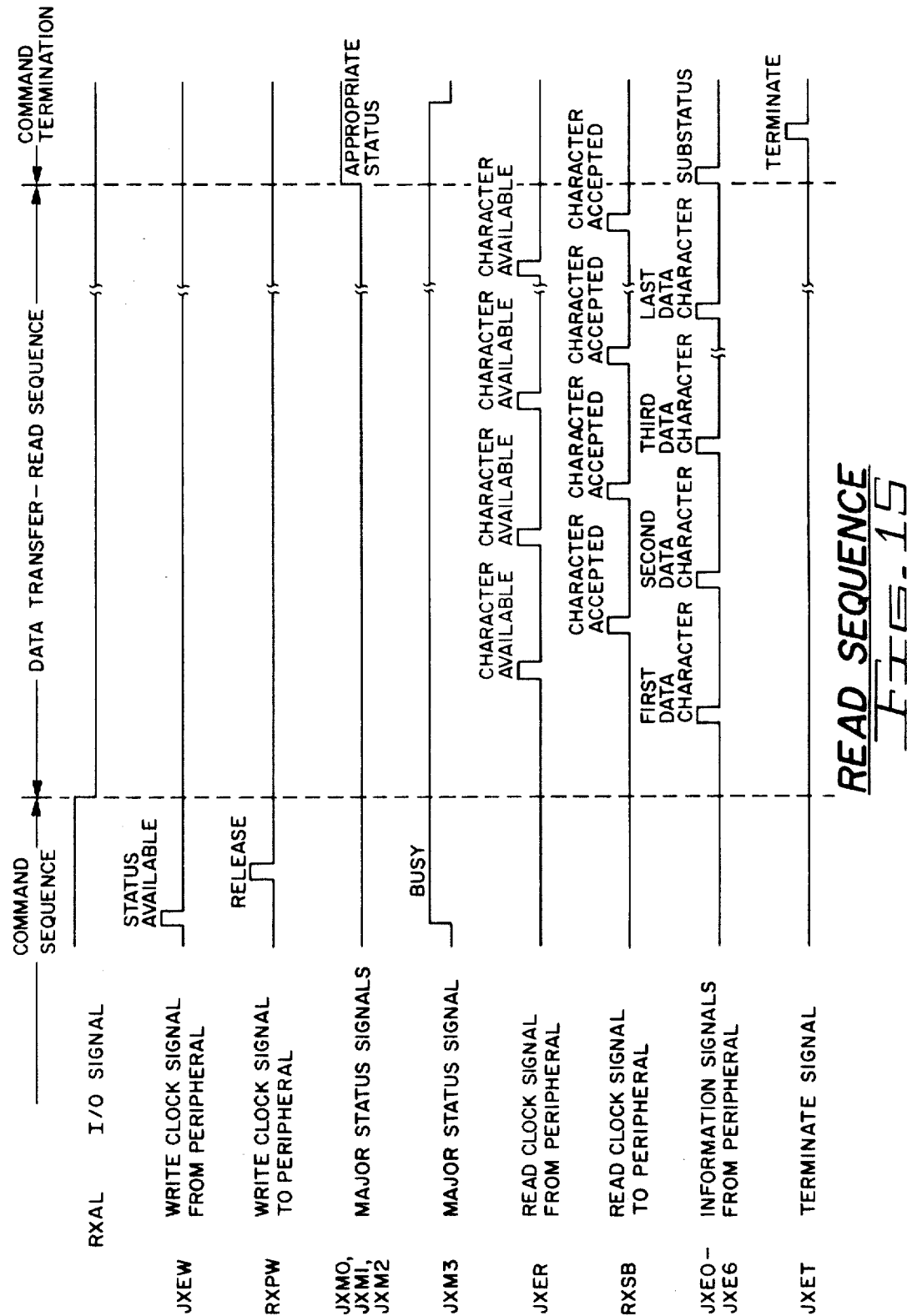
FIG. 15 is a timing diagram illustrating a read sequence during which information is transferred from a peripheral subsystem to the input/output controller.

During a read operation, a read sequence is performed to transfer data from a peripheral subsystem to the input/output controller. FIG. 15 is a timing diagram of the read sequence following the command sequence which initiated the read operation.

Referring to FIG. 15, if the command is accepted by the peripheral subsystem, the major status signals JXM0–JXM3 present the binary combination 0001 indicating a major status of busy. Following receipt of the "release" write clock signal RXPW from the input/output controller, the peripheral subsystem transmits the first data character, represented by information signals JXE0–JXE6. The peripheral subsystem also transmits read clock signal JXER to indicate to the input/output controller that the first character is available on the information lines. Upon acceptance of the first character by the input/output controller, read clock signal RXSB is transmitted by the peripheral channel to the peripheral subsystem to indicate that the second character may be sent.

The read signal sequence is repeated until data transfer from the peripheral subsystem to the input/output controller is terminated. Such termination may be caused by:

(a) Transmission of an end data transfer signal RXED (not shown in FIG. 15) from the input/output controller to the peripheral subsystem.

(b) Detection of an error or malfunction condition by the peripheral subsystem which requires termination of the read operation, or (c) Determination by the peripheral subsystem that all data required for execution of the command has been transmitted and the last data character has been accepted by the input/output controller.

When, for one of the three reasons listed above, the peripheral subsystem determines that the transfer is to be terminated, major status is indicated by major status signals JXM0–JXM3. If appropriate, information signals JXE0–JXE5 are employed to transmit a six bit substatus character from the peripheral subsystem to the input/output controller. The peripheral subsystem then transmits terminate signal JXET to the input/output controller.

WRITE SEQUENCE

Figure 16:
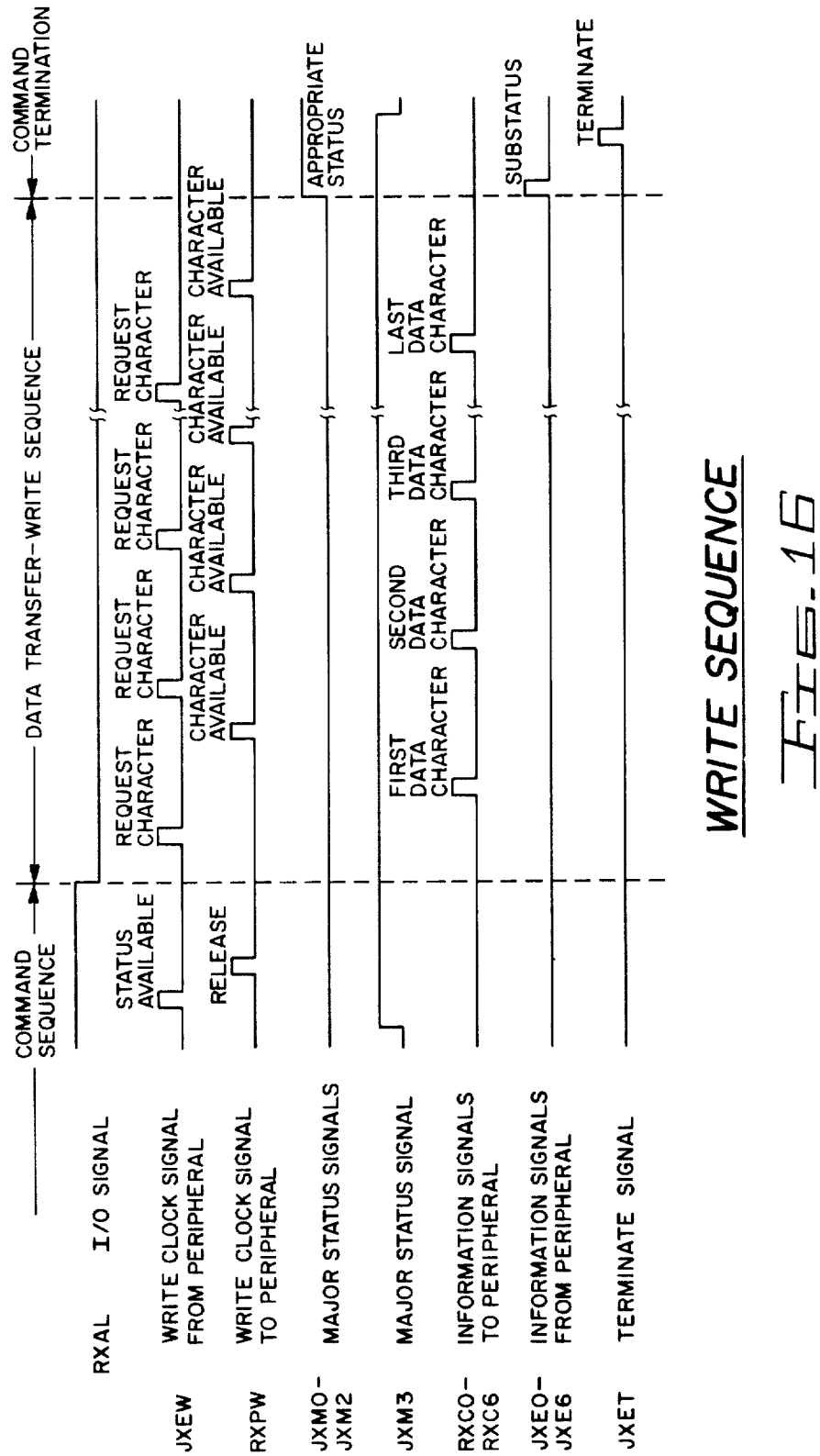
FIG. 16 is a timing diagram illustrating a write sequence during which information is transferred from the input/output controller to a peripheral subsystem.

If the command transmitted from the input/output controller to a peripheral subsystem requires a write operation, i.e., data transfer from the input/output controller to the peripheral subsystem, a write sequence is performed. FIG. 16 illustrates the write sequence following the command sequence which initiated the write operation.

Referring to FIG. 16, the peripheral subsystem indicates a major status of "busy" upon acceptance of the command by the peripheral subsystem, just as in the read sequence. The peripheral subsystem then transmits write clock signal JXEW to the peripheral channel of the input/output controller to request a character. In response to the request, the input/output controller places a data character, represented by signals RXC0–RXC6, on the information lines and then transmits write clock signal RXPW to the peripheral subsystem to indicate that the first data character is available on the information lines.

Following receipt of the "character available" signal, the peripheral subsystem accepts the data character and transmits write clock signal JXEW to request the next character. This sequence of signals continues until it is determined that the last character necessary to complete execution of the command has been received from the input/output controller. This termination may be caused by any of the three events described for the read sequence. The peripheral subsystem then indicates its major status by means of signals JXM0–JXM3 and, if appropriate, transmits substatus information to the peripheral channel by means of information signals JXE0–JXE6. The peripheral subsystem then transmits terminate signal JXET to the input/output controller.

PERIPHERAL MAJOR STATUS

As described in the sections entitled "Read Sequence" and "Write Sequence," major status signals JXM0–JXM3 are used to indicate the major status of a peripheral subsystem to the input/output controller. These major status signals are also employed to enable a peripheral subsystem to respond to "request status" and "reset status" peripheral device commands transmitted from the input/output controller. The nine status conditions and the bit configurations corresponding to these conditions which may be transmitted to the input/output controller are as follows:

| JXM3 | JXM2 | JXM1 | JXM0 | Status condition |
|---|---|---|---|---|
| 0 | 0 | 0 | 0 | Channel/Peripheral Subsystem Ready. |
| 0 | 0 | 0 | 1 | Device Busy. |
| 0 | 0 | 1 | 0 | Device Attention. |
| 0 | 0 | 1 | 1 | Device Data Alert. |
| 0 | 1 | 0 | 0 | End of File. |
| 0 | 1 | 0 | 1 | Command Reject. |
| 0 | 1 | 1 | 0 | Intermediate Condition. |
| 0 | 1 | 1 | 1 | Program Load Termination. |
| 1 | 0 | 0 | 0 | Channel/Peripheral Subsystem Busy. |

Each of the status conditions is described below. If a peripheral subsystem contains only one device, device status is therefore also subsystem status.

(a) Channel/Peripheral Subsystem Ready: In response to a command other than a "request status" command, a "reset status" command or a command requiring a status of "Channel/Peripheral Subsystem Busy," this status indicates that the command has been accepted. In response to a "request status" or a "reset status" command, this status indicates that the addressed device is ready and able to accept the command. Upon termination of execution of a command, this status indicates that the execution of the command was error free and the device in which the command was executed is ready and able to execute another command.

(b) Device "Busy": This status occurs only in a multi-device peripheral subsystem and is used only during a command sequence, never at the termination of execution of a command. This status indicates that the command may not be accepted because the addressed device is in the process of executing an operation which does not require the entire peripheral subsystem to be in the busy state.

(c) Device Attention: In response to a command, this status indicates that the command may not be executed by the addressed device until operator intervention at the peripheral subsystem to correct an existing inoperable condition. At the termination of execution of the command, this status indicates that an attention condition was detected during execution of the command which prohibits the execution of further commands by the device until operator intervention to correct the condition occurs.

(d) Data Device Alert: This status occurs only in response to a "request status" command. It indicates that some type of data error or alert condition was detected during execution of the last command.

(e) End of File: This status ocurs only in response to a "request status" command and indicates that the logical end of file was detected during the execution of the last command.

(f) Command Reject: This status is used only during a command sequence to indicate that the command is being rejected for one of the following reasons:

command not recognizable,
command received with incorrect parity,
device address not recognizable,
device address received with incorrect parity, or
command inconsistent with current state of device.

The command reject status does not prevent subsequent acceptance of a command by the peripheral subsystem.

(g) Intermediate Condition: This status occurs in response to a "request status" command or a "reset status" command to indicate that the addressed device, while not currently in the busy state, will either revert to the busy state because of a previously received command or anticipates reception of a command which will cause it to revert to the busy state. Upon completion of execution of a command, this status indicates that the command was executed without detection of an error condition and that the device will revert to the busy state.

(h) Program Load Termination: This status occurs only in response to a "request status" command and indicates that the last operation executed by the peripheral subsystem was a program load operation, and was executed successfully.

(i) Channel/Peripheral Subsystem Busy: In response to a command, this status indicates that the command has been accepted and will be executed upon completion of the command sequence. In addition, this status indicates that the execution of the command requires the entire peripheral subsystem to revert to the busy state, precluding any further command reception by the peripheral subsystem until execution of the current command is terminated.

A "reset status" command causes all resettable status within the peripheral subsystem to be reset. The only status conditions which may be used in response to this command are:

Channel/Peripheral Subsystem Ready,
Device Busy,
Device Attention, and
Intermediate Condition.

In response to a "request status" peripheral device command, a peripheral subsystem indicates the status of the addressed device upon the appropriate status lines. The following status conditions may be transmitted to the input/output controller in response to a "request status" command:

Channel/Peripheral Subsystem Ready,
Device Busy,
Device Attention,
Device Data Alert,
End of File,
Intermediate Condition, and
Program Load Termination.

The status condition of "command reject" may not be used in response to a "request status" command.

INPUT/OUTPUT CONTROLLER—DETAILS

The input/output controller will now be described with reference to FIG. 17. FIG. 17 illustrates diagrammatically the elements of the input/output controller which store and process information, the paths of information transfer between these elements, and certain other logic of the input/output controller.

Microprogram storage unit

The IOC command contained in the primary mailbox word may be any one of seven as described in the section entitled "Primary Mailbox Word." The IOC command determines the operation to be performed by the input/output controller. The IOC command of the primary mailbox word is supplemented by information contained in the secondary mailbox words corresponding to the peripheral channel designated in the primary mailbox word. Thus, the total command information received by the input/output controller is provided by the primary and secondary mailbox words. The input/output controller may effectively receive additional commands before completing execution of a prior command inasmuch as storage is provided for the command information corresponding to each peripheral channel.

In executing the operation designated by the command information contained in the primary mailbox word and the secondary mailbox words, the input/output controller performs one or more routines stored in the microprogram storage unit 41. Each routine comprises a plurality of microsteps. The sequence of microsteps in a given routine is determined by an odd program counter and an even program counter which cooperate to alternately provide successive addresses to the microprogram storage unit. The microstep address in the program counters may be altered, in response to conditions occurring within or without the input/output controller, to transfer from one subroutine to another subroutine within a routine or to change from one routine to another routine.

Each count furnished by the program counters to the microprogram storage unit identifies one microstep. In response to each address, the microprogram storage unit 41 generates a plurality of control signals which are transmitted to other units of the input/output controller to condition the apparatus as necessary for effecting the execution of the corresponding microstep.

As depicted in FIG. 17a, the microprogram storage unit 41 comprises an even count (AA) storage register 100, even program counter decode/encode logic 101, odd count (AB) storage register 102, odd program counter decode/encode logic 103, switch bistables 104, AND-gate arrays 105, 106, and OR-gate arrays 107.

At a given instant, the binary number stored in the AA register 100 represents the count in the even program counter, and the count will have been present in the AA register 100 a sufficient period for the program counter decode/encode logic 101 to have settled. At this given instant, therefore, the output signals from the even program counter decode/encode logic 101 to the AND-gate arrays 105 are valid control signals in a combination predetermined for the specific count in the AA register. When the switch bistables 104 are placed into the clear state by the switch control apparatus of the processing and control unit 43, binary 1 signals issue from their "zero" outputs thereby enabling the AND-gate arrays 105. The output signals from the AND-gate arrays 105 pass through the OR-gate arrays 107 and are distributed throughout the input/output controller on the class control lines, transmit control lines, process control lines, receive control lines, constant control lines, and jump control lines as illustrated in FIG. 17a. Inasmuch as it is well within the purview of the skilled logical designer to derive specific circuitry for issuing the control signals necessary for executing a predetermined microoperation in response to a count designating the microoperation, it is deemed superfluous to present detailed structure for accomplishing this function. One may refer to U.S. Pat. 3,409,880, the section entitled "Microprogram Storage Unit" for a detailed description of suitable apparatus for deriving such control signals from a count.

While a microoperation is being executed in the input/output controller in response to an even program count, the odd program counter is incremented or otherwise altered and the odd program count is placed into the AB register 102. The odd program counter decode/encode logic 103 responds to this new count in the AB register 102 by presenting a new configuration of control signals to the AND-gate arrays 106. When the execution of the previous microoperation is completed, the switch control in the processing and control unit 43 causes the switch bistables 104 to assume the set state such that the "one" outputs of the bistables issue binary 1 signals. The signals from the "one" outputs of the switch bistables 104 therefor enable the AND-gate arrays 106 such that the control signals developed in the odd program counter decode/encode logic 103 are transmitted to the various control lines through the OR-gate arrays 107.

To avoid needless complications in the drawing and specification, the control signals issuing from the microprogram storage unit are represented by the symbol illustrated in FIG. 17a, viz.: a K enclosed in a circle. It will be understood that the signals represented by this symbol are diverse and are applied to the logic of the input/output controller according to the response of the even program counter decode/encode logic 101 and the odd program counter decode/encode logic 103 to the counts appearing in the AA register 100 and the AB register 102, respectively.

The provision of duplicate decode/encode apparatus in the microprogram storage unit permits overlapping the execution of one microstep in the input/output controller with the generation of the control signals required to execute the next microstep. This arrangement permits higher speed operation of the input/output controller.

Memory communications unit

The memory communications unit 42 of the input/output controller comprises memory ports 110, 111, 112, and 113 as illustrated in FIG. 17b. Each of the memory ports 110–113 includes a plurality of signal receivers for receiving signals transmitted from a memory controller to the input/output controller memory port and a plurality of signal transmitters for transmitting signals from the input/output controller memory port to the associated memory controller. These signals providing communication between the input/output controller and the one or more memory controllers have been described in the section entitled "Input/Output Controller-Memory Controller Communication."

The address signal transmitters 115 receive address information from the L register of the working register unit 46 when data is being transferred between the input/output controller and the memory controller. The address information specifies to the memory controller the memory location to be affected by the data transfer. Logic, not shown in FIGS. 17b, may be provided to identify the one memory controller which exercises operational control over the input/output controller. When such logic is provided, only the address signal transmitters of one of the plurality of memory ports will be permitted to address certain fixed locations in the control memory as, for example, during the retrieval of primary or secondary mailbox words or storage of information in the interrupt queue counters or the interrupt queue tables. A suitable arrangement for effecting such designation of a control memory will be found in U.S. Patent 3,409,880 previously referenced in this specification.

Memory command signal transmitters 116 receive information from the L register of the working register unit 46 and provide memory command signals to the memory controller connected to memory port 110.

The zone control signal transmitters 117 receive signals from the L register of the working register unit 46 and provide zone control information to the memory controller connected to the memory port 110.

Memory access request interrupt logic and signal transmitter 119 receives a signal from the L register and responds to provide memory access interrupt request signal RΔL9 to the memory controller connected to the memory port 110.

The information transmitters and logic 119 receive information from the U register or V register of the working register unit 46 via the U/V bus and provide information signals RΔ00–RΔ35 to the memory controller connected to the memory port 110.

The information receivers and logic 120 receive information signals JΔ00–JΔ35 from the memory controller connected to the memory port 110 and provide corresponding information signals to the Q register of the working register unit 46. The data available/stored receiver and logic 121 receives signal JΔDS from the memory controller to indicate that the information represented by signals JΔ00–JΔ35 is valid and may be transferred to the Q register of the working register unit.

Protect signal transmitter 122 is connected to a source of potential representing a binary 1 and continuously provides protect signal RΔPR to the memory controller connected to the memory port 110 to permit the input/output controller access to all areas of memory. This signal is necessary to satisfy the interface requirements of the memory controllers even though it remains continuously at binary 1 when originating at an input/output controller.

The connect signal receiver 123 receives the connect signal JΔCS from the control memory controller and provides a notification of the reception of a connect signal to the processing and control unit 43. Connect signals are recognized only from the memory controller which is recognized as the control memory for the input/output controller.

Illegal action code available signal receiver 124 receives signal JΔAS which indicates that the information present on the illegal action code signal lines is valid. Illegal action code signal receivers and logic 125 receive the illegal action code signals JΔAA–JΔAC which indicates the presence or absence of an error external to the input/output controller and, in conjunction with the error and due counter logic 126, indicate the presence of a specific error condition to the processing and control unit 43.

Working register unit

Referring now to FIG. 17c, working register unit 46 comprises a plurality of registers disposed between a receive bus 130 and a transmit bus 131 and additional registers which receive signals from the receive bus or transmit signals to the transmit bus. Transfer of information into and from the several registers of the working register unit is coordinated by control signals originating in the microprogram storage unit 41, previously described.

The L register 132 is utilized to store control information for the memory controller. The L register receives information from the receive bus 130 through input AND-gates 133; and output signals representing the contents of the L register are made available to the memory controller, through the memory communications unit 42, be selectively enabling the output AND-gates 134. Address, zone control, and command information are contained in the L register 132 and are transferred to the memory controller during operations in which information is exchanged between the memory controller and the input/output controller. The Q register 135 receives data from the memory controller through the memory communications unit 42 under control of input AND-gates 136. Data from the Q register 135 is placed on the transmit bus 131 through the output AND-gates 136 and transmit bus input OR-gate array 137.

The U register 138 is the normal data output register to the memory controllers through the memory communication unit 42. The U register receives information from the receive bus 130 under control of input AND-gates 139. Output signals from the U register are applied to OR-gates 141 under control of output AND-gates 140. The output signals from the OR-gates 141 are placed on the U/V bus 142 for transmission to the memory communications unit 42 and thence to the memory controller. The V register 143 is a supplementary data output register used in conjunction with the U register 138 particularly during data service operations involving high speed peripheral subsystems. The V register receives information from the receive bus 130 under control of input AND-gates 144. Output signals from the V register are directed to the OR-gates 141 under control of output AND-gates 145 and are thus made available to the N/V bus.

The C register 146 is a 36-bit working register used for temporary storage and/or processing of information. Under control of input AND-gates 147, information may be received into the C register 146 from the receive bus 130 in full 36-bit words. Under control of the output AND-gates 148, information is transmitted from the C register to the transmit bus 131 as either a full 36-bit word or a truncated, 18-bit word comprising bits 18–35.

The G register 149 is a 36-bit working register which receives, under control of input AND-gates 150, a full 36- bit word or a truncated word, comprising bits 18–35, from the receive bus 130. Information is transmitted to the transmit bus 131 from the G register 149 under control of the output AND-gates 151 which may selectively pass all 36-bits, bits 0–14, or bits 18–35 as required by the microstep being executed.

The H register 152 is also a 36-bit working register used for the temporary storage and/or processing of data. A full 36-bit word or a truncated word comprising bits 18–35 may be received into the H register 152 under control of input AND-gates 153. Information is transmitted from the H register 152 to the transmit bus 131 under control of the output AND-gates 154 which may deliver a full 36-bit word or the upper 18 bits (18–35) during a microstep requiring such bit manipulation.

A plurality of DCW registers 155 are provided, one DCW register being assigned to each peripheral channel. The DCW registers provide temporary storage for the data control words of the several channels such that the data control words can be utilized and updated as required during information transfer. Information is received from the receive bus 130 into the DCW registers under control of the input AND-gates 156. The data control words are available to the transmit bus 131 through the OR-gates 163 under control of the output AND-gates 157 which drive OR-gates 158.

LPW (list pointer word) registers 159 are provided for each of the peripheral channels utilized. These LPW registers provide temporary storage for list pointer words; i.e., the contents of secondary mailbox #2. The LPW registers receive information from the receive bus 130 under control of the input AND-gates 160; and the contents of the LPW registers are made available to the transmit bus 131 through the OR-gates 163 under control of the output AND-gates 161 which drive common OR-gates 162.

Buffer storage unit

The buffer storage unit 45 of the input/output controller comprises, in a maximum configuration, forty-four 41-bit data buffer registers 170 for temporarily storing information being transferred between the peripheral sub-systems and one or more memories. Referring to FIG. 17d, the data buffers 170 are allocated two pairs for each high speed channel (A, B, C, D, E, and F) and one pair for each normal speed channel. In addition to the data buffers, the buffer storage unit 45 comprises D register 171, TC register 172, and TF register 173.

The data buffers 170 provide temporary storage for six 6-bit data characters in bits 0–35; a parity bit in bit 36; a character count in bits 37–39; and an EDX (end data transfer) bit in bit 40. The character count field provides a running indication of the number of data characters which have been extracted from or inserted into the particular data buffer during a data transfer operation. The character count reflects a full, partially full, or empty condition of the data buffer to the microprogram during a terminate sequence. The character count also provides an indication to the peripheral channel unit 44 that the next data buffer for the peripheral channel is to be used for subsequent data transfer.

The D register 171 is employed to store information received from the data buffers 170 to be transmitted to the peripheral channel unit 44 or to the process bus. The contents of the D register may also be shifted, on a character-by-character basis, to the data buffers 170 and hence may cooperate with the shift command logic 174 to effect information shift within the data buffers. The manner in which shifting operations are effected in presented in detail in the previously referenced U.S. Patent 3,409,880.

The TC register 172 is a 7-bit register which receives, serially, characters from the peripheral subsystems through the peripheral channel unit 44. A parity bit accompanies each character, and the characters are subjected to an odd parity check by the parity check logic 175 as they are received into the TC register. A character in the TC register is shifted into the lowest order character position, comprising bits 0–5, of an addressed data buffer 170 under control of the shift command logic 174. As additional characters are received, the information is shifted through the D register 171 to the higher order character positions of the addressed data buffer as noted above.

Command and buffer address information is received into the TF register 173 from the peripheral channel unit 44 to identify the data buffer 170 which is to receive or transmit information and to indicate the operation to be carried out. The buffer address, contained in bits 0–5 of the TF register, is decoded in the buffer address decode logic 176 which drives the buffer access logic 177. The buffer access logic 177 controls gate arrays, not shown in FIG. 17d, to steer incoming information into the appropriate data buffer 170 or outgoing information from the appropriate data buffer.

Command information from the peripheral channel unit 44 is stored in bits 6–8 of the TF register 173. Command decode logic 189 interprets the command configuration and responds by activating, singly or in combination as required, the clear command logic 178, read command logic 179, write command logic 180, and shift command logic 174. During a read cycle, the read command logic 179 enables the data buffer output AND-gates 181 such that the information in the addressed data buffer is transferred to the D register 171. During a clear/write operation, the clear command logic 178 cooperates with the biffer access logic 177 to preclear the addressed data buffer, and the write command logic 180 activates the AND-gate array 182 such that the addressed data buffer 170 receives information from the receive bus 130.

During a shift operation, the shift command logic 174 controls the AND-gate array 183 to effect information transfer from the TC register 172 to the lowest order character position 5 of the addressed data buffer 170 and also controls the character-by-character shift in the addressed data buffer by activating the AND-gate arrays 184 and 185. The AND-gate array 185 provides an indication to the word count increment logic 186 of each shift such that the word count increment logic updates the character count field, bits 37–39, of the addressed data buffer.

The shift operation is also utilized when information is transferred on a character-by-character basis from an addressed data buffer 170 to the peripheral channel unit 44. Under control of the read command logic 179 and shift command logic 174, the information contained in the addressed data buffer is transferred in parallel to the D register 171; and the highest order character of the data word, bits 30–35, is shifted through the data out logic 187 to the peripheral channel unit. Simultaneously, a parity bit is generated in the parity generator logic 188 for each character shifted to the peripheral channel unit. As the highest order character is shifted to the peripheral channel unit, the lower order characters are successively shifted to the next higher order character position in the manner previously described until a full six character data word has been transferred to the peripheral channel unit or until the information transfer is otherwise terminated.

Processing and control unit

The processing and control unit 43 of the input/output controller is illustrated in FIGS. 17e1 and 17e2. Referring to FIG. 17e1, the elements of the processing and control unit 43 organized around the JA (jump address) bus 200 comprise odd program counter 201, even program counter 202, increment logic 203, EJ register 204, SP register 205, and jump logic 206.

The odd program counter 201 contains the microstep address to be utilized by the odd program counter decoder/encoder logic 103 of the microprogram storage unit 41 for developing control signals as described in the section entitled "Microprogram Storage Unit." The even program counter 202 contains the next microstep address to be utilized by the even program counter decode/encode logic 101 of the microprogram storage unit. The increment logic 203 responds to the completion of a microstep by incrementing the odd and even program counters and also provides a signal to the microprogram storage unit to indicate whether an odd or even microstep shall be executed next.

The EJ register 204 is utilized to hold the address of the first microstep of an error routine or the address of a microstep that will jump to an error routine. The SP register 205 is used to temporarily store the microstep address of a microstep that was not completed because the microprogram jumped to a higher priority sequence. The jump logic 206 is responsive to conditions within the input/output controller and the peripheral subsystems to coordinate the interruption of a sequence under execution and the substitution of a higher priority sequence requiring immediate attention.

The JA bus 200 is utilized to manipulate addressed information among the several registers and counters with outputs to or inputs from the JA bus. The odd program counter 201 and even program counter 202 receive address information from the JA bus 200 under control of respective AND-gate arrays 207 and 208. The count in the odd program counter 201 is transmitted to the microprogram storage unit 41 for decoding under control of the output AND-gate array 209. Similarly, output AND-gate array 210 controls the transmission of the count in the even program counter 202 to the microprogram storage unit. Under control of the jump logic 206, AND-gate arrays 211 and 212 are selectively enabled to drive OR-gate array 213 to permit temporary storage of the microstep address in the SP register 205. The SP register also receives address information from the JA bus through the AND-gate array 214. Address information from the JA bus to the EJ register 204 is transmitted through the AND-gate array 215.

Address information is placed on the JA bus 200 from the control lines of the microprogram storage unit 41 and from the output of an OR-gate array 215. The OR-gate array 215 receives signals from AND-gate arrays 216, 217, and 218 which are driven by the jump logic 206, the SP register 205, and the EJ register 204, respectively.

Referring now to FIG. 17e2, it will be observed that much of the processing and control unit is organized to function in conjunction with the receive bus 130, the transmit bus 131, and the process bus 220. Information on the receive bus is made available to the ER register 201, the E register 202, the K register 203, and the A register 204 under control of respective AND-gate arrays 205, 206, 207, and 208. Output signals from the ER register 201, K register 203, A register 204, and F register 209 are selectively transmitted to an OR-gate array 210 under control of AND-gate arrays 211, 212, 213, and 214. The output signals from the OR-gate arrays 210 are impressed on the transmit bus 131.

The F register 209 receives information from the memory communication unit 42 and the peripheral channel unit 44. In addition to the information available on the receive bus 130, the ER register 201 receives information from the memory communication unit 42, the E register 202 receives information from the F register 209 through AND-gate array 215, and the K register 203 receives information from the peripheral channel unit.

Information on the transmit bus 131 is made available to the input/output processor 251 and to an AND-gate array 252 under control of another AND-gate array 253. Output signals from the input/output processor 251 are impressed on an OR-gate array 254 under control of AND-gate array 255; the output signals from AND-gate array 252 are also impressed on the inputs to the OR-gate array 254. In addition, signals representing the contents of the D register 171 in the buffer storage unit 45 are another set of inputs to the OR-gate array 254. The output signals from the OR-gate array 254 comprise the information on the process bus 250 which is selectively gated to the receive bus 130 under control of the AND-gate array 256.

The input/output processor 251 comprises a 15–27 incrementer, a 0–11 incrementer, a 6–11 incrementer, a 0–5 decrementer, a carry predictor, a character encoder, a magnitude comparator, and an adder. The 15–27 incrementer actually comprises three separate incrementers; viz: a 15–17 incrementer, a 18–21 incrementer, and a 22–27 incrementer. The 15–17 incrementer is employed to increment the zone control field of secondary mailbox #1. The 18–21 incrementer is employed to increase the count field of the interrupt queue counter word. The 22–27 incrementer is employed in conjunction with the 18–21 incrementer to increment the address fields of secondary mailbox #1, and secondary mailbox #2. The 0–11 incrementer serves to increment the word count of secondary mailbox word #1.

The 6–11 decrementer of the input/output processor 251 is employed to decrement the word count in secondary mailbox word #1. The 0–5 decrementer is similarly employed to decrease the record count in a primary mailbox word during certain operations of the input/output controller. The carry predictor is employed during address checking in the input/output controller to predict the occurrence or nonoccurrence of a carry. The carry predictor is also employed to obtain the final data address in secondary mailbox word #1 to determine if it exceeds the IOC register capacity. The carry predictor saves processing time in the input/output controller by obviating the delay required to sense a carry from the highest order bit position of the adder. The character count encoder receives signals from the A register and issues output signals to form the zone control field of secondary mailbox #1. The magnitude comparator is employed to compare the memory address to the upper and lower address limits contained in secondary mailbox word #2. The adder is employed, in conjunction with the 15–27 incrementer to increment an address. In addition, the adder is employed, in conjunction with the carry predictor to determine if an address lies within the permissible range.

For structural details of the input/output processor 251, one may refer to U.S. Pat. 3,409,880 in the section entitled "Input/Output Processor" in which the input/output processor is designated by the call number 536.

Information from the F register 209, the E register 202, and the K register 203 is made available to the peripheral channel unit 44 through AND-gate arrays 229, 227, and 228, respectively. Additionally, information in the K register 203 is made available to the D register 171 of the buffer storage unit 45 through the AND-gate array 229.

The ER register 231 is utilized to temporarily store a three-bit external error code in bits 0–2 and a three-bit internal error code in bits 3–5. The terms external and internal are relative to the input/output controller. The A register 234 stores various codes which are utilized in the jump decision logic. The E register 202 is an interface register used in the transfer of control information from the processing and control unit to the peripheral channel unit 44.

The F register 209 stores and administers interrupt requests for microprogram sequences. Bits 1–5 of the F register are utilized to hold the peripheral number and the even/odd data buffer count bit. Bit 6, when a logic 1, signifies that a sequence other than a data service sequence has not yet been completed. Bits 7, 8, 9, and 10 are the sequence request flip-flops. Bit 10 set indicates a data service sequence has been requested; this is the highest priority request. Bits 9, 8, and 7, set indicate sequence requests of descending priority for special interrupt, terminate, and connect sequences. Bit 11 is the lockout indicator. When this bistable is reset, interrupt signals are temporarily inhibited from setting any of the sequence request bistables so that they can be interrogated without possibly changing state during the interrogation.

The K register 203 is an interface register comprising bits 1-5 and 14-35 utilized for the transfer of status and codes between the processing and control unit and the peripheral channel unit 44. Bit 1 of the K register specifies which buffer pair (for a high speed peripheral channel) or which buffer (for a low speed peripheral channel) the processing and control unit will service during the current data service or terminate sequence. Bits 2-5 of the K register contain the basic address of the data buffers for the peripheral channel currently being serviced. Bit 14 of the K register is the read/write bit and corresponds to bit 33 of the primary mailbox word. A binary 1 in K14 designates a write peripheral operation and a binary 0 designates a read peripheral operation.

Bits 15-17 of the K register are the "link count bits." These bistables are analyzed during the connect sequence if the following conditions are satisfied:

(1) the peripheral device command is of the write type;
(2) the action code of the DCW specifies "link"; and
(3) the word count of the initial DCW is less than five (high speed) or less than three (low speed).

Each data buffer associated with a write peripheral must be filled prior to the end of the connect sequence. Further, for writing into high speed peripheral subsystems, four words of data must be fetched from memory prior to the release of the peripheral. If the initial DCW word count is less than five and the action code specifies link, the input/output controller must fetch a new DCW from memory to continue the data transfer. When the input/output controller has fetched a new DCW, it must have a record or count available that designates the number of words of data previously fetched from memory and placed into the data buffers of the peripheral subsystem being connected. This record or count is retained in bits 15-17 of the K register. If the microprogram encounters a test of the link count bits, it must effect the following actions:

(1) if K15=1—fetch the second word of data;
(2) if K16=1—fetch the third word of data;
(3) if K17=1—fetch the fourth word of data;
(4) if K15-17=0—release the peripheral.

Bit 18 of the K register is designated a "flag" to be utilized exclusively in performing high speed link data service routine. High speed data service involves two words of data. If the existing DCW is valid only one of the two words, the microprogram must exit from the data service routine and enter the link routine to fetch a new DCW containing a valid store address for the second word of data. The flag (K18) is set upon such an exit from the data service routine to indicate to the microprogram that it must return to the data service routine after fetching a new DCW and immediately service a safe stored (in the V register of the memory communications unit 42) second word of data.

Bit 19 of the K register holds the status available and peripheral release codes. It is interrogated during the connect and terminate sequences to permit synchronizing the processing and control unit operation with the peripheral channel unit operation. Bit 20 of the K register is the device code device command switch utilized during the input/output sequence. If K20=0, the device code is enabled to the peripheral subsystem; if K20=1, the device command is enabled to the peripheral subsystem. Bits 24-29 of the K register contain the device code during I/O initiation and the peripheral substatus at the conclusion of the I/O sequence. Peripheral substatus information is also contained in bits 24-29 of the K register during the terminate sequence. Bits 30-35 of the K register contain the device command during I/O initiation. In addition, bits 30-35 contain the periperal major status at the conclusion of the I/O sequence carried out during the terminate sequence.

Peripheral channel unit

The peripheral channel unit 44 of the input/output controller is illustrated in FIGS. 17f1, 17f2, and 17f3. To assure clarity, the peripheral channel unit is depicted as if it were instantaneously communicating with a single peripheral subsystem. It will be understood that priority switching means, to be described below, permits selective communications with up to sixteen peripheral subsystems on a time shared basis and that parallel apparatus is provided as required for the several channels.

Referring to FIG. 17f1, signals from the communicating peripheral subsystem drive impedance and logic level matching receivers 260. One set of signal receivers 260 are provided for each peripheral subsystem within the system; and each set of signal receivers comprises: a write clock receiver, a read clock receiver, a special interrupt receiver, a terminate interrupt receiver, four major status receives, six data bit receivers, and a parity bit receiver. Signals from the write clock receivers and the read clock receivers are applied to peripheral subsystem request logic block 261 which recognizes and retains the specific request for a terminate interrupt receiver, four major status receivers, six data bit receivers, and a parity bit receiver. Signals a buffer cycle while relating the request to the specific peripheral subsystem and its assigned data buffer registers. The peripheral channel priority scanner 262 monitors these requests from all peripheral subsystems in a predetermined sequence. An optimum sequence for a full peripheral subsystem complement in which channels A-F are high speed and channels G-R are low speed follows the pattern:

| Set 1 | Set 2 | Group |
|-------|-------|-------|
| A     | B     | 0     |
| C     | D     | 1     |
| E     | F     | 2     |
| G     | H     | 3     |
| J     | K     | 4     |
| L     | M     | 5     |
| N     | P     | 6     |
| Q     | R     | 7     |

Under control of the peripheral channel priority scanner 262, the input/output controller alternately services Set 1 and Set 2, awarding priority to the channel with the lowest group designation within a set. For example, channel A has priority over channel C, but there is no priority difference between channels A and B. Timing signals to coordinate information transfer from and to the peripheral subsystems according to the predetermined priority are developed in the peripheral channel unit timing block 263. Reset receivers logic 264 responds to an award of priority to a specific peripheral subsystem by resetting the signal receivers 260 after information from the peripheral subsystem has been accepted, thereby conditioning the receivers 260 to accept the next information transfer from that peripheral subsystem to the input/output controller.

Peripheral channel and control information are received from the E register of the processing and control unit 43 into the peripheral channel decode logic 265 and the S register 266. Bits 2-5 of the E register are decoded in the peripheral channel decode logic 265 to specify a peripheral subsystem to be affected in a predetermined manner. The selected output line from the peripheral channel decode logic 265 enables one input to each of an array of AND-gates 267 in a matrix of AND-gates to permit the major status signals of the selected peripheral subsystem to be transferred into the K register of the processing and control unit 43.

Each of the bits contained in the S register 266 represents a directive from the microprogram operation; viz.: bit 6 set directs that the I/O line be set, bit 7 set directs that the I/O line be reset, and bit 8 set directs a reset terminate. With either bit 7 or 8 of the S register 266 set, the OR-gate 268 is enabled to activate the generate write clock logic 269. The output from the generate write clock logic 269 is one input to an OR-gate 270 which has its remaining input driven from the write clock receiver 260 of the peripheral subsystem; thus, internal or external generation of a write clock pulse enables the OR-gate 270. The output signal from the OR-gate 270 and from the peripheral channel decode logic 265 activate the allow write clock logic 271 for the specified channel. The output signals from the allow write clock logic 271 and from the bistables comprising bits 6 and 7 of the S register 226 are appplied, as shown in FIG. 17f2, to the I/O logic 272 such that the I/O line transmitter 273 to the specified peripheral subsystem is either set or reset according to the states of bits 6 and 7 of the S register 266.

Data and parity information from the receivers 260 are transferred through the AND-gate array 274 to the TC register of the buffer storage unit 45 under control of the peripheral channel priority scanner 262. The output signal from the peripheral channel priority scanner 262 is also applied to read bistables 275. The state of the read bistable 275 associated with the specified peripheral subsystem determines whether the send read clock logic 276 or the send character logic 277 is activated. The output signal from the send read clock logic 276 drives the read clock transmitter 278 to the specified peripheral subsystem.

Signals from the send character logic 277 drive the write clock transmitter 279 and are also applied to AND-gate arrays 280 and 281. The AND-gate array 280 receives a 6-bit character from the D register and a parity bit from the parity generate logic of the buffer storage unit 45 and drives the data and parity transmitters 282 to the specified peripheral subsystem. The send character logic 277 signals enable the AND-gate 281 when bit 40 of the D register in the buffer storage unit is set. Bit 40 of the D register is the end data transfer or EDX bit. The output signals from the AND-gate 281 comprise a first input to an OR-gate 283 which drives the EDX transmitter 284 to the specified peripheral subsystem. The OR-gate 283, and hence the EDX transmitter 284, are also activated by the output signal from an AND-gate 285 which is driven by the send EDX logic in the processing and control unit 43 and the output signal from the buffer not available bistable 286, FIG. 17f3, corresponding to the specified peripheral subsystem.

Referring again to FIG. 17f3, the K register decode logic 287 receives signals from bits 2-5 of the K register of the processing and control unit 43. The output signals from the K register decode logic 287 are appplied to buffer not available bistables 286 and also to the K1 echo bistable 288. The K1 echo bistable 288 determines which buffer (or pair of buffers for a high speed peripheral subsystem) is to be serviced next. If the K1 echo bistable 288 is set, the odd data buffer (or odd pair of data buffers for a high speed peripheral subsystem) will be serviced next; if reset, the even data buffer or buffer pair will be serviced.

The buffer not available bistables 286 comprise one odd buffer not available bistable and one even buffer not available bistable for each peripheral subsystem. An odd buffer not available bistable is set when the odd data buffer or buffer pair requires a data service. It is reset when the K register bit 1 is set at the start of the requested data service and the K register bits 2-5 correspond to the specific peripheral subsystem. Similarly, an even buffer not available bistable is set when the even data buffer or buffer pair requires a data service and is reset at the beginning of the requested data service.

Interrupt demand bistables 289 are provided for each peripheral subsystem. The interrupt demand bistables receive inputs from the special and terminate interrupt receivers 260 and from an AND-gate 290 which receives signals from the buffer not available bistables 286 and the K1 echo bistable 288. The interrupt demand bistables are utilized to issue demands to the interrupt logic of the processing and control unit 43 and to the demand priority network 290. When one of the interrupt demand bistables 289 is set, this condition indicates that the specified peripheral subsystem has issued a terminate or special interrupt request or that the specified peripheral subsystem requires a data service operation. When the processing and control unit 43 responds to the request, the K1 echo bistable reverses state which causes the interrupt demand bistable to subsequently become reset. Output signals from the demand priority network 290 are transferred to the F register bits 2-5 of the processing and control unit 43 to identify the requesting peripheral subsystem.

The buffer cycle request logic of the processing and control unit 43 enables either first inputs to AND-gate arrays 292, 293, 294, or, with the signals from the buffer cycle request logic inverted through logic inverter 291, first inputs to the AND-gate arrays 295, 296, and 297. The AND-gate arrays 292 and 295 also receive signals from the microprogram storage unit 41 representing the buffer command to be executed in the buffer storage unit 45. Thus, either AND-gate array 292 or 295 is fully enabled to drive the OR-gate array 298 which transfers the buffer command to the TF register of the buffer storage unit 45. Similarly, either the AND-gate array 293 or the AND-gate array 296 is enabled to drive the OR-gate array 299 which transfers the peripheral channel identification from the K register of the processing and control unit 43 or the peripheral channel priority scanner 262 to the TF register of the buffer storage unit 45.

In a like manner, the specific data buffer address is transferred from the buffer address logic of the processing and control unit 43 through the AND-gate array 294 and the OR-gate array 300 to the TF register of the buffer storage unit 45. Alternatively, the data buffer address is transferred into the TF register via the AND-gate array 301 under control of the peripheral channel priority scanner 262 and the buffer address bistables 302. The output signals from the AND-gate array 301 are impressed on the AND-gate array 297 which drives the OR-gate array 300. In addition, the output signals from the AND-gate array 301 are impressed on the buffer address modifier bistables 303 which also respond to a buffer exhausted signal from the buffer exhausted logic of the buffer storage unit 45.

One buffer address bistable 302 is provided for each low speed peripheral subsystem. The buffer address bistable is set when the even buffer is requesting service and reset when the odd buffer is requesting service. When set, it allows data flow between the odd data buffer and the peripheral subsystem; when reset, it allows data flow between the even data buffer and the peripheral subsystem.

Two buffer address bistables 302 are provided for each high speed peripheral subsystem. An odd pair buffer address bistable is set when the even pair of data buffers are requesting service and is reset when the odd pair is requesting service. An odd word buffer address bistable is set when the even word is exhausted and reset when the odd word is exhausted. Thus, the odd pair and the odd word buffer address bistables cooperate to direct data flow between the four data buffers assigned to a high speed peripheral subsystem and that peripheral subsystem.

Two buffer address modifier bistables 303 cooperate to control the buffer not available bistables 286 and the buffer address bistables 302 as required for data transfer between the data buffers and high speed or low speed peripheral subsystems. These two buffer address modifier bistables are designated 0 and 1. For a low speed peripheral subsystem, only buffer address modifier bistable 1 is used and is initially rest. When the sixth character has been transferred, the buffer address modifier bistable 1 is set to permit setting the even buffer not available bistable and the buffer address bistable. When the odd data buffer is empty, the buffer address modifier bistable 1 changes state to permit setting the odd buffer not available bistable and resetting the buffer address bistable which cooperate to direct data flow to an even buffer. In a similar manner, for high speed peripheral channels, both buffer address modifier bistables 0 and 1 are used to coordinate the information flow between the four data buffers assigned to the specific peripheral subsystem and the peripheral subsystem itself.

INPUT/OUTPUT CONTROLLER—OPERATION

All functions of the input/output controller are accomplished during performance of various sequences, routines, and subroutines by the input/output controller. FIG. 18 is a flow chart illustrating the sequence of performance of the sequences, routines, and subroutines. Referring to FIG. 18a, by way of example, it will be observed that the connect sequence commences with microstep 003 as tagged in the upper right hand corner of the symbol setting forth the basic functions carried out during that microstep. The basic information flow among the various registers, control lines, and other elements of the input/output controller to achieve the indicated functions are set forth to the immediate right or upper right of the microstep symbols. For microstep 003, the notations N to L and J to EJ represent the generation and transfer of N and J control signals to temporary storage and utilization in the L and EJ registers. Thus, a full appreciation of the operation of the input/output controller may be realized by relating the flow chart set forth in FIG. 18 to the previously described apparatus.

While the principles of the invention have now been made clear in an illustrative embodiment, there will be immediately obvious to those skilled in the art, many modifications of structure, arrangement, proportions, the elements, materials, and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

We claim:

1. In a data processing system including a data storage unit comprising a memory controller and a plurality of storage locations for storing information, a data processor connected to the data storage unit for executing a selected sequence of processing operations in response to a corresponding sequence of instructions, an input/output controller connected to the data storage unit, and a plurality of peripheral subsystems each connected to a peripheral channel of the input/output controller, the combination in which the input/output controller comprises: means responsive to a notification signal from the data storage unit for fetching a first control word, said first control word including a peripheral channel address field; means responsive to a predetermined configuration of said first control word for fetching a second control word from a storage location within the data storage unit predetermined according to the peripheral channel specified by the peripheral channel address field, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information read from the peripheral subsystem connected to the peripheral channel specified by said peripheral channel address field to the input/output controller; means for decrementing the word count field of said second control word in accordance with each data word transferred from the peripheral subsystem connected to the peripheral channel specified by said peripheral channel address field to the input/output controller; means for transferring data from a selected pair of said plurality of data buffer pairs to said first and second data output registers; sensing means for anticipating the impending exhaustion of said word count field, said sensing means including means for determining that the final data transfer according to the word count field of said second control word is valid only for the data word stored in said first data output register; determining means repsonsive to the exhaustion of said word count field for fetching a third control word from the data storage unit to replace said second control word in said temporary storage means; and means responsive to said determining means for resuming data transfer from the input/output controller to the data storage unit under control of said third control word with the data word temporarily stored in said second data output register.

2. In a data processing system including a data storage unit comprising a memory controller and a plurality of storage locations for storing information, a data processor connected to the data storage unit for executing a selected sequence of processing operations in response to a corresponding sequence of instructions, a plurality of input/output controllers connected to the data storage unit, and a plurality of peripheral subsystems connected to each of the input/output controllers, the combination in which each of the input/output controllers comprises: means responsive to a notification signal from the data storage unit for fetching a first control word from a storage location predetermined according to the identity of the notified input/output controller, said first control word including a peripheral channel address field; means responsive to a predetermined configuration of said first control word for fetching a second control word from a storage location within the data storage unit predetermined according to the peripheral channel specified by said peripheral channel address field, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information read from the peripheral subsystem connected to the peripheral channel specified by said peripheral channel address field to the input/output controller; means for decrementing the word count field of said second control word in accordance with each data word transferred from the peripheral subsystem connected to the peripheral channel specified by said peripheral channel address field to the input/output controller; means for transferring data from a selected pair of said plurality of data buffer pairs to said first and said second data output registers; sensing means for anticipating the impending exhaustion of said word count field, said sensing means including means for determining that the final data transfer according to the word count field of said second control word is valid only for the data word stored in said first data output register; determining means responsive to the exhaustion of said word count field for fetching a third control word from the data storage unit to replace said second control word in said temporary storage means; and means responsive to said determining means for resuming data transfer from the input/output controller to the data storage unit under control of said third control word with the data word temporarily stored in said second data output register.

3. In a data processing system including a data storage unit comprising a memory controller and a plurality of storage locations for storing information, a data processor connected to the data storage unit for executing a selected sequence of processing operations in response to a corresponding sequence of instructions, an input/output controller connected to the data storage unit, and a plurality of peripheral subsystems connected to the input/ output controller, each of the peripheral subsystems including means for issuing a terminate signal to the input/ output controller when a peripheral operation is completed, the combination in which the input/output controller comprises: means responsive to a notification signal from the data storage unit for fetching a first control word from the data storage unit, said first control word including a peripheral channel address field; means responsive to a predetermined configuration of said first control word for fetching a second control word from a storage location within the data storage unit predetermined according to the peripheral channel specified by the peripheral channel address field of said first control word, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information from the peripheral subsystem connected to the peripheral channel specified by said peripheral channel address field to the input/output controller; means for decrementing the word count field of said second control word in accordance with the date of information transfer from the peripheral subsystem to the input/output controller; means for transferring data from a selected pair of said plurality of data buffer pairs to said first and second data output registers; sensing means for sensing a condition in which fewer than a predetermined number of words remain to be transferred to said first and second data output registers, said sensing means including means for determining that the data transfer under control of said second control word is valid only for the data word stored in said first data output register; determining means responsive to a terminate signal from the peripheral subsystem connected to the peripheral channel specified by said peripheral channel address field for fetching a third control word from the data storage unit to replace said second control word in said temporary storage means; and means responsive to said determining means for resuming data transfer from the input/output controller to the data storage unit under control of said third control word with the data word temporarily stored in said second data output register.

4. In a data processing system including a data storage unit comprising a memory controller and a plurality of storage locations for storing information, a data processor connected to the data storage unit for executing a selected sequence of processing operations in response to a corresponding sequence of instructions, an input/ output controller connected to the data storage unit, a plurality of peripheral subsystems connected to the input/output controller, each of the peripheral subsystems including means for issuing a terminate signal to the input/output controller upon the completion of a peripheral operation, the combination in which the input/output controller comprises: means responsive to a notification signal from the data storage unit for fetching a first control word from a predetermined storage location in the data storage unit, said first control word including a controller command field, a peripheral channel address field, and a record count field; means responsive to a predetermined configuration of said controller command field for fetching a second control word from a second storage location in the data storage unit predetermined according to the peripheral channel specified by said peripheral channel address field, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information read from the peripheral subsystem connected to the peripheral channel specified by said peripheral channel address field to the input/output controller; means for decrementing the word count field of said second control word in accordance with the data transfer rate from the peripheral subsystem to the input/ output controller; means for transferring data from a selected pair of said plurality of data buffer pairs to said first and second data output registers; sensing means for anticipating the impending exhaustion of said word count field, said sensing means including means for determining that the data transfer according to the word count field of said second control word is valid only for the data word stored in said first data output register; determining means responsive to the exhaustion of said word count field and to a terminate signal from the peripheral subsystem connected to the peripheral channel specified by said peripheral channel address field for fetching a third control word from the data storage unit to replace said second control word in said temporary storage means, and means responsive to said determining means for resuming data transfer from the input/output controller to the data storage unit under control of said third control word with the data word temporarily stored in second data output register.

5. In a data processing system including a data storage unit comprising a memory controller and a plurality of storage locations for storing information, a data processor connected to the data storage unit for executing a selected sequence of processing operations in response to a corresponding sequence of instructions, an input/ output controller connected to the data storage unit, and a peripheral subsystem connected to the input/output controller, the combination in which the input/output controller comprises: means responsive to a notification signal from the data storage unit for fetching a first control word, said first control word including a peripheral channel address field; means responsive to a predetermined configuration of said first control word for fetching a second control word from a predetermined storage location within the data storage unit, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information read from the peripheral subsystem to the input/output controller; means for decrementing the word count field of said second control word in accordance with each data word transferred from the peripheral subsystem to the input/output controller; means for transferring data from a selected pair of said plurality of data buffer pairs to said first and second data output registers; sensing means for sensing a condition in which fewer than a predetermined number of words remain to be transferred to said first and second data output registers, said sensing means including means for determining that the final data word transferred under control of said second control word is valid only for the data word stored in said first data output register; determining means responsive to the exhaustion of said word count field for fetching a third control word from the data storage unit to replace said second control word in said temporary storage means; and means responsive to said determining means for resuming data transfer from the input/ output controller to the data storage unit under control of said third control word with the data word temporarily stored in said second data output register.

6. In a data processing system including a data storage unit comprising a memory controller and a plurality of storage locations for storing information, a data processor connected to the data storage unit for executing a selected sequence of processing operations in response to a corresponding sequence of instructions, an input/ output controller connected to the data storage unit, a peripheral subsystem connected to the input/output controller, the peripheral subsystem including means for issuing a terminate signal to the input/output controller on the completion of a peripheral operation, the combination in which the input/output controller comprises: means responsive to a notification signal from the data storage unit for fetching a first control word from a first predetermined storage location in the data storage unit, said first control word including a controller command field and a record count field; means responsive to a predetermined configuration of said controller command field for fetching a second control word from a second predetermined storage location in the data storage unit, said second control word including a word count field; temporary storage means; means for transferring said second control word to said temporary storage means; first and second data output registers; means adapted to alternatively transmit data from said first and second data output registers to the data storage unit; a plurality of data buffer pairs adapted to temporarily store information read from the peripheral subsystem to the input/output controller; means for decrementing the word count field of said second control word in accordance with the data transfer rate from the peripheral subsystem to the input/output controller; means for transferring data from a selected pair of said plurality of data buffer pairs to said first and second data output registers; sensing means for anticipating the impending exhaustion of said word count field, said sensing means including means for determining that the final data transfer according to the word count field of said second control word will be valid only for the data word stored in said first data output register when said word count field is completely exhausted; determining means responsive to the exhaustion of said word count field and to a terminate signal from the peripheral subsystem for fetching a third control word from the data storage unit to replace said second control word in said temporary storage means; and means responsive to said determining means for resuming data transfer from the input/output controller to the data storage unit under control of said third control word with the data word temporarily stored in said second data output register.

References Cited

UNITED STATES PATENTS

| | | |
|---|---|---|
| 3,200,380 | 8/1965 | MacDonald et al. |
| 3,248,701 | 4/1966 | Eisenstein et al. |
| 3,377,619 | 4/1968 | Marsh et al. |
| 3,488,633 | 1/1970 | King et al. |

PAUL J. HENON, Primary Examiner

S. R. CHIRLIN, Assistant Examiner